June 2, 1959 F. A. MORRIS ET AL 2,889,406

TELEPHONE SYSTEM

Filed Feb. 11, 1953 33 Sheets-Sheet 1

INVENTORS
Frank A. Morris
Robert B. Trousdale
By T. L. Bowes
Att'y

INVENTORS
Frank A. Morris
Robert B. Trousdale
By T. L. Bowes
Att'y

INVENTORS
Frank A. Morris
Robert B. Trousdale
By J. L. Bowes
Attorney

INVENTORS
Frank A. Morris
Robert B. Trousdale
By J. L. Bowes
Att'y

Fig. 2C Connector-12b
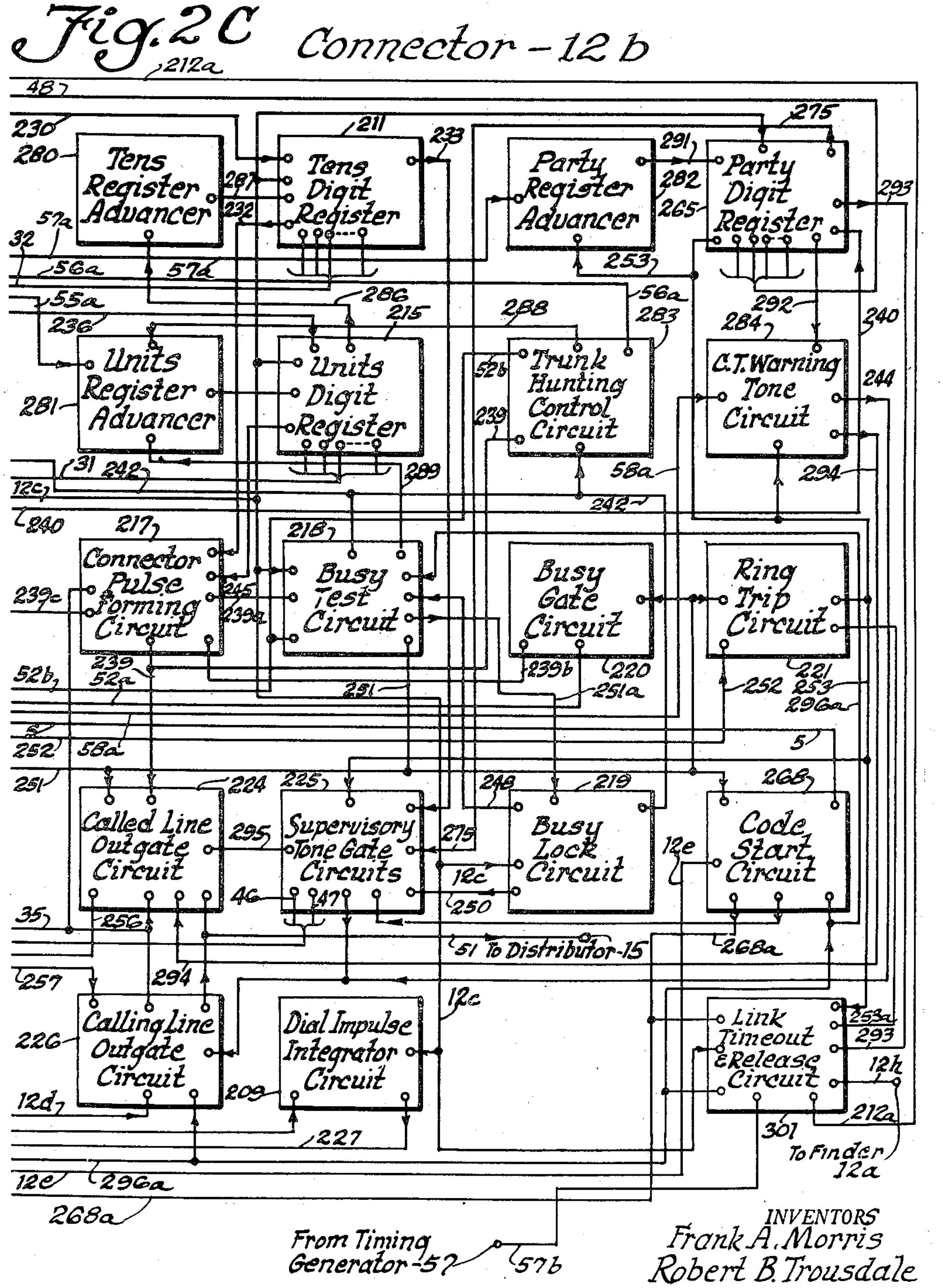
INVENTORS
Frank A. Morris
Robert B. Trousdale
By T. L. Bowes
Att'y INVENTORS
Frank A. Morris
Robert B. Trousdale
By T. L. Bowes
Att'y

TELEPHONE SYSTEM

Filed Feb. 11, 1953

INVENTORS
Frank A. Morris
Robert B. Trousdale
By J. L. Bowes
Att'y

June 2, 1959 F. A. MORRIS ET AL 2,889,406

TELEPHONE SYSTEM

Filed Feb. 11, 1953 33 Sheets-Sheet 8

INVENTORS
Frank A. Morris
Robert B. Trousdale
By J. L. Bowes
Att'y

Connector-12b

INVENTORS
Frank A. Morris
Robert B. Trousdale
By T. L. Bowes
Att'y

June 2, 1959 F. A. MORRIS ET AL 2,889,406

TELEPHONE SYSTEM

Filed Feb. 11, 1953 33 Sheets-Sheet 10

Connector - 12 b

INVENTORS
Frank A. Morris
Robert B. Trousdale
By J. L. Bowes
Att'y

June 2, 1959 F. A. MORRIS ET AL 2,889,406

TELEPHONE SYSTEM

Filed Feb. 11, 1953 33 Sheets-Sheet 11

Connector -12 b

INVENTORS
Frank A. Morris
Robert B. Trousdale
By J. L. Bowes
Att'y

June 2, 1959 F. A. MORRIS ET AL 2,889,406

TELEPHONE SYSTEM

Filed Feb. 11, 1953 33 Sheets-Sheet 12

Connector-12b

INVENTORS
Frank A. Morris
Robert B. Trousdale
By T. L. Bowes
Att'y

June 2, 1959 F. A. MORRIS ET AL 2,889,406

TELEPHONE SYSTEM

Filed Feb. 11, 1953 33 Sheets-Sheet 13

INVENTORS
Frank A. Morris
Robert B. Trousdale
By T. L. Bowes
Attorney

June 2, 1959 F. A. MORRIS ET AL 2,889,406

TELEPHONE SYSTEM

Filed Feb. 11, 1953 33 Sheets-Sheet 14

INVENTORS
Frank A. Morris
Robert B. Trousdale
By J. L. Bowes
Attorney

INVENTORS
Frank A. Morris
Robert B. Trousdale
By J. L. Bowes
Att'y

INVENTORS
Frank A. Morris
Robert B. Trousdale
By J. L. Bowes
Atty

June 2, 1959 F. A. MORRIS ET AL 2,889,406

TELEPHONE SYSTEM

Filed Feb. 11, 1953 33 Sheets-Sheet 17

INVENTORS
Frank A. Morris
Robert B. Trousdale
By J. L. Bowes
Att'y

INVENTORS
Frank A. Morris
Robert B. Trousdale
By J. L. Bowes
Att'y

June 2, 1959 F. A. MORRIS ET AL 2,889,406

TELEPHONE SYSTEM

Filed Feb. 11, 1953 33 Sheets-Sheet 19

Connector -12b

INVENTORS
Frank A. Morris
Robert B. Trousdale
By J. L. Bower
Att'y

INVENTORS
Frank A. Morris
Robert B. Trousdale
By J. L. Bowes
Att'y

INVENTORS
Frank A. Morris
Robert B. Trousdale
By T. L. Bowes
Att'y

June 2, 1959 F. A. MORRIS ET AL 2,889,406

TELEPHONE SYSTEM

Filed Feb. 11, 1953 33 Sheets-Sheet 22

INVENTORS
Frank A. Morris
Robert B. Trousdale
BY
T. L. Bowes
Attorney

INVENTORS
Frank A. Morris
Robert B. Trousdale
BY T. L. Bowes
Attorney

INVENTORS:
Frank A. Morris
Robert B. Trousdale
BY
J. L. Bowes
Attorney

INVENTORS:
Frank A. Morris
Robert B. Trousdale
BY T. L. Bowes
Attorney

INVENTORS
Frank A. Morris
Robert B. Trousdale
By J. L. Bowes
Att'y

INVENTORS:
Frank A. Morris
Robert B. Trousdale
By T. L. Bowes
Att'y

LINE CIRCUIT-16

INVENTORS:
Frank A. Morris
Robert B. Trousdale
By J. L. Bowes
Att'y

June 2, 1959 F. A. MORRIS ET AL 2,889,406

TELEPHONE SYSTEM

Filed Feb. 11, 1953 33 Sheets-Sheet 29

LINE CIRCUIT-16 Fig. 28

INVENTORS:
Frank A. Morris
Robert B. Trousdale
By J. L. Bowes
Att'y

TELEPHONE SYSTEM

Filed Feb. 11, 1953 33 Sheets-Sheet 30

INVENTORS
FRANK A. MORRIS
ROBERT B. TROUSDALE
BY T. L. Bowes
ATT'Y.

INVENTORS:
Frank A. Morris
Robert B. Trousdale
By J. L. Bowes
Att'y

TELEPHONE SYSTEM

Filed Feb. 11, 1953

INVENTORS:
Frank A. Morris
Robert B. Trousdale
By T. L. Bowes
Att'y

June 2, 1959 F. A. MORRIS ET AL 2,889,406

TELEPHONE SYSTEM

Filed Feb. 11, 1953 33 Sheets-Sheet 33

INVENTORS:
Frank A. Morris
Robert B. Trousdale
T. L. Bowes
Att'y

United States Patent Office 2,889,406

Patented June 2, 1959

2,889,406

TELEPHONE SYSTEM

Frank A. Morris, Rochester, and Robert B. Trousdale, Webster, N.Y., assignors, by mesne assignments, to General Dynamics Corporation, a corporation of Delaware Application February 11, 1953, Serial No. 336,315

45 Claims. (Cl. 179—15)

The present invention relates to improved methods and apparatus for selectively setting up signal transmission connections between the lines of a signalling system, and, more particularly, to improved methods and apparatus for setting up two-way communication connections between the lines of an automatic telephone system, wherein line lockout facilities are provided. Specifically, the present invention is directed to certain improvements in a fully automatic telephone system of the electronic type such as disclosed and claimed in a copending application of Robert B. Trousdale and Frank A. Morris, Serial No. 134,974, filed on December 24, 1949, and copending applications of Robert B. Trousdale, Serial No. 301,215, filed July 28, 1952, and Serial No. 336,316, filed on February 11, 1953, all of which applications are assigned to the same assignee as the present invention, whereby individual lines of the system may be locked out of service and the associated linkage released in the case of a prolonged calling condition on the line and in connection with the handling of revertive calls.

In many instances cable failures, short circuits, and other accidents such as leaving the receiver off hook, etc., may cause the lines of a telephone system to assume a permanent or prolonged calling condition such that the entire linkage of the system is seized by these lines so that it is impossible to place a normal call and the service rendered by the system is severely impaired. Accordingly, it is desirable to provide facilities in the telephone system for locking the lines of the system out of service whenever a prolonged off hook condition occurs on these lines, and for releasing the linkage associated therewith so that the linkage of the system does not remain tied up. Also, in offices where there is a large percentage of multiparty lines, a substantial number of revertive calls between different substations associated with the same line may be handled. For these revertive calls, the talking circuit requires only the conventional talking battery after the revertive call has been established so that the linkage used to set up the revertive call is not required after the revertive call is answered. Accordingly, it is also desirable to provide facilities for handling revertive calls wherein the linkage used to set up the revertive call is dismissed once the revertive call is answered and the revertive line is locked out of service for the duration of the revertive call so that it does not call in new linkage.

In the co-pending application, Serial No. 336,316, identified above, there is disclosed an electronic telephone system wherein revertive call facilities are provided for handling revertive calls between different substations associated with the same line. However, in the system therein disclosed, the linkage employed to set up the revertive call is held operatively associated with the revertive calling line for the duration of the revertive call and it would be desirable to provide additional facilities for releasing the linkage once the revertive call is established as well as locking the line out of service so that it cannot call in additional linkage.

Accordingly, it is an object of the present invention to provide new and improved methods and apparatus for selectively setting up two-way communication connections between the lines of a signalling system, wherein line lockout facilities are provided to hold the lines of the system out of service whenever a prolonged off hook condition occurs on these lines without the calls being set up in a normal manner.

It is another object of the present invention to provide an automatic telephone system capable of providing the services of an electromechanical switch type system including line lockout facilities and linkage release facilities, but which consists exclusively of electron conducting devices, such, for example, as electron tubes, gas tubes, crystal rectifiers, semi-conductors and the like, together with interconnecting circuit components therefor.

It is a further object of the present invention to provide a new and improved electronic telephone system wherein facilities are provided for locking the lines of the system out of service and releasing the linkage associated therewith whenever a prolonged calling condition exists on these lines.

It is a still further object of the present invention to provide a new and improved electronic telephone system wherein revertive calls between different substations associated with the same line may be established and wherein facilities are provided for releasing the linkage employed to establish the revertive call after the revertive call is answered.

Another object of the present invention resides in the provision of a new and improved electronic telephone system wherein facilities are provided for releasing the linkage involved in a call whenever the calling operation is delayed and preventing the associated line from calling in new linkage.

A further object of the present invention resides in the provision of a new and improved electronic telephone system wherein the linkage associated with a calling line is released after a prolonged off hook condition thereon without initiation of a call and the calling line is thereafter prevented from calling in new linkage.

A still further object of the present invention resides in the provision of a new and improved electronic telephone system wherein the linkage operatively associated with the calling line is released after dialing is initiated upon a prolonged delay between dialing of any of the digits of the called number and the calling line is thereafter prevented from calling in new linkage.

It is another object of the present invention to provide a new and improved electronic telephone system wherein revertive calls between different substations associated with the same line may be established and wherein the linkage employed to set up the call is released after prolonged ringing on either a revertive or a non-revertive call.

It is a further object of the present invention to provide a new and improved electronic telephone system wherein revertive calls between different substations associated with the same line may be established and wherein the linkage employed to set up the revertive call is released after the revertive call is answered and the revertive calling line is prevented from calling in new linkage.

The invention, both as to its organization and method of operation, together with further objects and advantages thereof, will best be understood with reference to the following specification taken in connection with the accompanying drawings, in which:

Figs. 1, 2, 3 and 4, when arranged in the manner shown in Fig. 5, diagrammatically illustrate an automatic telephone system characterized by the features of the present invention;

Figs. 2A, 2B, and 2C, when laid side by side in the order named, diagrammatically illustrate the components of one of the finder-connector links embodied in the system shown in Figs. 1 to 4 inclusive;

Figs. 6 to 10, inclusive, and 13 to 19, inclusive, when arranged in the manner shown in Fig. 20, illustrate the details of one of the finder-connector links embodied in the system shown in Figs. 1 to 4 inclusive;

Figs. 11 and 12 graphically illustrate the time relationships between certain wave forms developed in the system shown in Figs. 1 to 4 inclusive;

Figs. 21 to 24 inclusive, when laid side by side in the order named, graphically illustrate the time relationships between certain other pulses developed by the common equipment and utilized in the various components of the system;

Figs. 25, 26, 31 and 32, when arranged in the manner shown in Fig. 33, graphically illustrate the time relationships between certain potentials developed by the circuit components of one of the finder-connector links of the system shown in Figs. 1 to 4 inclusive;

Figs. 27 and 28, when laid end to end, illustrate the details of one of the line circuits in the system shown in Figs. 1 to 4 inclusive; and Figs. 29 and 30, when laid end to end, illustrate an alternative line circuit arrangement.

In general, the electronic telephone system herein disclosed is capable of serving one hundred lines, each of which lines may have associated therewith, a number of party line substations up to a maximum of ten such party line substations for each line. More specifically, the system is capable of providing two-way communication connections between any two lines of a one hundred line group and on either a private or party line basis, and includes entirely novel facilities for performing the functions of:

(1) Releasing the linkage operatively associated with a calling line whenever a prolonged off hook condition occurs on this line without the call being set up in the normal manner.

(2) Locking the calling line on which the prolonged off hook condition occurs out of service until the off hook condition disappears so that this line is incapable of calling in new linkage.

(3) Releasing the linkage operatively associated with the calling line after the first digit is dialed if the second digit is not initiated within a predetermined time interval, and preventing the calling line from thereafter calling in new linkage.

(4) Releasing the linkage operatively associated with the calling line after the second digit is dialed if the third digit is not initiated within a predetermined time interval, and preventing the calling line from thereafter calling in new linkage.

(5) Releasing the linkage operatively associated with the calling line after the third digit is dialed if ringing is not initiated within a predetermined time interval thereafter, and preventing the calling line from thereafter calling in new linkage.

(6) Releasing the linkage operatively associated with a calling line on a revertive call immediately after the revertive call is answered, and preventing the revertive calling line from thereafter calling in new linkage.

(7) Releasing the linkage operatively associated with a calling line on either a revertive or non-revertive call in the event the call is unanswered, and preventing the calling line from thereafter calling in new linkage.

(8) Releasing the linkage operatively associated with a calling line on a non-revertive call after a predetermined conversation timing interval, and preventing the calling and called lines from thereafter calling in new linkage.

All of the above functions are accomplished on a fully automatic basis without the use of any relays, stepping switches or other equivalent mechanical devices having moving parts. With the exception of the line circuits, all equipment provided in the system to perform the described functions is common to the lines of the system, whether private or party lines, thus minimizing duplication of system components.

Basically, the present improved system utilizes a system of multiplexing, namely pulse sampling effectively at an ultrasonic rate of the control and intelligence signals produced at each substation of the system, to provide signal channel separation. Specifically, each line of the system is assigned a particular pulse time position in each of repetitive pulse frames, each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into sub-groups. More specifically, the one hundred lines of the system are divided into ten sub-groups of ten lines each, and tens multiplexing or gating pulses are developed at the rate of ten pulses for each pulse frame. Each tens pulse individually corresponds to a particular sub-group of ten lines and occurs during the time interval of each pulse frame which exactly spans the ten pulse time positions individually assigned to the lines of the particular sub-group. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide for harmonic ringing of different ones of the substations associated with any one of the lines of the system in accordance with party line ringing signals of different frequencies which are assigned to these substations on a decimal basis, a party line ringing signal cycle having a duration of approximately 7½ seconds, is established during which five different pairs of coded party line ringing signals of different frequencies are produced and may be selected in the connector on a third or party line digit basis to effect ringing of different pairs of substations associated with the called line in accordance with the particular party line code ring assigned to the particular called substation.

GENERAL DESCRIPTION OF THE SYSTEM

Referring now to the drawings, and more particularly to the Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13, and 14, a distributor 15 of which only one is required in the system, and the common equipment indicated generally at 17 in Fig. 4 of the drawings. Each of the finder-connector links is comprised of a finder and a connector, the illustrated links respectively comprising finders 12*a*, 13*a*, and 14*a* and connectors 12*b*, 13*b* and 14*b*. It will be understood that the number of finder-connector links employed in this system may be chosen as required to handle the traffic. Although only three links, 12, 13 and 14 have been illustrated, from 7 to 10 links will normally be required in actual practice to handle the traffic of a one hundred line exchange. Inclusion of the additional links in this system may easily be accomplished by connecting appropriate terminals of additional links to the indicated multiple points.

As shown, the line circuits 10 and 16 respectively terminate two two-conductor lines which are respectively identified by the designations 23 and 32. The lines 23 and 32 may be used for either private or party line service. In the illustrated embodiment the line 23 is shown as a private line and accordingly extends only to the single substation A having the directory number designation No. 231, the last digit "1" being added to provide uniform directory numbering. On the other hand, the line 32 is shown as a party line and extends to a series of ten parallel connected substations A′, B′, C′, to J′, inclusive, having respectively assigned thereto the directory number designations Nos. 321, 322, 323, to 320, inclusive.

In the system of the present invention, facilities are provided for locking any one of the lines of the system, such as the lines 23 and 32, out of service whenever a prolonged off hook condition occurs on the line without the calling subscriber performing the normal functions incident to setting up a call. Thus, if a simple off hook condition exists on the line 23, which condition may occur due to a shortage between the conductors of this line, or simply due to the subscriber leaving the receiver off hook, and dialing is not initiated, the line circuit 10 associated with the line 23 is provided with facilities for busying the line 23 to the other lines of the system, so that after the associated linkage is released, the line 23 is locked out of service until the off hook condition on this line disappears. Furthermore, in the system of the present invention facilities are provided for setting up a revertive call between different party line substations associated with the same line and releasing the linkage employed to set up the revertive call after the revertive call is answered while at the same time busying the revertive calling line to the other lines of the system so that linkage is not required during the revertive call and the revertive calling line is guarded against intrusion on a call incoming thereto. Thus, the substation B′ associated with the line 32 may be called from the substation A′ associated with this line by dialing successive digits of "3," "2," and "2" at the substation A′, and after the revertive call is answered the line circuit 16 is thrown to a line lockout condition wherein this line is busied to the other lines of the system and the linkage employed to set up the revertive call is released so that it may be used in setting up other calls.

Also, in the system of the present invention facilities compatible with said line lockout and link timeout facilities, are provided for party line ringing on either a fully selective or a semi-selective harmonic ringing basis. Thus, if a maximum of five substations are connected to one of the lines of the system, a fully selective harmonic party line ringing system is employed wherein each of the substations is provided with ringers which respond to different ringing frequencies. Each of the five substations is assigned a different ringing period of one and one-half seconds duration, which ringing periods recur in successive ringing cycles of 7½ seconds duration. Thus, any one of the five substations is rung for a period of one and one-half seconds followed by a period of six seconds of silence and only the particular substation which responds to the ringing frequency transmitted during a particular ringing period is rung.

If more than five substations, up to a maximum of ten substations, are associated with one of the lines of the system, a semi-selective harmonic ringing service is provided wherein pairs of substations are provided with ringing facilities which respond to the same ringing frequency and each ringing period is coded to provide either one long ring or two short rings during the particular ringing period assigned to each pair of substations. With this arrangement, two substations are rung simultaneously with either a long ring of one and one-half seconds duration, or two short rings of one-half second duration separated by one-half second of silence, and the called line subscribers distinguish between their own calls and that of the other subscriber assigned the same ringing frequency by determining whether it is one long or two short rings.

In the system of the present invention, facilities compatible with said line lockout and link release facilities and said revertive call facilities are provided for private branch exchange operation wherein a plurality of lines are designated as private branch exchange trunks and a trunk hunting operation is performed in response to a call directed to one of the private branch exchange trunks to select an idle line within the called trunk group. To this end different groups of lines in the system may be designated as private branch exchange trunk groups and all but the last line in each trunk group is marked as a private branch exchange trunk by means of the common trunk marking pulse generator 56 shown in Fig. 4, as will be described in more detail hereinafter.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and responding to party line ringing control signals derived from one of the connectors **12*b*, 13*b*, or 14*b*, by way of the distributor 15 to transmit ringing current at a particular selected frequency to the associated substation or substations on a call incoming thereto. In addition, each line circuit of the present invention is provided with line lockout facilities whereby each line is busied to the other lines of the system and the finder-connector links 12, 13, 14**, etc. of the system after the line is operatively associated with one of these links.

To perform these functions, the line circuit 10 is connected by way of the conductors **53*a* and 53*b* to one of the gate circuits provided in the multiplexer 11, and is connected by way of the conductor 44 to a corresponding gate circuit provided in the distributor 15. The line circuit 10 is also connected to the common busy pulse out conductor 52*a* and is also connected to certain components of the common equipment 17 in the manner described below. Similarly, the line circuit 16 is connected by way of the conductor 54 to one of the gate circuits of the distributor 15 and by way of the conductors 45*a* and 45*b*, which form the illustrated cable 45, to one of the gate circuits in the multiplexer 11. This line circuit is also connected to the common busy pulse out conductor 52*a* and to certain components of the common equipment 17 in the manner pointed out below. The other 98 line circuits of the system are likewise connected on an individual basis to corresponding gate circuits of the multiplexer 11 and the distributor 15, to the common busy pulse out conductor 52*a* and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders 12*a*, 13*a*, and 14*a*, and also to the multiplexer input terminals of each of the connectors 12*b*, 13*b*, and 14*b*. In reverse manner, the distributor 15 performs the function of repeating intelligence signals derived from the connectors 12*b*, 13*b* and 14*b* in the pulse time positions corresponding to particular calling and called lines to the line circuits respectively terminating these lines. To this end, the input terminals of the distributor 15 are connected by way of the common conductor 51 to the output terminals of each of the connectors 12*b*, 13*b*, and 14*b*. In performing the described functions, the multiplexer 11 and the distributor 15 are controlled by certain components of the common equipment 17 in the manner hereinafter explained.

The finders of the various links, such for example, as the finder 12*a*, do not perform any intelligence transmission functions. On the contrary, they function strictly as control units. Specifically, the finder 12*a* is provided to perform the functions of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder 12*a* and the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This accomplished through operation of the finder 12*a* to impress operating anode potential upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated over the common busy pulse out conductor 52*a* to the link coupling circuits 24 in the common equipment 17. From the link coupling circuits 24 the busy pulses are fed to the common busy pulse in conductor 52*b* which is multipled to each of the finders and connectors of the system. The finder 12*a* further performs the function of supplying an allotting signal to the finder 13*a* of the next succeeding link 13 when the finder 12*a* is taken into use so as to provide a self allotting system for the finder-connector links of the system.

When a prolonged calling condition exists on the calling line with which the finder 12*a* is operatively associated, without an actual call being in progress, the finder 12*a* is arranged to respond to a link releasing signal transmitted thereto over the conductor 12*h* from the associated connector 12*b* by removing busy pulses from the conductor 52*a* and finder gate pulses from the conductor 12*d*, and shortly thereafter removes operating anode potential from the conductor 12*c* so that the link 12 is released even though a calling condition exists on the line with which the finder 12*a* was operatively associated. Also, when a revertive call is initiated on the calling line, the finder 12*a* responds to a revertive call hold signal developed in the associated connector 12*b* by remaining operatively associated with the calling line while the calling party hangs up to permit ringing of the called party over the same line. During this period the finder 12*a* continues to guard the calling line by developing busy pulses in the time position assigned thereto. The finder 12*a* also responds to the transmission of a first disconnect signal over the calling line, when the calling party hangs up to permit completion of the revertive call, by sending a revertive ring start signal to the associated connecter 12*b* indicating that the calling party has hung up and that the calling line should be rung in accordance with the party line ringing signal assigned to the called substation. The finder 12*a* also responds to termination of the hold signal developed in the connector 12*b* by conditioning itself to release the link 12 when the revertive call is answered or in response to a disconnect signal transmitted over the calling line so that the link 12 will be released upon termination of a non-revertive call.

To perform the above functions in the manner fully explained below, the finder 12*a* comprises (see Fig. 2A), a pulse input circuit 200, a +B switching circuit 201, a pulse combining circuit 202, tens and units coincidence tubes circuits 203 and 204, a finder pulse forming circuit 205 and a self alloting circuit 206. The finder 12*a* and connector 12*b* are connected on an individual link basis by five conductors, namely, the +B switch conductor 12*c*, the finder gate pulse conductor 12*d*, the revertive call ring start conductor 12*e*, the revertive call hold conductor 12*f*, and the link release conductor 12*h*.

Each of the connectors 12*b*, 13*b*, and 14*b*, perform a plurality of different functions including those functions relating to line lockout operation and the setting up of revertive calls together with the special service features of trunk hunting, conversation timing, and fully selective or semi-selective harmonic ringing. Thus the connector 12*b*, for example, is controlled by finder gate pulses delivered thereto over the conductor 12*d* to accept and respond to signal bearing multiplexer pulses occurring in the pulse time position corresponding to the calling line with which the link is associated. It also responds to the application of operating anode potential to the conductor 12*c* and to finder gate pulses appearing on the conductor 12*d* to feed a dial tone signal to the distributor 15 on connector signal pulses occurring in the pulse time position assigned to the calling line with which it is operatively associated thereby to return the usual dial tone signal to the calling subscriber.

As discussed previously above, the connector 12*b* includes facilities for trunk hunting to select an idle line within a called trunk group in response to a call directed to one of the lines in this trunk group. Thus, the connector 12*b* responds to dial pulses occurring during a first, or tens digit and a second, or the units digit which originate at the calling line with which the link 12 is operatively associated, to select the particular pulse time position assgned to the called line. The connector then tests the pulse time position assigned to the called line to determine the idle or busy condition of that line and transmits busy tone carrying pulses to the distributor 15 in the pulse time position assigned to the calling line in the event the called line tests busy. If the called line tests busy and is a member of a private branch exchange trunk group, the connector 12*b* selects the pulse time position next adjacent the time position assigned to the calling line, i.e., the time position assigned to the next line of the system and tests successive adjacent pulse time positions until either an idle line is found or the last line in the called trunk group is reached. In the event that all of the lines in the called trunk group test busy, the connector 12*b* transmits busy tone carrying pulses to the distributor 15 in the pulse time position assigned to the calling line.

Incident to the selection of an idle time position, the connector 12*b* conditions itself to accept signal carrying pulses from the multiplexer 11 which occur in the pulse time position corresponding to the selected idle called line, to store the intelligence carried by these pulses and to transmit the intelligence to the distributor 15 on connector signal pulses occurring in the time position corresponding to the calling line with which the link is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line.

In addition, the connector 12*b* performs the auxiliary functions of terminating dial tone transmission to the calling substation when the first line selecting impulse is dialed into the connector and feeding busy pulses occurring in the pulse time position assigned to the idle called line over the common busy pulse out conductor 52*a* to the link coupling circuits 24 to guard the called line against seizure through another link.

The connector 12*b* responds to dial pulses which occur during a third, or party line ringing digit originating at the calling line with which the link 12 is operatively associated by selecting a party line ringing signal which corresponds to the ringing frequency assigned to the called substation associated with the called line in the event the called line tests idle, and concurrently therewith the connector 12*b* transmits pulses which are modulated with a corresponding ringback tone signal to the distributor 15 in the pulse time position assigned to the calling line thereby to signal the calling subscriber that the called substation associated with the called line is being rung. The connector 12*b* terminates the party line ringing signal and concurrently terminates ringback tone signal transmission to the calling substation in response to answering of the call at the called party line substation.

In the event that a calling condition exists on the calling line with which the link 12 is operatively associated, and no dial impulses are transmitted over this line for a predetermined link timeout interval, the connector 12*b* is arranged to transmit a link release signal to the finder 12*a* to cause release of the link 12. Also, if dialing is terminated before a complete directory number is dialed, i.e., after the first, second or third digits, the connector 12*b* also responds by impressing a link release signal on the finder 12*a* after a predetermined link timeout interval. If ringing of the called line persists for a predetermined link timeout interval, the connector 12*b* operates at the end of this interval to transmit a link release signal to the finder 12*a* to cause the link 12 to be released. Also at the end of a conversation timing interval a similar release signal is transmitted to the finder 12*a* to cause release thereof.

When a revertive call is initiated on the calling line with which the link 12 is operatively associated, the connector 12*b* is arranged to respond thereto by setting up a revertive call condition which overrides the normal busy test facilities in the connector 12*b* and permits completion of the revertive call. The connector 12*b* responds to this revertive call condition by transmitting a revertive busy tone signal over the calling line to inform the calling subscriber that he should hang up to permit completion of the revertive call. At the same time, the connector 12*b* transmits a revertive call hold signal to the finder 12*a* to condition the finder 12*a* to remain operatively associated with the calling line even though a calling condition does not exist on this line. The connector 12*b* then responds to a revertive ring start signal from the finder 12*a* by initiating ringing over the revertive calling line. When the revertive call is answered, a seizure signal is transmitted over the calling line and the connector 12*b* responds thereto by transmitting a revertive call tone over the calling line to inform the answering party that he is involved in a revertive call and should wait until the other party also comes off hook. If the call is not answered, the connector 12*b* responds after a ringing timeout interval by removing the revertive hold signal and concurrently transmits a link release signal to the finder 12*a* so as to release the link 12.

When the called subscriber answers on a non-revertive call, the connector 12*b* initiates a conversation timing cycle, and at the end of the conversation timing period the connector 12*b* is arranged to transmit a link release signal to the finder 12*a* so that the link 12 is completely released. When the called subscriber answers on a revertive call, the connector 12*b* is also arranged to transmit a link release signal to the finder 12*a* immediately so that the link 12 is immediately released and the revertive call is completed without additional attendant linkage.

To perform the above mentioned functions in the manner fully explained below, the connector 12*b*, as diagrammatically illustrated in Figs. 2B and 2C, and as shown in detail in Figs. 6 to 10, inclusive, and 13 to 16, inclusive, is provided with a calling line in gate circuit 207 which responds to finder gate pulses transmitted to the connector over the conductor 12*d* to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12*b* further comprises a called line out gate circuit 224 for gating to the distributor 15 connector signal pulses carrying the intelligence reconstructed by the circuit 208 in the time position assigned to a particular called line. In addition, the connector 12*b* includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate to the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12*b* additionally comprises a plurality of components for responding to three digits of dial impulses repeated to the connector on multiplexer pulses occurring in the pulse time position assigned to the calling line, the third digit identifying the particular party line ringing signal assigned to the called party line substation. In general, the dial impulse responsive equipment of the connector 12*b* comprises a dial impulse integrator circuit 209 which receives dial impulses from the reconstructor circuit 208, tens, units and party inverter circuits 260, 261, and 262, respectively, to which pulses are repeated by the circuit 209, the units and party inverter circuits 261 and 262 also acting as start gate circuits for the units and party digit channels, respectively; tens, units and party digit registers 211, 215, and 265 which are respectively controlled in accordance with the numerical values of the tens, units and party digits repeated to the circuits 260, 261, and 262 from the integrator circuit 209; tens, units and party register pulsers 210, 214, and 263 which are respectively interposed between the inverter circuit and the digit register of the tens, units and party digit channels; and tens, units and party sequence timing circuits 212, 216 and 264, which in effect function as the digit counting components of the connector, i.e., initiate certain operations at the end of the first, second and third digits dialed into the connector.

The connector 12b further comprises a connector pulse forming circuit 217 which is controlled in accordance with the settings imparted to the tens and units digit registers 211 and 215 at the end of the second digit to produce connector pulses which are employed to control the circuits 222, 223 and 224 in the transmission of intelligence and control signal information from the connector to the distributor 15 in the pulse time position assigned to the called line. The busy test facilities of the connector comprise the busy test circuit 218, jointly controlled by the connector pulse forming circuit 217 and busy pulses transmitted to the connector over the common busy pulse in conductor 52b, a busy lock circuit 219, and a busy gate circuit 220.

The revertive call facilities of the connector comprise a revertive call test circuit 296, a revertive call tone gate circuit 297, and a revertive call busy tone gate circuit 298. The circuit 296 is jointly controlled by finder gate pulses appearing on the conductor 12d, connector pulses produced by the circuit 217, and a control signal from the units sequence timing circuit 216, and functions to impress a revertive call hold signal on the conductor 12f which is transmitted to the finder 12a to maintain this finder operatively associated with the calling line while the revertive call is being set up. The circuit 296 also impresses a potential on the conductor 296a which is transmitted to the circuits 207, 218, 226, 297 and 298, and is employed in setting up the revertive call.

The link timeout and release facilities of the connector comprise the link timeout and release circuit 301 which cooperates with the line lockout facilities in the line circuits of the system and the finder 12a to effect release of the link under the above described conditions. The circuit 301 is controlled by the tens, units and party sequence timing circuits 212, 216, and 264, the party digit register 265, the revertive call test circuit 296, the code start circuit 268, and the timing pulse generator 57 in the common equipment 17.

The trunk hunting facilities of the connector comprise a trunk hunting control circuit 283 jointly controlled by the connector pulse forming circuit 217, the party sequence timing circuit 264, busy pulses transmitted to the connector over the common busy pulse in conductor 52b, and trunk marking pulses transmitted to the connector over the common trunk marking pulse conductor 56a; the units register advancer 281 and a tens register advancer 280.

The conversation timing facilities of the connector 12b comprise a conversation timing warning tone circuit 284, jointly controlled by the party digit register 265, the ring trip circuit 221 and a warning tone signal transmitted to the connector over the common conductor 58a; and a party register advancer 282. Additionally, the link timeout and release circuit 301 is employed to release the link at the end of the conversation period as will be described in more detail hereinafter.

In addition, the connector 12b comprises supervisory tone gate circuits 225 having the function of gating dial and busy tones to the calling line and including a ringback tone gate circuit having the functions of gating a particular party line ringback tone signal selected by the party digit register 265 in accordance with the identity of the called substation to the calling line, and transmitting a ringing control signal to the called line out gate circuit 224; a code start circuit 268 which performs the function of delaying the transmission of the selected party line ringback tone signal through the ringback tone gate circuit until the start of each party line ringing period, and a ring trip circuit 221 which is assigned the function of terminating ringing current transmission to the called substation, concurrently initiating the conversation timing period when a call answering operation is performed at the called substation.

Generally considered the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator, the phase shifter and pulse former network 19 functions continuously to develop two identical trains of shaped pulses having a common pulse frequency of one megacycle, which are transmitted over the channels 40 and 41, respectively, to the units pulse ring circuit 20 and a commutator drive circuit 25. The phase relationship between the pulses respectively produced in the channels 40 and 41 of the network 19 may be shifted as desired by adjustment of certain of the components of this network. As controlled by the phase shifter and pulse former network 19, the units pulse ring circuit 20 functions sequentially to develop the positive units pulses which define the pulse time positions of the pulse frames, appear on the conductors within the cable 31, and are fed by way of these conductors to the various intelligence transmitting and control components of the system. More specifically, the cable 31 comprises tens units pulse conductors 31a, 31b to 31j, over which positive units pulses are sequentially transmitted in the order named to the units coincidence tubes 204 in the finders 12a, 13a and 14a, the units digits register 215 of the connectors 12b, 13b and 14b and the units gate circuits of the trunk marking pulse generator 56, as described in more detail hereinafter. The positive units pulses developed upon the two conductors 31a and 31f are also employed to control the supervisory carriers supply circuit 26. In addition, the positive units pulses developed on the conductors of the cable 31 are connected to the individual line circuits of the system on the basis of the units pulse time position assigned to these lines. Thus, the positive units pulses developed on the conductor 31c in the units pulse time position assigned to the line 23 are transmitted over this conductor to the line circuit 10 to control the line lockout facilities in this line circuit. Also, the positive units pulses developed upon the conductor 31b in the units pulse time position assigned to the line 32 are transmitted to the line circuit 16 to control the line lockout facilities in this line circuit. In a similar manner, the positive units pulses developed upon the conductors of the cable 31 are transmitted to the 98 other line circuits of the system to control the line lockout facilities in these line circuits.

The positive units pulses are sequentially developed on the units conductors of the cable 31 at a frequency rate of 100 kilocycles and each tenth positive units pulse, i.e., each pulse appearing on the units pulse conductor 31j is used to step, or trigger, a tens pulse ring circuit 21 having the function of developing the positive tens pulses, each of which spans the time interval of ten units pulses. The positive tens pulses as sequentially produced by the ring circuit 21 on the tens pulse conductors 32a, 32b, to 32j, forming the illustrated cable 32, are impressed upon the gate circuits of the multiplexer 11, the tens pulse gate circuits of the distributor 15, the tens coincidence tube circuits 203 of the finders 12a, 13a and 14a and the tens pulse gate circuits of the trunk marking pulse generator 26, in the manner more fully explained below. In addition, the positive tens pulses appearing on the conductors of the cable 32 are individually impressed upon the different line circuits of the system in accordance with the tens pulse time position assigned to the associated line. Thus, the tens pulses appearing on the conductor 32b in the second tens pulse time position of each pulse frame are transmitted to the line circit 10 to control the line lockout facilities in this line circuit. In a similar manner the tens pulses appearing upon the conductor 32c are transmitted to the line circuit 16 to control the line lockout facilities in this line circuit. In a similar manner, the tens pulses on the conductors of the cable 32 are transmitted to the other 98 line circuits of the system to control the line lockout facilities thereof. In this connection it will be noted that all of the components of the system are arranged to operate with tens and units pulses of only one polarity i.e., positive tens and units pulses, thereby materially simplifying the system and reducing the number of conductors between the various units of the system.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b* to 34*j*, forming the cable 34, which are fed to the gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the circuit 25 are also transmitted directly over the commutator drive pulse conductor 35 to the outgate circuits 224 and 226 of each of the connectors 12*b*, 13*b* and 14*b*.

In order to provide facilities for effecting party line ringing of the called substation on either a fully selective or a semi-selective harmonic ringing basis, the common equipment 17 further includes a harmonic ringing oscillator 97, which operates independently of the other components of the system, and is designed to operate at an audio frequency, preferably 1200 cycles (which is suitable for subdivision into a group of standard ringing frequencies). The oscillator 97 is connected over the conductor 102 to a harmonic ringing frequency generator 98 which operated under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive ringers may be employed in the substations of the system. Thus, continuous wave signals having frequencies of 16⅔ c.p.s., 25 c.p.s., 33⅓ c.p.s., 50 c.p.s., and 66⅔ c.p.s. are respectively impressed upon the conductors 103, to 107, inclusive. However, it will be understood that either of the two other series of ringing frequencies, i.e., the synchromonic and the decimonic series, may be developed in substantially the same manner insofar as the present invention is concerned.

The common equipment 17 further comprises the harmonic ringing code forming circuit 99 which operates independently of the other components of the system to develop two different party line code ringing signals during each of five successive ringing periods which recur during repetitive ringing cycles established by the circuit 99. In the illustrated embodiment each ringing period lasts for approximately one and one-half seconds and is separated from the adjacent ringing periods by a short guard interval, the overall ringing cycle being approximately 7½ seconds long. During each of the five ringing periods the code forming circuit 99 produces both a long ringing pulse, which lasts for one and one-half seconds, and two short ringing pulses each of one-half second duration separated by a one-half second silent period. The series of ten coded ringing pulses formed by the circuit 99 are used to control a harmonic ringing modulator circuit 100 wherein the one and one-half second ringing pulses are used as gating pulses sequentially to gate to a common output conductor 108 the different ringing frequencies impressed on the conductors 103–107 inclusive, by the generator 98, and the multiplexed ringing frequencies thus impressed on the conductor 108 are transmitted to a harmonic ringing amplifier and supply circuit 101.

The common equipment 17 also includes a ringback tone generator 29*c* which performs the function of developing a continuous audible ringback tone signal (preferably 200 c.p.s.) which is supplied over the conductor 27*b* to the harmonic ringing modulator circuit 100. Each one of the ten codes formed by the circuit 99 is used to develop corresponding pulses of ringback tone on the ten ringback tone conductors 48*a* to 48*j*, inclusive, which form the illustrated ringback tone cable 48. These ringback tone pulses are transmitted over the cable 48 to the party digit registers 265 of the connectors 12*b*, 13*b*, and 14*b*. The harmonic ringing amplifier and supply circuit 101 filters and amplifies the multiplexed ringing frequencies transmitted thereto over the conductor 108, and includes a combined bias voltage and multiplexed ringing current source which is connected to each of the line circuits 10, 16, etc., over the common multiple conductors 61*a* and 61*b* forming the illustrated cable 61.

In order to mark certain consecutively numbered groups of the lines of the system as private branch exchange trunks, the common equipment 17 includes the trunk marking pulse generator 56 which is jointly controlled by the positive units pulses transmitted thereto over the cable 31 and the positive tens pulses transmitted thereto over the cable 32, and develops on the common output conductor 56*a* thereof the trunk marking pulses which appear in the time positions assigned to each of the lines in each trunk group with the exception of the last line in each group which is unmarked. The trunk marking pulses produced on the conductor 56*a* are impressed upon the trunk hunting control circuits 283 in each of the connectors 12*b*, 13*b* and 14*b* of the system.

To provide a trunk hunting arrangement wherein the tens and units digit registers are successively driven to different settings to hunt for an idle line, there is provided in the common equipment 17 a trunk hunting drive pulse generator 55 which operates independently of the other components of the system to develop positive trunk hunting drive pulses of relatively short duration which recur at a relatively low rate (preferably in the order of 100 pulses per second) which are impressed on the common conductor 55*a* and are connected by way of this conductor to the units register advancers 281 in each of the connectors 12*b*, 13*b*, and 14*b*.

In order to provide facilities for establishing the above described link timeout intervals in connection with the above described link release facilities, and for timing the conversation period of a call, the common equipment 17 includes a timing pulse generator 57 which operates independently of the other components of the system to develop relatively narrow, positive conversation timing pulses which preferably have a repetition rate of one every forty seconds and are transmitted by way of the common conductor 57*a* to the party register advancers 282 in each of the connectors 12*b*, 13*b*, and 14*b*. The generator 57 also functions to develop link timeout pulses, preferably having a repetition rate of one pulse every two minutes on the conductor 57*b*, which are transmitted by way of this common conductor to the link timeout and release circuits 301 in each of the connectors 12*b*, 13*b*, and 14*b*. The common equipment 17 also includes a conversation timing warning tone generator 58 which operates independently of the other components of the system to develop a continuous wave warning tone signal (preferably 400 c.p.s.) which is connected by way of the common conductor 58*a* to the conversation timing warning tone circuits 284 in each of the connectors 12*b*, 13*b*, and 14*b*.

The common equipment 17 also includes a busy tone generator 29*a*, connected by way of the common conductor 46 to the supervisory tone gate circuits 225 in each of the connectors of the system; a dial tone generator **29*b* connected by way of the common conductor 47 to the supervisory tone gate circuits 225 in each of the connectors of the system; a revertive call busy tone generator 29*e* connected by way of the common conductor 49*a* to the revertive call busy tone gate circuits 298 in each of the connectors of the system; and a revertive call tone generator 29*g* connected by way of the conductor 49*b* to the revertive call tone gate circuits 297 in each of the connectors of the system. The common equipment 17 further comprises the link coupling circuits 24 which include a busy pulse driver channel for repeating busy pulses supplied thereto over the common busy pulse out conductor 52*a* to the busy pulse in conductor 52*b* which is multipled to the finders and connectors of all of the links in the system and a supervisory carrier drive channel for repeating the one hundred kilocycle supervisory carrier supplied thereto over the conductor 37 from the supervisory carrier supply circuit 26 to the self-alloting circuit 206 in the finder 12*a* over the conductor 36*a* to permit the finder 12*a*** to handle the first incoming call.

In order to render the mode of operation of the system more readily understandable, a pulse chart has been illustrated in Figs. 21 to 24, inclusive, to show the relative width of the pulses developed by the common equipment components 19, 20, 21 and 22 during two successive pulse frames, as well as the time and phase relationship between the pulses. As there shown, the units pulse ring drive pulses **95*a* appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i.e., persist for very short time intervals, and the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*, to 31*j* inclusive, are produced along the zero potential reference lines 62, 63 to 71, inclusive. It will be noted that the units pulses are produced by the units pulse ring circuit 20** at the fundamental frequency rate of one megacycle. However, due to diversion of the pulses successively to different ones of the units pulse conductors *a*, *b* to *j*, inclusive, the pulses along any particular zero potential reference line, such, for example, as the line 62, recur only at a frequency rate of one hundred kilocycles. It will also be noted that the units pulses are successively produced on the units pulse conductors **31*a* to 31*j*, inclusive, in the order of alphabetical designation of these conductors. Thus, successive positive units pulses produced along any particular zero potential reference line, as, for example, those occurring during the units pulse periods 62*a*, 62*b*, 62*c*, etc., along the potential reference line 62**, are separated by a time interval equaling the sum of nine units pulse time positions and during which pulses are produced successively along each of the nine other zero potential reference lines.

The positive tens pulses successively produced by the tens pulse ring circuit 21 on the tens pulse conductors **32*a*, 32*b*, to 32*j* inclusive, are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a* to 71*a* are successively produced by the units pulse ring circuit 20. It will also be noted that the starting point of each tens pulse period 72*a*, 73*a*, 74*a*, etc., is exactly coincident with the starting points of the units pulses 62*a*, 62*b*, 62*c*, etc., appearing along the zero potential reference line 62 and impressed upon the units pulse conductor 31*a* by the units pulse ring circuit 20. Further, each tens pulse period terminates at the exact instant of termination of the units pulses 71*a*, 71*b*, 71*c*, etc., appearing along the zero potential reference line 71 and produced by the units pulse ring circuit 20 on the conductor 31*j***.

The channel pulses which are successively produced on the ten channel pulse conductors **34*a*, 34*b*, to 34*j*, inclusive, by the channel pulse generator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the units pulses, the channnel pulses are produced at the fundamental frequency rate of one megacycle, but due to the action of the commutator 22 in diverting these pulses successively to the conductors 34*a*, 34*b*, to 34*j*, inclusive, recur on only each of these conductors at the rate of 100 kilocycles. Thus, the channel pulses 82*a*, 82*b*, 82*c*, etc., appearing along the reference line 82 and impressed on the conductor 34*a* are spaced apart timewise by like intervals each of which exactly equals the sum of tens units pulse timing periods. During this spacing interval, nine additional channel pulses are successively produced along the reference lines 83, 84 to 91 to appear on the conductors 34*b*, 34*c* to 34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed from the conductor 35 and appearing along the zero potential reference line 96, which are displaced timewise relative to the units pulse ringback pulses 95*a*, to open the gating circuits of the channel pulse commutator 22**. The purpose of thus positioning the signal bearing pulses in the units pulse time position is that of insuring transmission of these pulses through the units gate circuits of the signal handling components of the system while these gate circuits are open despite slight variations in the relative positions of the units pulses and the signal bearing pulses occasioned by circuit delays.

With the above general description of the pulse chart illustrated in the Figs. 21 to 24, inclusive, in mind, it will be readily understood that each pulse frame is divided into one hundred readily identifiable pulse time positions. Thus, the first ten pulse time positions of each pulse frame which are respectively assigned to the lines of the system having the directory number designations 11, 12, 13 to 10, are defined by the first tens pulse period **72*a* of the frame within which the ten units pulse periods 62*a*, 63*a*, 64*a* to 71*a* occur. Similarly, the second ten pulse time positions, which are respectively assigned to the lines of the system having the directory number designations 21, 22, 23 to 20, are defined by the second tens pulse period 73*a*, during which the ten units pulse periods 62*b*, 63*b*, 64*b* to 71*b* occur. Again, the third ten pulse time positions, which are respectively assigned to the lines of the system having the directory number designation of 31, 32, 33 to 30, are marked out by the third tens pulse time period 74*a* during which the ten units pulse periods 62*c*, 63*c*, 64*c*, to 71*c* occur. Thus, it will be understood that the pulse time position of each time frame which is assigned to the illustrated line 23 occurs during the second tens pulse interval 73*a* of each pulse frame and is coincident with the units pulse period 64b of each pulse frame. Furthermore, this time position may be established by combining the pulses on the conductors 32b and 31c, as is done in the line lockout facilities in the line circuit 23. It will also be apparent that the corresponding channel pulse 84b occurs well within the limits of this pulse time position. Similarly, the pulse time position assigned to the illustrated line 32 occurs during the third tens pulse time interval 74a of each pulse frame and is coincident with the second units pulse period 63c of each pulse frame. This time position may also be established by combining the pulses on the conductors 32c and 31b, as is done in the line lockout facilities in the line circuit 16. Here again, each channel pulse 83c corresponding to the line 32 occurs well within the limits of the particular pulse time position assigned to the line 32** in each pulse frame.

In order further to render the mode of operation of the fully selective or semi-selective harmonic ringing system more readily understandable, a harmonic code sequence chart has been illustrated in Fig. 11 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168 and 169 on five different output code busses thereof which recur in succession during successive harmonic ringing cycles of approximately 7½ seconds duration. The long ringing pulses 165–169, inclusive, define a succession of five ringing periods which are separated by guard intervals 186 of relatively short duration. The code forming circuit 99 also operates to produce on five other code busses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180, Fig. 11 (11), which occur substantially at the end of each guard interval 186. The code start pulses 180 are transmitted over the common conductor 5 to each of the connectors 12b, 13b, and 14b to delay the selection of a particular party line ringing signal until the end of a particular ringing period.

The long ringing pulses 165 are employed in the harmonic ring modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 11 (12). Thus, during the first ringing period the ringing pulse 165 is used to gate a 66⅔ c.p.s. voltage to the common conductor 108. After the guard interval 186, the ringing pulse 166 is employed to gate a 50 c.p.s. ringing voltage to the conductor 108 during the second ring period. Likewise, the successive ringing pulses 167, 168, and 169 are employed successively to gate to the common output conductor 108 ringing voltages having frequencies of 33⅓ c.p.s., 25 c.p.s. and 16⅔ c.p.s.

In order to produce ringing control signals which may be used to control the application of ringing current to the called line during the particular ringing period and in accordance with the particular ringing code assigned to the called substation associated therewith, and also to produce concurrently therewith corresponding ringback tone signals which may be used to advise the calling line subscriber that the called line is being rung in a particular code sequence, the long and short ringing pulses, Figs. 11 (1)–(10), inclusive, developed by the harmonic ringing code forming circuit 99 are used individually to gate to the output conductors 48a to 48j, inclusive, a ringback tone signal for the duration of the ringing pulse. Thus, the ringing pulse 165 developed in the code forming circuit 99 is used to develop a ringback tone signal 165a which persists for the duration of the first ringing period. Likewise, the short ringing pulses 170 and 171 are employed to produce a ringback tone signal 170a and 171a which have a duration of one-half second and are separated by a one-half second interval, the signals 170a and 171a also occurring during the first ringing period. In the same manner, the pulses 166, 172, and 173 are employed to develop the corresponding ringback tone signals shown in Figs. 11 (15) (16) during the second ringing period. In a similar manner the long and short ringing pulses which are produced during the third, fourth and fifth ringing periods are employed to produce the ringback tone signals shown in Figs 11 (17)–(22), inclusive.

With the above general description of the harmonic code sequence chart illustrated in Fig. 11, in mind, it will be readily understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals.

In the event that more than five substations up to a maximum of ten substations are associated with one of the lines of the system, the group of substations is divided into pairs and each pair of substations is provided with ringing facilities responsive to the same ringing frequency. Thus, the substations A′ and B′ associated with the line 32 are assigned directory number designations 321 and 322 and both are provided with ringing facilities responsive to a ringing current of the same frequency, for example, a 66⅔ c.p.s. ringing current. If the calling subscriber wishes to call substation A′ he dials 321 and the connector responds to the third digit "1" by selecting the ringback tone signal 165a so that a 66⅔ c.p.s. ringing current is transmitted over the called line 32 during the entire first ringing period. Only the ringers of the substations A′ and B′ will then be rung for a period of approximately one and one-half seconds and the subscriber at the substation A′ will know that the call is intended for him. On the other hand, if the calling subscriber wishes to call the substation B′ associated with the line 32, he dials the number 322 and the connector responds to the third digit of "2" by selecting the ringback tone signal consisting of the short pulses 170a and 171a which control the application of 66⅔ c.p.s. ringing current to the line 32 so that the ringing facilities at both the substations A′ and B′ are rung in two short rings. The subscriber at the substation B′ is then notified that his substation is being rung.

In a similar manner, the substations, C′ and D′ are provided with ringing facilities responsive to 50 c.p.s. ringing current, the substations E′ and F′ are provided with ringing facilities responsive to 33⅓ c.p.s. ringing current, etc. However, it will be understood that certain ones of the lines of the system may be adapted for private service, in which case the private line will, of course, have only one substation associated therewith. Thus, in the illustrated embodiment the line 23 is adapted for private service and has associated therewith only the one substation A to which is assigned the directory number designation 231. When the line 23 is called by dialing the number 231, the connector responds to the third digit of "1" by transmitting a 66⅔ c.p.s. ringing current over the line 23 and the substation A is provided with ringing facilities responsive to this ringing current so that the substation A is rung during the first ringing period of each harmonic ringing cycle. In this connection it will be understood that more than ten substations may be connected to the same line by providing more codes or a greater number of ringing frequencies, or both. Thus, fifteen substations may be accommodated by providing three codes consisting of one long ring, two short rings and three short rings for each of five ringing frequencies, as will be readily understood by those skilled in the art.

In order to render the mode of operation of the trunk hunting facilities more readily understandable, a trunk marking pulse chart has been illustrated in Fig. 12 to show the time and phase relationship of the trunk marking pulses developed by the trunk marking pulse generator 56 in the common equipment 17. Referring to this figure, the 100 time positions which comprise one pulse frame are illustrated as a series of 10 horizontal strings of blocks corresponding to the tens digit levels of the lines of the system. In each of the blocks there is shown the directory number designation of the line which is assigned the corresponding units time position. Thus, the first units time position 62*a* in each time position frame is assigned to the line having the directory number designation "11," the second units time position 63*a* in each time position frame is assigned to the line having the directory number designation "12," the third units time position 64*a* in each time position frame is assigned to the line having the directory number designation "13," and the tenth units time position 71*a* is assigned to the line having the directory number designation "10." In the second tens digit level, the 11th units time position 62*b* in each time position frame is assigned to the line having the directory number designation "21," and the 20th units time position 71*b* in each time position frame is assigned to the line having the directory number designation "20." Likewise, in the tenth tens digit level the 91st units time position 62*j* in each time position frame is assigned to the line having the directory number designation "01" and the 100th units time position 71*j* is assigned to the line having the directory number designation "00."

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to provide trunk marking plses which occur once in each time position frame in particular units pulse time positions. As will be described in more detail hereinafter, the last line in each trunk group is unmarked.

In the trunk marking pulse chart of Fig. 12 there is shown nine different private branch exchange trunk groups. One of these trunk groups is comprised of the lines having the directory number designations 32–42 inclusive, and the trunk marking pulse generator 56 operates to develop trunk marking pulses during each of the time positions assigned to these lines except the last line 42. It will be evident from Fig. 12 that this trunk includes lines which are positioned in different tens digit levels. Thus, the lines 32–39, inclusive, and 30, are located in the third tens digit level, whereas the lines 41 and 42 are located in the fourth tens digit level. Since the line 42 is the last line in this trunk group, no trunk marking pulse is produced in the time position 63*d* assigned thereto. It will also be noted that the eighth trunk group includes lines in the last tens digit level as well as the first tens digit level so that the trunk hunting facilities of the system are capable of hunting not only through different tens digit levels, but from the last time position to the first time position, i.e., from the time position 71*j* to the time position 62*a*.

OPERATION OF THE SYSTEM AS A WHOLE

Considering now the general mode of operation of the system, in order to illustrate the operation of the line lockout facilities of the present invention, in connection with both a revertive call and a non-revertive call, a revertive call will first be traced in which it is assumed that the party line substation B′ is called from the party line substation A′, both of which substations are associated with the line 32, during a period when the finder-connector link 12 is idle. Thereafter a non-revertive call will be traced in which it is assumed that the party line substation B′ is called from the private substation A during a period when the finder-connector link 12 is idle, so that the compatible operation of the line lockout facilites and revertive call facilties with the special service features of trunk hunting and conversation timing will be illustrated. However, the non-revertive call will be described only in sufficient detail to illustrate the different functions of the system components for line lockout operation on both revertive and non-revertive calls, reference being had to my co-pending applications, Serial No. 301,215, and Serial No. 336,316, identified above, for a complete and detailed description of the revertive call facilities as well as the special service facilities of trunk hunting and conversation timing.

*Line lockout operation on a revertive call*

When the receiver or hand set at the substation A′ is lifted from its supporting hook or cradle to initiate the call, a loop circuit including the conductors of the line 32 is closed to the line circuit 16, with the result that this line circuit immediately operates to change the magnitude of the bias potential which it delivers over the conductor 45*b* to the gating circuit in the multiplexer 11 which individually corresponds to the line 32. The multiplexer 11 responds to this change in magnitude of the controlling bias potential supplied thereto from the line circuit 16 by opening this gate circuit. Accordingly, only the signal pulses 83*c* occurring during the pulse time positions 63*c* of successive pulse frames, are permitted to pass over the common conductor 50 to the pulse input circuits 200 of the finders 12*a*, 13*a* and 14*a* and the ingate circuits 207 and 223 of the connectors 12*b*, 13*b* and 14*b* in parallel. At this point the pulses transmitted from the multiplexer 11 over the common conductor in the pulse time postion 63*c* may be regarded as multiplexer pulses 83*c*.

In the illustrated embodiment, the finder-connector links of the system are arranged in a predetermined sequence and are allotted one at a time to successive calling lines of the system by means of the self-allotting circuits 206 in each of the finders 12*a*, 13*a* and 14*a*. Initially, only the link 12 is conditioned by means of the self-allotting circuit 206 in the finder 12*a* to handle a call placed on the calling line of the system. However, when the link 12 is taken into use, the self-allotting circuit 206 in the finder 12*a* diverts a supervisory carrier signal to the finder 13*a* and the link 13 to condition this link to handle the next succeeding call. Accordingly, only the link 12 is conditioned to handle the first call and the connector 12*b* of this link is as yet inoperative so that only the finder 12*a* initially responds to the multiplexer pulses 83*c* delivered thereto from the multiplexer 11 over the conductor 50 in the described pulse time position 63*c*.

In the finder 12*a*, the multiplexer pulses 83*c* are repeated by the pulse input circuit 200 to effect substantially immediate operation of the +B switching circuit 201 embodied in this finder, whereby operating anode potential is delivered to the tubes of the circuits 209, 211, 212, 215, 216, 218, 219, 264, 265, 296 and 301 of the connector 12*b* over the +B switch conductor 12*c* with the result that the connector 12*b* is conditioned for operation, i.e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 83*c* repeated by the input circuit 200, the positive tens pulses developed by the tens pulse ring circuit 21, and the positive units pulses developed by the units pulse ring circuit 20.

In responding to the tens and units pulses impressed thereon coincidentally with the multiplexer pulses 83c, the tens and units coincidence tube circuits 203 and 204 of the finder 12a cooperate with the finder pulse forming circuit 205 and the combining circuit 202 of this finder to produce finder gate pulses which are transmitted over the conductor 12d to the circuits 207, 208, 226 and 296 of the connector 12b and have the effect of initially limiting the response of the connector only to multiplexer pulses 83c appearing in the pulse time position 63c. The combining circuit 202 of the finder 12a also gates busy pulses in the pulse time position 63c which are fed over the common busy pulse out conductor 52a to the link coupling circuits 24 wherein the busy pulses are amplified and supplied over the common busy pulse in conductor 52b to all of the finders and connectors of the system to prevent these finders from responding to multiplexer pulses occurring in this time position. Thus, the line 32 is guarded against intrusion on an incoming call while it is operatively associated with the link 12. In adidtion, the pulses gated by the circuit 202 of the connector 12b are impressed upon the pulse input circuit 200, thereby to render the finder 12a responsive only to multiplexer pulses 83c.

Operation of the +B switching circuit in the finder 12a has the further effect of causing the self-allotting circuit 206 of the finder 12a to divert the supervisory carrier control signal, normally supplied thereto over the conductor 36a, to the self-allotting circuit in the finder 13a of the next succeeding link 13 over the conductor 36b to condition the link 13 to handle the next incoming call. In an entirely similar manner, operation of the +B switching circuit in the finder 13a of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call.

After the finder 12a has operated to perform the described functions, continued holding of the finder 12a, if the call is nonrevertive, is dependent upon continued acceptance and transmission of multiplexer pulses 83c by the pulse input circuit 200. Accordingly, the finder 12a will remain associated with the calling line 32 only so long as a calling condition persists on this line. In addition, the line lockout facilities in the line circuit 16 and the link timeout and release circuit 301 in the connector 12b may set up a link release condition whereby the finder 12a is released from the line 32 even though a calling condition persists on this line as will be described in more detail hereinafter. Also, on a revertive call, the finder 12a continues to be operatively associated with the calling line 32 and continues to transmit busy pulses in the time position 63c and accept multiplexer pulses only in this time position even though a calling condition does not exist on the calling line 32 during certain periods while the revertive call is being set up. Thus, on a revertive call, continued holding of the finder 12a is dependent on the transmission of a revertive call hold signal over the conductor 12f from the connector 12b, as will be described in more detail hereinafter.

As soon as the finder 12a transmits finder gate pulses over the conductor 12d to the calling line out gate circuit 226 in the connector 12b, the circuit 226 responds thereto by gating that one of the commutator drive pulses appearing on the conductor 35 which occurs in the time position 63c assigned to the calling line 32 and these gated commutator drive pulses, which may be called connector signal pulses appearing in the time position assigned to the calling line, are transmitted by way of the common output conductor 51 to the distributor 15. In the distributor 15 the connector signal pulses appearing in the time position 63c are transmitted through the gate circuit corresponding to the line 32 and are detected or reconstructed, the resultant signal being transmitted over the conductor 54 to the line circuit 16.

In the line circuit 16, the signal transmitted over the conductor 54, which may be called a return supervision signal and indicates to the line circuit 16 that the line 32 has become operatively associated with one of the finder-connector links of the system, is impressed upon the line lockout facilities in this line circuit. The line lockout facilities in the line circuit 16 are jointly controlled by the return supervision signal transmitted thereto over the conductor 54, the bias potential developed on the conductor 45b when a calling condition exists on the line 32, units pulses transmitted there to over the conductor 31b from the units pulse ring circuit 20 in the time position 63a, 63b, 63c, etc., and tens pulses transmitted thereto over the conductor 32c from the tens pulse ring circuit 21, and responds to these controlling potentials and pulses by developing line busy pulses in the pulse time position 63c assigned to the line 32, which are impressed upon the common busy pulse out conductor 52a. Accordingly, after the calling line 32 has been seized by the link 12 and a return supervision signal is transmitted from this link by way of the distributor 15 to the line circuit 16 associated with the line 32, the busy condition of the line 32 is indicated by busy pulses impressed upon the conductor 52a from the combining circuits 202 in the finder 12a, and the busy condition of this line is also indicated by busy pulses impressed upon the conductor 52a from the line lockout facilities in the line circuit 16, both of these busy pulses appearing in the pulse time position 63c assigned to the line 32. These busy pulses impressed upon the conductor 52a are transmitted through the link coupling circuits 24 to the common busy pulse in conductor 52b over which they are transmitted to all of the finders and connectors of the system. However, it will be understood that the busy pulse driver channel in the circuits 24 functions to maintain the amplitude of the busy pulses appearing upon the conductor 52b substantially constant even though the above described busy pulses are superimposed on the common busy pulse out conductor 52a from the line circuit 16 and the finder 12a. Accordingly, the development of busy pulses by the line lockout facilities in the line circuit 16 in the time position 63c has no effect upon the operation of the system at this point in the call.

As indicated above, when the +B switching circuit 201 of the finder 12a operates to apply operating anode potential to the conductor 12c, the circuits 210, 211, 212, 215, 216, 218, 219, 264, 265, 296, and 301 of the connector 12b are conditioned for operation. The tens digit register 211 in turn supplies a bias potential to the dial tone gate tube of the network 225 and this network then functions to transmit a dial tone signal, derived from the dial tone generator 29d over the conductor 47, to the calling line out gate circuit 226 over the conductor 244. The circuit 226 responds to this dial tone signal by modulating the same on the connector signal pulses released by this circuit to the conductor 51 so that dial tone signal modulated connector signal pulses appearing in the pulse time position 63c are transmitted over the conductor 51 to the distributor 15. In the distributor 15, the dial tone signal is reconstructed and transmitted over the conductor 54 to the line circuit 16 wherein the dial tone signal is transmitted over the line 32 to signal the calling subscriber at the substation A' that the dialing operation may be initiated.

At this point it is noted that the operation of the system described thus far will take place irrespective of the manner in which a calling condition is produced on the line 32. For example, a calling condition on the line 32 may be produced by a short circuit between the conductors of this line in which case the loop circuit including these conductors would be established without removing the receiver from its supporting hook at the substation A′, and the line circuit 16, multiplexer 11, and link 12 would respond to this false calling condition on the line 32 by operatively associating the link 12 with this line and returning dial tone signal in the manner described above. In the alternative, the receiver at one of the substations associated with the line 32 may be inadvertently knocked or jostled off of its supporting hook or cradle without intending to initiate a call, in which case a calling condition is set up on the line 32 and this line calls in linkage in the manner described above and dial tone signal is returned to this line. Accordingly, it will be evident that a calling condition may be produced on the line 32 for any one of a number of reasons, in response to which linkage would be seized and held operatively associated with the line as long as a calling condition exists thereon.

In order to avoid tie up of the linkage of the system with lines over which a call is not progressing in a normal manner, the connector 12*b* is provided with facilities for determining when a prolonged calling condition exists on the line 32 unaccompanied by the normal operations necessary to set up a call, and, if such a prolonged calling condition exists, the connector 12*b* is arranged to release the link 12. More specifically, the link timeout and release circuit 301 in the connector 12*b* is arranged to initiate a link timeout interval immediately operating anode potential is impressed upon the conductor 12*c* by the +B switching circuit 201 in the finder 12*a*.

The duration of this link timeout interval is determined by the timing pulses developed on the conductor 57*b* by the timing pulse generator 57 in the common equipment 17 and it will be recalled that these pulses preferably occur at the rate of one pulse every two minutes. Accordingly, if a calling condition on the line 32 persists for a period of from two to four minutes without initiation of the dialing operation at the calling substation A′, the link timeout and release circuit 301 is arranged to change the potential impressed upon the conductor 12*h*. This potential change, which may be called a link release signal, is transmitted over the conductor 12*h* to the finder pulse forming circuit 205 in the finder 12*a*. The circuit 205 responds to this link release signal by ceasing to transmit finder pulses to the finder pulse and busy pulse combining circuit 202 in the finder 12*a*. As a result, the circuit 202 ceases to impress finder gate pulses on the conductor 12*d* and also ceases to impress busy pulses on the common busy pulse out conductor 52*a*. However, it will be recalled that as soon as a return supervision signal is received by the line circuit 16, the line lockout facilities in this line circuit operate to impress busy pulses on the conductor 52*a* in the time position 63*c* assigned to the line 32 and these busy pulses continue to be impressed upon the conductors 52*a* and 52*b* even though the circuit 202 in the finder 12*a* removes the busy pulses initially developed by the circuit 202 from the conductor 52*a*. Consequently, the finders and connectors of the system continue to receive busy pulses in the time position 63*c* assigned to the line 32 so that this line is busied to all the linkage of the system.

When finder pulses are no longer transmitted to the circuit 202, this latter circuit also functions to prevent the pulse input circuit 200 from accepting and transmitting therethrough multiplexer pulses 83*c* in the time position 63*c* assigned to the line 32. When multiplexer pulse transmission through the circuit 200 ceases, the +B switching circuit 201 responds by removing operating anode potential from the +B switch conductor 12*c* so that the link 12 is no longer operatively associated with the line 32 and the circuits controlled by the potential on the conductor 12*c*, in both the finder 12*a* and the connector 12*b*, are returned to their initial or quiescent condition.

Since the line lockout facilities in the line circuit 16 continue to impress busy pulses on the conductor 52*a* in the time position 63*c* assigned to this line, none of the finder-connector links of the system can thereafter become operatively associated with the line 32 since the pulse input circuits 200 of the finders in these links are prevented from accepting multiplexer pulses 83*c* appearing in the time position 63*c* assigned to the line 32. Accordingly, even though a calling condition exists on the line 32, this line is locked out of service after the link 12 is released in the manner described above and the line 32 remains in a line lockout condition until the calling condition of this line ceases. However, as soon as the calling condition on the line 32 is terminated so that the loop circuit including the conductors of this line is broken, the line lockout facilities in the line circuit 16 respond to termination of the calling condition by removing busy pulses from the conductor 52*a* in the time position 63*c* so that the line 32 is no longer busied to the linkage of the system. If a calling condition is produced on the line 32 after the line lockout condition in the line circuit 16 has been removed, i.e., after the loop circuit including the conductors of the line 32 has been broken, the line circuit 16 functions in a manner identical to that described above to seize one of the finder-connector links of the system and becomes operatively associated therewith in the manner described above, and the line lockout facilities in the line circuit 16 do not again function to busy the line 32 to the linkage of the system until a return supervision signal is received by the line circuit 16 indicating that the line 32 is again operatively associated with one of the finder-connector links of the system.

If the dialing operation at the calling substation A′ is initiated and the first impulse of the first digit is transmitted over the calling line 32 before the end of the above described link timeout interval, the circuit 301 is arranged to respond thereto by reinitiating the link timeout interval so that no link release signal is impressed upon the conductor 12*h* and the link 12 is not released, but instead remains operatively associated with the calling line 32. In this connection, it will be understood that two digits of dial impulses must be dialed into the connector 12*b* in order to effect selection in the connector of the pulse time position assigned to the called line, which, in a revertive call, is the same time position as that assigned to the calling line, and a third successive digit called a party line digit, must be dialed into the connector 12*b* in order to effect selection on a decimal basis of a particular party line ringing signal assigned to the called substation B′ having the assigned directory number designation "322." More specifically, the directory number digits, "3," "2," and "2" must be dialed successively into the connector 12*b* to effect selection of the pulse time position 63*c* and the code #2 party line ringing signal assigned to the called substation B′. During the open circuit period of each dial impulse, the control bias supplied by the line circuit 16 to the gate circuit of the multiplexer 11 which corresponds to the calling line 32 is returned to its on hook value to interrupt the transmission of multiplexer pulses 83*c* over the conductor 50 to the pulse input circuit 200 of the finder 12*a* and to the in gate circuits 223 and 207 of the connector 12*b*.

During the make period of each impulse dialed at the calling substation A′, multiplexer signal pulse transmission from the multiplexer 11 to the finder 12*a* and the connector 12*b* in the pulse time position 63*c* is resumed. As controlled by the finder gate pulses delivered to the circuits 207 and 208 from the circuit 202 over the conductor 12*d*, the circuits 207 and 208 function to repeat any intelligence or control signals derived from the calling line 23 to the dial impulse integrator circuit 209. This latter circuit differentiates between intelligence modulated multiplexer pulses and dial impulse modulated multiplexer pulses in such manner that only the latter appear at the output terminals of this circuit. More specifically, during each dial impulse generated at the calling substation A', the impulse integrator circuit 209 develops coincident impulses which are impressed upon the tens, units and party inverter circuits 260, 261 and 262 over the conductor 227.

Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit "3" at the calling substation. However, the tens register pulser 210 responds to these three impulses, repeated thereto by the tens inverter circuit 260 over the conductor 231, by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the positive tens pulse conductor 32*c* in the third tens pulse time position 74*a* of each pulse frame, may be transmitted through the third tens gate of this register and over the conductor 232 to the connector pulse forming circuit 217.

Transmission of the three register drive impulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube in the network 225 beyond cutoff, such that dial tone transmission through this gate tube to the calling line out gate circuit 226 over the conductor 244 is terminated. Thus, transmission of the dial tone signal to the calling substation A' is arrested.

During the interdigit pause which separates dialing of the first and second digits at the calling substation, the tens sequence timing circuit 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

At the same time that the first register drive pulse is repeated to the tens digit register 211 to drive this register off normal, the tens sequence timing circuit 212 develops a restart pulse on the conductor 212*a* which is transmitted over this conductor to the link timeout and release circuit 301 in the connector 12*b*. This restart pulse is an indication that the call is proceeding in a normal manner and that the first impulse of the first digit has been transmitted over the calling line. Accordingly, the circuit 301 is informed that the link 12 should be held operatively associated with the calling line 32 to permit completion of the call and responds to the restart pulse transmitted thereto over the conductor 212*a* by reinitiating the link timeout interval. In this connection, it will be understood that the first impulse of the first digit must be dialed before the end of the first link timeout interval otherwise the circuit 301 will consider that the call is not proceeding in a normal manner and will release the link 12 by developing the above described link release signal on the conductor 12*h*. However, if the first impulse of the first digit is completed within the first link timeout interval, the circuit 301 starts the link time out interval over again so that a link release signal will not be produced on the conductor 12*h* until the end of a second link timeout interval, which, as described above, has a duration of from two to four minutes. Accordingly, the calling subscriber at the substation A' is given a period of from two to four minutes in which to start dialing of the first digit after he comes off hook to initiate the call, and, if he does not initiate dialing of the first digit within this link timeout interval, the link 12 is released, since such a prolonged delay on his part is considered equivalent to a permanent calling condition on the line 32.

During dialing of the second digit "2" at the calling substation A', the dial impulse integrator circuit 209 responds by transmitting two impulses to each of the inverter circuits 260, 261, and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions 63*a*, 63*b*, 63*c*, etc., to the connector pulse forming circuit 217 over the conductor 245. The two pulses repeated to the units sequence timing circuit 216 over the conductor 236 serve to condition this circuit for operation at the end of the second digit.

During the interdigit pause which separates dialing of second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also applied over the conductor 235 to the party inverter circuit 262 to render this circuit operative to repeat impulses delivered thereto from the dial impulse integrator circuit 209 during the third digit to the party register pulser 263 and the party sequence timing circuit 264 over the conductor 237. The potential impressed upon the conductor 235 is also supplied to the revertive call test circuit 296 to render this circuit operative to perform the functions described below in the event that a revertive call is in progress.

In the event that the calling party at the substation A' leaves the receiver off hook after the first digit is dialed and does not complete the call by dialing the second digit, the link timeout and release circuit 301 functions at the end of the second link timeout interval to develop a link release signal on the conductor 12*h* which is transmitted to the finder 12*a* and has the effect of releasing the link 12 in the manner described above. However, if the first impulse of the second digit is dialed in the normal manner and before the end of the second link timeout interval, the units sequence timing circuit 216 functions to develop a second restart pulse on the conductor 212*a* which is transmitted to the circuit 301 and indicates that the second digit has been dialed in a normal manner and without a prolonged delay. The circuit 301 responds to this second restart pulse on the conductor 212*a* by reinitiating the link timeout interval so that the link 12 will not be released until after a third timeout period of from two to four minutes.

The connector pulse forming circuit 217 operates to mix the tens and units pulses respectively transmitted thereto from the registers 211 and 215 over the conductors 232 and 245 to produce a resultant connector pulse which appears on the conductors 239, 239*a*, 239*b* and 239*c*. More specifically, the tens pulses 74*a* appearing on the positive tens pulse conductor 32*c* and gated by the tens digit register 211 are transmitted to the connector pulse forming circuit 217 over the conductor 232 where they are mixed with the positive units pulses appearing in the time position 63*a*, 63*b*, 63*c*, etc., which are gated by the units register 215 and transmitted to the circuit 217 over the conductor 245. Mixing of these pulses in the circuit 217 results in the production of a connector pulse which occurs during each pulse frame in the pulse time position 63*c* assigned to the called line. These pulses are transmitted over the conductor 239 to the connector components 224 and 283, over the the conductor 239*b* to the connector component 220, and over the conductor 239*c* to the connector components 222 and 296. The connector pulse forming circuit 217 also operates to select one of the commutator drive pulses 96*a* which occurs in the time position 63*c* assigned to the called line and these selected narrow commutator drive pulses which may be called busy test pulses, are transmitted to the busy test circuit 218 over the conductor 239*a*.

In order to determine whether the call is revertive or non-revertive, there is provided facilities for comparing the time position assigned to the calling line with the time position assigned to the called line. When the time positions of the calling and called lines coincide, a revertive call is indicated since each line is individually assigned a different time position in each pulse frame. More specifically, there is provided the revertive call test circuit 296 which, in the illustrated embodiment, is jointly controlled by the finder gate pulses appearing on the conductor 12*d* and connector pulses developed by the circuit 217 on the conductor 239*c*. On a revertive call, the pulses appearing on the conductor 12*d* and the pulses appearing on the conductor 239*c* occur in the same time position, i.e., the time position 63*c* assigned to the revertive calling line 32, when successive digits of "3" and "2" are dialed into the connector 12*b*.

The potential impressed upon the conductor 235 by the circuit 216 at the end of the second digit, is converted into an enabling bias potential of relatively short duration in the revertive call test circuit 296. As controlled by this enabling bias potential, the circuit 296 responds to coincidence of the pulses appearing on the conductors 12*d* and 239*c* by assuming a revertive call condition wherein a controlling potential is impressed upon the conductor 296*a*. This potential is transmitted to the calling line out gate circuit 226, the revertive call busy tone gate circuit 298, the busy test circuit 218, the revertive call tone gate circuit 297, the calling line in gate circuit 207 and the code start circuit 268 to condition these circuits for proper operation in setting up a revertive call. Also, when the circuit 296 assumes a revertive call condition, it operates to transmit a revertive hold signal over the conductor 12*f* to the finder 12*a* to prevent this finder from releasing the link 12 when the calling party hangs up and multiplexer pulses 83*c* in the time position assigned to the line 32 cease to be transmitted to the finder 12*a*. The revertive call test operation is completed by the circuit 296 before the end of the third digit, so that if the call is non-revertive, the normal operations of busy testing, cut through, trunk hunting, etc., may be performed in the connector 12*b*. Also, the trunk hunting operation is not performed until after the third digit so that the revertive call test operation and the normal busy test operation and trunk hunting operation do not conflict.

During dialing of the third digit "2" at the calling substation A′, the dial impulse integrator circuit 209 responds by transmitting two impulses to each of the inverter circuits 260, 261 and 262. As noted above, however, the tens and units register pulsers 210 and 214 are now prevented from responding to these pulses. Thus, only the party inverter circuit 262 repeats the two impulses to the party register pulser 263 over the conductor 237 and the latter circuit responds to these impulses by developing corresponding regsister drive pulses which are supplied over the conductor 240 to the party digit register 265 and the party sequence timing circuit 264. As a consequence, the party digit register is operated or driven to open a second party gate circuit therein, thereby to establish a path for the transmission of the interrupted ringback tone signal (Fig. 11 (14)), which corresponds to the code #2 party line ringing signal assigned to the called substation B′, over the conductor 275 to the ringback tone gate tube in the network 225.

At the end of the third digit dialed into the connector 12*b* the party sequence timing circuit 264 assumes a stable operating condition wherein a controlling potential is impressed upon the conductor 242 to bias the party register pulser 263 against development of register drive pulses in response to further impulses developed on the line 32. This controlling potential is also supplied to the trunk hunting control circuit 283, the busy test circuit 218 and the busy lock circuit 219 to render these circuits operative to perform their respective functions as will be described in more detail hereinafter.

If the third digit is not initiated before the end of the third link timeout interval, the circuit 301 functions to develop a link release signal on the conductor 12*h* which is transmitted to the finder 12*a* and has the effect of releasing the link 12 in a manner described heretofore. However, if the third digit is initiated before the end of the third link timeout interval, a condition which indicates that the call is proceeding normally, the party sequence timing circuit 264 functions to develop a third restart pulse on the conductor 212*a* which is transmitted to the circuit 301. The circuit 301 responds to this third restart pulse by reinitiating the link timeout interval so that a link release signal will not be produced on the conductor 12*h* until after a fourth link timeout period of from two to four minutes after the third digit is initiated.

Effectively, the busy test circuit 218 and the busy lock circuit 219 cooperate to perform the normal or non-revertive busy test operation in the connector 12*b*. More specifically, if the called line is busy, i.e., occupied with a call, busy pulses are present on the common busy pulse in conductor 52*b* in the time position assigned to the called line. These busy pulses are impressed upon the busy test circuit 218 simultaneously with commutator drive pulses 96*a* appearing in the time position 63*c* assigned to the selected line 32, which are impressed upon the busy test circuit 218 over the conductor 239*a*. Coincidence between these selected commutator drive pulses and the busy pulses normally has the effect of preventing the busy test circuit from operating so that the busy condition of the called line is indicated.

On a revertive call, the finder 12*a* develops busy pulses in the time position 63*c* assigned to the calling line 32 and the connector pulse forming circuit 217 responds to the first two digits of "3" and "2" by producing connector pulses in the same pulse time position. Accordingly, for a revertive call the busy test circuit 218 under normal operation would always indicate that the called line is busy and the call would be blocked at this point in the system.

In order to prevent blocking of the revertive call in the busy test circuit 218, there is provided means responsive to the revertive call test operation for so controlling the busy test operation that the revertive call may be completed. More specifically, the controlling potential produced on the conductor **296*a* by the revertive call test circuit 296 when a revertive call is in progress, is employed in the busy test circuit 218 to shift this circuit to a revertive call setting in which the busy test circuit 218 operates to impress a positive cut through potential on the conductors 251 and 251*a*, irrespective of any busy pulses present on the busy pulse in conductor 52*b*. The cut through potential impressed upon the conductor 251*a* is applied to the busy lock circuit 219 to prevent this latter circuit from operating at the end of the normal or non-revertive busy test interval. At the same time, the circuit 218 impresses a cut through potential on the conductor 289 which blocks the units register advancer 281** from responding to trunk hunting drive pulses with the result that the trunk hunting facilities are disabled upon cut through for either revertive or non-revertive calls.

The cut through potential impressed upon the conductor 251 is also transmitted to the called line out gate circuit 224 to condition this circuit to repeat connector signal pulses in the time position **63*c* to the distributor 15, these connector signal pulses being employed to transmit a ringing control signal to the line circuit 16 associated with the revertive calling line 32. In this connection it will be recalled that the calling line out gate circuit 226 is blocked by the potential produced on the conductor 296*a* when the revertive call test circuit 296 assumes a revertive call condition. Accordingly, it is necessary to use the called line out gate circuit 224 for pulse transmission in the time position 63*c*** at this stage in the revertive call.

In order to prevent speech transmission through the link 12 during a revertive call, the cut through potential produced on the conductor 251 is also transmitted to the calling line in gate circuit 207 and is employed to block both this circuit and the calling line reconstructor circuit 208 so as to prevent speech transmission in the calling-to-called line direction during a revertive call. Since the calling line out gate circuit 226 is blocked incident to the revertive call test operation, speech transmission in both directions through the link 12 is cut off after cut through.

The cut through potential impressed upon the conductor 251 is also transmitted to the code start circuit 268, the busy pulse gate circuit 220 and the ring trip circuit 221 to condition these circuits to perform their respective functions in setting up either a revertive or a non-revertive call. Also, this potential is transmitted to the revertive call busy tone gate circuit 298 to condition this circuit to gate a revertive busy tone signal to the called line out gate circuit 224.

The circuit 224 remains unblocked after cut through for both revertive and non-revertive calls and respond to connector pulses delivered thereto over the conductor 239 and commutator drive pulses **96*a* delivered thereto over the conductor 35, by transmitting over the conductor 51 to the distributor 15 connector signal pulses which are modulated in accordance with the revertive busy tone signal and occur in the time position 63*c* assigned to the revertive calling line 32. The distributor 15 responds to the connector signal pulses thus transmitted thereto by repeating the same through the gate circuit thereof associated with the line circuit 16, reconstructing the revertive busy tone signal and transmitting the reconstructed revertive busy tone signal to the line circuit 16. In the line circuit 16, the revertive busy tone signal is transmitted over the line 32** to signal the calling party at the substation A′ that a revertive call is in progress and that he should hang up for a short period of time while his line is being rung in accordance with the party line ringing signal assigned to the called substation B′ and then come back off hook to complete the revertive call. In the illustrated embodiment wherein semi-selective harmonic ringing is employed, both substations A′ and B′ respond to the same harmonic ringing frequency and hence the calling subscriber at the substation A′ will hear the party line ring and will know by termination of ringing that the call has been answered at the substation B′ and that he should come back off hook.

When the calling subscriber at the substation A′ hangs up in response to the above described revertive call busy tone signal, the loop circuit including the conductors of the line 32 is broken and the line circuit 16 immediately operates to increase the bias potential on the conductor **45*b* so that the corresponding gate circuit of the multiplexer 11 is closed and transmission of multiplexer pulses over the conductor 50 in the time position 63*c* assigned to the line 32 is terminated. At the same time, the increase in negative bias potential on the conductor 45*b* causes the line lockout facilities in the line circuit 16 to be disabled so that the busy pulses initially impressed by these facilities on the conductor 52*a* are removed from this conductor when the loop circuit including the conductors of the line 32 is broken. However, it will be recalled that the finder 12*a* is still operatively associated with the calling line 32 and continuous to impress busy pulses on the conductor 52*a* from the finder pulse and busy pulse combining circuit 202 thereof so that even though the line lockout facilities of the line circuit 16 cease to indicate that the line 32 is busy, the finder 12*a*** continues to busy this line to the linkage of the system.

Normally, the finder **12*a* responds to cessation of multiplexer pulse transmission in the time position assigned to the seized calling line by releasing the link 12 after a predetermined time interval determined by the +B switching circuit 201 therein. However, in order to prevent the link 12 from releasing in response to multiplexer pulse termination when the calling subscriber hangs up to permit completion of a revertive call, there is provided means for holding the finder operatively associated with the calling line 32 independently of multiplexer pulse transmission in the time position 63*c*. More specifically, when the revertive call test circuit 296 in the connector 12*b* indicates that a revertive call is being made, a revertive call hold signal is transmitted over the conductor 12*f* to the +B switching circuit 201 in the finder 12*a* so as to prevent this circuit from releasing the link 12 in response to cessation of multiplexer pulse transmission in the time position 63*c*. As a result, the coincidence tube circuits 203 and 204 in the finder 12*a* remain at a setting corresponding to the line 32, the circuit 202 in the finder 12*a* continues to impress busy pulses on the conductor 52*a* in the time position 63*c* assigned to the line 32 to prevent other links from seizing the line 32 and continues to impress finder gate pulses on the conductor 12*d* in the time position 63*c* to hold the connector 12*b* operatively associated with the finder 12*a*, the +B switching circuit 201 continues to supply operating potential over the conductor 12*c* to the indicated circuits of the connector 12*b* so that the settings of these circuits will not be destroyed, and the pulse input circuit 200 in the finder 12*a* continues to be conditioned so as to accept only multiplexer pulses which occur in the time position 63*c* assigned to the line 32. As a result, the finder 12*a* remains in a condition to respond to multiplexer pulse transmission in the time position 63*c* when the revertive call is answered at the calling or called substation and multiplexer pulse transmission in the time position 63*c*** is again resumed.

In order that the line 32 will not be rung until the calling subscriber has hung up, there is provided means responsive to the transmission of a first disconnect signal over the calling line for initiating ringing on a revertive call. More specifically the +B switching circuit 201 in the finder 12*a* is arranged to change the potential on the conductor 12*e* when the calling subscriber hangs up, i.e., when a first disconnect signal is transmitted over the calling line 32. This change in potential on the conductor 12*e*, which may be called a revertive ring start signal, is transmitted to the code start circuit 268 in the connector 12*b*.

The code start circuit 268 is jointly controlled by the cut through potential produced on the conductor 251, the revertive call test potential produced on the conductor 296*a*, and the code start pulses produced on the conductor 5, and responds to the revertive ring start signal produced on the conductor 12*e* by developing a control potential on the conductor 241 in response to the code start pulse which occurs immediately following initiation of the revertive ring start signal on the conductor 12*e*. The control potential impressed upon the conductor 241 is transmitted to the ringback tone gate tube in the network 225 so as to render this tube operative to gate therethrough the interrupted ringback tone signal corresponding to the code #2 party line ringing signal which is selected in the party digit register 265.

The ringback tone signal which is interrupted or keyed in accordance with the ringing intervals of the code #2 ringing signal assigned to the called substation B′, and which is gated by the ringback tone gate circuit in the manner described above, is used to control the ringing operation at the line circuit 16 and the transmission of ringing current over the revertive calling line 32. Thus, the interrupted ringback tone signal gated by the ringback tone gate circuit is rectified to reproduce the code #2 party line ringing signal originally developed in the harmonic ringing code forming circuit 99 consisting of two short ringing pulses. These ringing pulses are supplied as positive pulses over the conductor 295 to the called line out gate circuit 224 for the duration of each positive ringing pulse. The called line out gate circuit 224 is thus controlled to release connector signal pulses to the distributor 15 in the pulse time position 63*c* which are approximately 50% larger in amplitude than those used normally to convey intelligence signals to the distributor 15 during non-revertive calls. These large amplitude signal pulses are diverted by the distributor 15 to the line circuit 16 and serve to control the ringing control facilities in this line circuit. More specifically, the large amplitude connector signal pulses which appear on the conductor 51 during ringing intervals of the selected party line ringing signal are detected in the distributor 15 so as to reproduce the ringing pulses and the ringing pulses are impressed upon a line ringing circuit in the line circuit 16. Opening of the line ringing circuit of the line circuit 16 during each ringing pulses results in the transmission of ringing current over the revertive calling line 32 during each short ringing pulse interval. Since the ringing pulses 170 and 171 (Fig. 11 (2)) occur during the first ringing period when a 66⅔ c.p.s. ringing current is impressed upon the common ringing cable 61, the frequency of the ringing current transmitted to the line 32 during these two short ringing intervals is 66⅔ c.p.s. As discussed generally above, the substations A′ and B′ associated with the line 32 are both provided with ringing facilities which respond to 66⅔ c.p.s. ringing current so that both ringers at these substations are rung for two short pulses during the first ringing period of each harmonic ringing cycle.

The above described operations of busy testing, cut through and ringing of the revertive calling line all take place after the end of the third digit dialed into the connector 12*b*. However, as stated above, the link timeout and release circuit 301 starts a fourth link timeout interval after the third digit is initiated, this interval lasting for a period of from two to four minutes. If the above described operations of busy testing, cut through and initiation of ringing take place in the normal manner, the code start potential developed by the circuit 268 on the conductor 268*a*, which it will be recalled is developed just prior to initiation of ringing, will be produced before the end of the fourth link timeout interval. This code start potential on the conductor 268*a* is also transmitted to the link timeout and release circuits 301 and the circuit 301 responds thereto by reinitiating the link timeout interval and starting a fifth timeout period of from two to four minutes' duration. Accordingly, if the operations of busy testing, cut through and initiation of ringing take place in a normal manner and without prolonged delay, no link release pulse will be produced on the conductor 12*h* for another period of from two to four minutes after ringing is initiated. It will be noted that this feature of reinitiating the link timeout interval concurrently with the initiation of ringing is particularly important in the case of revertive calls since a considerable time period may elapse before the calling party responds to the revertive call busy tone signal by hanging up so that revertive ringing can be initiated. If the link timeout interval is not reinitiated when revertive ringing starts a substantial portion of this link timeout interval would be taken up by the calling party before ringing is initiated and insufficient time would be provided for revertive ringing. However, with the described arrangement, the link timeout interval is reinitiated when ringing starts so that a full interval of from two to four minutes is provided during which the revertive calling line may be rung.

Ringing of both the party line substations A′ and B′ persists until the call is answered at one of these substations or until the call is abandoned. However, on a revertive call, the link 12 is held operatively associated with the line 32 independently of whether or not a calling condition exists on the line so that the revertive call may be completed after the calling party hangs up. Accordingly, if the revertive call is abandoned at the calling substation A′ and is not answered at the called substation B′ the ringers at these substations would continue to be rung indefinitely.

In order to prevent the linkage of the system from being tied up in unanswered calls, both revertive and non-revertive, the link timeout and release circuit 301 is arranged to release the link 12 a predetermined time interval after ringing is initiated. More specifically, if either a revertive or a non-revertive call is not answered by the end of the fifth link timeout interval, which is initiated when ringing starts, the circuit 301 develops a link release signal on the conductor 12*h* which is transmitted to the finder 12*a*. However, as described above, on a revertive call the revertive call test circuit 296 assumes a revertive call condition in which a revertive call hold signal is transmitted over the conductor 12*f* to the +B switching circuit 201 in the finder 12*a* so as to prevent this circuit from releasing the link 12 in response to cessation of multiplexer pulse transmission in the time position 63*c*. Accordingly, even though a link release signal is transmitted over the conductor 12*h* to the finder 12*a*, the concurrent production of a revertive call hold signal on the conductor 12*f* prevents the +B switching circuit 201 from releasing so that the finder 12*a*, and hence the link 12 remains operatively associated with the line 32.

In order to permit the link 12 to be released in response to the link release signal transmitted over the conductor 12*h* when ringing persists after the fifth link timeout interval, indicating that the call is not being answered, the circuit 301 transmits a control signal over the conductor 253*a* to the ring trip circuit 221 at the end of the fifth link timeout interval and the circuit 221 responds to this control signal by developing a ring trip potential on the conductor 253 which is transmitted to the revertive call test circuit 296 and has the effect of removing the revertive call hold signal from the conductor 12*f*. More specifically, the ring trip circuit 221 is enabled by the cut through potential developed on the conductor 251 and responds to the control signal impressed upon the conductor 253*a* by the circuit 301 by developing a ring trip potential on the conductor 253 which is transmitted over this conductor to the revertive call test circuit 296. When the revertive call hold potential is removed from the conductor 12*f*, the +B switching circuit 201 in the finder 12*a* is then conditioned to respond to an absence of multiplexer pulse transmission through the pulse input circuit 200. Since the circuit 301 functions to impress a link release signal on the conductor 12*h* at the end of the fifth link timeout interval and this link release signal persists thereafter, the pulse input circuit 200 in the finder 12*a* is thereby prevented from transmitting multiplexer pulses therethrough, as described generally heretofore, so that the +B switching circuit 201 is permitted to release the link 12 by removing operating anode potential from the conductor 12*c*. As a result, the link 12 is released from the revertive calling line 32 when the revertive call remains unanswered for the duration of the fifth link timeout interval which is initiated when revertive ringing starts.

Assuming that the revertive call is answered at either the substation A' or the substation B' during the fifth link timeout interval, the line circuit 16 functions to change the magnitude of the bias potential supplied over the conductor 45*b* to the multiplexer 11 with the result that the gate circuit assigned to the line circuit 16 in the multiplexer 11 is opened to permit multiplexer pulses 83*c* occurring in the time pulse position 63*c* of each pulse frame to be transmitted through the multiplexer 11 and over the conductor 50 to the multiplexer input terminals of each of the finders and connectors of the system. When the negative bias potential on the conductor 45*b* is decreased in the line circuit 16, the line lockout facilities in this line circuit respond thereto by again developing busy pulses on the conductor 52*a* in the time position 63*c* assigned to the line 32. In this connection it will be understood that after the cut through operation is performed in the manner described above, the called line out gate circuit 224 is opened and develops connector signal pulses on the conductor 51 in the time position 63*c* assigned to the line 32. These connector signal pulses are thus continuously transmitted over the conductor 51 to the distributor 15 after the cut through operation is completed so that the line lockout facilities are continuously conditioned to respond to changes in bias potential on the conductor 45*b* after cut through is effected in the connector 12*b*.

The multiplexer pulses 83*c* appearing on the conductor 50 are impressed upon the calling and called line in gate circuits 207 and 223 of the connector 12*b*. As described above, the circuit 207 is blocked by the cut through potential developed on the conductor 251 when the revertive call is in progress, so that these multiplexer pulses are not transmitted through the circuit 207. However the called line in gate circuit 223 is enabled by the potential developed on the conductor 268*a* by the code start circuit 268. Accordingly, in the called line in gate circuit 223, the multiplexer pulses 83*c* occur in time coincidence with the connector pulses impressed upon this circuit over the connector pulse conductor 239*c* from the connector pulse forming circuit 217. As a consequence, the call answering signal carried thereby is gated by the circuit 223 and is impressed upon the reconstructor circuit 222 wherein it is detected to produce a potential on the conductor 252 which is transmitted to the ring trip circuit 221.

The ring trip circuit 221 is arranged to respond to the potential developed on the conductor 252 by developing a ring trip potential on the conductor 253. This ring trip potential is identical to the potential produced on the conductor 253 by the circuit 221 in response to a control signal impressed upon the conductor 253*a* by the link timeout and release circuit 301. However, it will be understood that if the revertive call is answered during the fifth link timeout interval which is initiated when ringing starts, the ring trip circuit 221 responds to the above described call answering potential on the conductor 252 since this potential is produced before the circuit 301 impresses a control signal on the conductor 253*a*.

The link timeout and release circuit 301 normally operates to develop a link release signal on the conductor 12*h* at the end of each link timeout interval. However, when the revertive call is answered and the revertive call connection is completely set up, it is desirable to release the link 12 from the revertive calling line 32 since the talking circuit for a revertive call does not require the finder-connector link 12 and the line lockout facilities in the line circuit 16 will continue to busy the line 32 to the other linkage of the system for the duration of the revertive call. Accordingly, there is provided means for releasing the link 12 in response to answering of the revertive call. More specifically, the link timeout and release circuit 301 responds to the potential developed on the conductor 296*a* by the revertive call test circuit 296 during the revertive call and the ring trip potential developed on the conductor 253 by the circuit 221 when a revertive call answering signal is developed on the conductor 252, by developing a link release signal on the conductor 12*h* independently of the link timeout interval normally established by the circuit 301. Accordingly, shortly after the revertive call is answered the circuit 301 impresses a link release signal on the conductor 12*h* which is coupled to the finder 12*a* and has the effect of releasing the link 12 in the manner described above.

The ring trip potential developed on the conductor 253 by the circuit 221 in response to a call answering signal on the conductor 252, is also impressed upon the circuits 282, 284, 296 and 297. The revertive call tone gate circuit 297 responds to this ring trip potential by gating a revertive tone signal of relatively short duration, which is derived from the revertive call tone generator 29*g* in the common equipment 17 by way of the conductor 49*b*, to the called line out gate circuit 224. The circuit 224 remains unblocked after cut through and transmits connector signal pulses in the time position 63*c* which are modulated in accordance with the revertive tone signal to the distributor 15 over the conductor 51. This revertive tone signal is reconstructed in the distributor 15 and transmitted by way of the line circuit 16 to the line 32. If the called subscriber at the substation B' has answered the revertive call, this revertive tone signal informs him that he is involved in a revertive call and that he should wait for the calling party to come back on the line. On the other hand, if the calling subscriber at the substation A' answers first, this revertive tone signal informs him that the called party has not yet answered and that he should give the called party time to get to his receiver. It will be understood that the described revertive tone signal lasts for only a second or two and that conversation over the line 32 is permitted as soon as this signal is terminated.

In order to permit the transmission of the above described revertive tone signal over the line 32 in response to answering of the revertive call, the circuit 301 is provided with means for introducing a time delay of a few seconds between the time when a ring trip potential is developed on the conductor 253 when the revertive call is answered and the time at which the circuit 301 develops a link release signal on the conductor 12*h*. As a result, the link 12 is held operatively associated with the revertive calling line 32 for a period of time sufficient to permit transmission over this line of the above described revertive call tone signal.

Following the described revertive call operations in the connector 12*b*, a two way talking circuit over the line 32 between the substations A' and B' is established. Thus, voice or other signals developed at either one of these substations are transmitted over the conductors of the line 32 to the receiver at the other substation so that a direct wire talking circuit between substations is provided.

The ring trip potential on the conductor 253 is impressed upon the revertive call test circuit 296 when the revertive call is answered and the circuit 296 responds thereto by changing the potential on the revertive call hold conductor 12*f*. Accordingly, the finder 12*a* is conditioned to respond to the link release signal transmitted to this finder over the conductor 12*h* by the circuit 301 a few seconds after the ring trip potential is produced on the conductor 253 with the result that the link 12 may be completely released from the revertive calling line after the revertive call is answered. In this connection, it will be recalled that the line lockout facilities in the line circuit 32 respond to completion of the loop circuit including the conductors of the line 32 when the revertive call is answered by impressing busy pulses on the conductor 52*a* in the time position 63*c* assigned to the line 32 so that this line is guarded against intrusion on a call incoming thereto during the revertive call. However, when the revertive call is completed and both the calling and called parties have hung up, the loop circuit including the conductors of the line 32 is broken so that the bias potential on the conductor 45*b* is changed to a relatively large negative value and the line lockout facilities in the line circuit 16 respond to this increase in negative bias potential by removing busy pulses from conductor 52*a* in the time position 63*c* assigned to the line 32. As a result, the line 32 is returned to its normal condition and is capable of seizing another finder-connector link as soon as a calling condition is again produced on the line 32.

*Line lockout operation on a non-revertive call*

Considering now the placement of a non-revertive call from the substation A associated with the line 23 to the substation B′ associated with the line 32, when the loop circuit including the conductors of the line 23 is closed to the line circuit 10, the bias potential on the conductor 53*b* is changed and the multiplexer 11 responds thereto by impressing multiplexer pulses 84*b* in the time position 64*b* assigned to the line 23 on the common conductor 50. These multiplexer pulses effect the seizure of the finder 12*a* and operative association of the link 12 with the calling line 23 in a manner similar to that described above in connection with the line 32. When operating anode potential is transmitted over the conductor 12*c* to the connector 12*b*, the controlled circuits in this connector are conditioned in the manner described above to set up the non-revertive call. Also, when finder gate pulses are transmitted from the finder 12*a* over the conductor 12*d* to the calling line out gate circuit 226 in the connector 12*b* this circuit responds by transmitting connector signal pulses over the conductor 51 to the distributor 15 and through the gate circuit in this distributor corresponding to the line 23 to the line circuit 10. The line lockout facilities in the line circuit 10 respond to this return supervision signal by assuming a line lockout condition wherein busy pulses are impressed upon the common busy pulse out conductor 52*a* in the time position 64*b* assigned to the line 23. Also, as soon as operating anode potential is impressed upon the conductor 12*c*, a dial tone signal is transmitted by way of the calling line out gate circuit 226 to the line 23 to signal the calling subscriber that dialing may be initiated.

If, for any reason whatever, dialing is not initiated at the calling substation A before the end of the first link timeout interval of from two to four minutes, the link timeout and release circuit 301 in the connector 12*b* functions to impress a link release signal on the conductor 12*h* at the end of this link timeout interval so that the link 12 is released in the manner described above. Since the line lockout facilities in the line circuit 10 have assumed a line lockout condition wherein busy pulses are impressed upon the conductor 52*b*, the line 23 is held out of service until the calling condition disappears from the line. However, if the first digit is initiated before the end of the first link timeout interval, the tens sequence timing circuit 212 functions to impress a restart pulse on the conductor 212*a* which is transmitted to the circuit 301 and has the effect of reinitiating the link timeout interval.

In the same manner, if dialing is delayed between the first and second digits for a period of from two to four minutes, the link timeout and release circuit 301 functions to release the link 12 at the end of this period. However, if the second digit is initiated before the end of the second link timeout interval, another restart pulse is transmitted over the conductor 212*a* to the circuit 301 and has the effect of reinitiating the link timeout interval.

The connector 12*b* responds to the first two digits "3" and "2" dialed at the calling substation A in substantially the same manner as that described above in connection with the revertive call and the connector pulse forming circuit 217 develops connector pulses in the time position 63*c* assigned to the called line 32. However, these connector pulses do not coincide with the finder gate pulses which are developed on the conductor 12*d* by the circuit 202 in the finder 12*a*. As a result, the revertive busy test circuit 296 is not operated and the potential on the conductors 296*a* and 12*f* does not change. Furthermore, the enabling bias potential derived from the conductor 235 at the end of the second digit does not persist after the end of the third digit. Accordingly, if coincidence between finder gate pulses and connector pulses does occur during the trunk hunting operation, the revertive busy test circuit 296 will not respond thereto and a false revertive busy test indication is avoided. Since the potential on the conductor 296*a* does not change during a nonrevertive call, the calling line out gate circuit 226 and the calling line in gate circuit 207 remain open for the duration of the call.

If the third digit is not initiated before the end of the second link timeout interval, the circuit 301 responds by impressing a link release signal on the conductor 12*h* so that the link 12 is released at the end of the second link timeout interval. However, if the third digit "2" is initiated before the end of the second link timeout interval, another restart pulse is transmitted by the circuit 264 over the conductor 212*a* to the circuit 301 and this circuit responds to this restart pulse by reinitiating the link timeout interval.

When the third digit of "2" is dialed into the connector 12*b*, the party digit register 265 is operated or driven to open the second party gate circuit therein so that the interrupted ringback tone signal corresponding to the code #2 party line ringing signal assigned to the substation B′ is transmitted over the conductor 275 to the network 225. Also, at the end of the third digit, the party sequence timing circuit 264 develops a busy test start potential on the conductor 242 which is transmitted to the trunk hunting control circuit 283, the busy test circuit 218 and the busy lock circuit 219, to initiate the trunk hunting and non-revertive busy test operation in the connector 12*b*.

If the called line 32 is busy, the busy pulses appearing on the conductor 52*a* coincide with the commutator drive pulses transmitted to the circuit 218 over the conductor 239*a* by the connector pulse forming circuit 217 with the result that the busy test circuit 218 is prevented from operating and the busy condition of the line 32 is indicated. It will be noted that since the potential on the conductor 296*a* does not change during a non-revertive call, the busy test circuit 218 remains fully operative to perform a normal busy test operation.

In the event the called line 32 is busy, the busy lock circuit 219, as controlled over the conductor 242 by the party sequence timing circuit 264, measures a predetermined time interval, i.e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator 29*a* by way of the conductor 46, the busy gate circuit in the network 225, the conductor 244, the calling line out gate circuit 226, the conductor 51, the distributor 15 and the line circuit 10 to the calling line 23. Thus, the calling subscriber is advised of the busy condition of the called line.

If, for any reason, the calling subscriber at the substation A does not respond to this busy tone signal by hanging up, the link timeout and release circuit 301 in the connector 12*b* functions at the end of the fourth link timeout interval, which it will be recalled is initiated at the start of the third digit, by impressing a link release signal on the conductor 12*h* which is transmitted to the finder 12*a* and has the effect of releasing the link 12 in the manner described above. Since the line lockout facilities in the line circuit 10 have assumed a line lockout condition, the line 23 is held out of service until the subscriber at the calling substation A again hangs up.

Assuming that the called line 32 is idle at the time the pulse time position 63*c* assigned thereto is selected in the connector in the manner explained above, such busy pulses as may be present on the common busy pulse in conductor 52*b* do not occur coincidently with the selected commutator drive pulses generated by the connector pulse forming circuit 217 in the pulse time position 63*c* assigned to the called line 32. When coincidence between the selected commutator drive pulses and the busy pulses is lacking, the busy test circuit 218 operates immediately the first commutator drive pulse appearing in the time position 63*c* is impressed thereon from the connector pulse forming circuit 217 over the conductor 239*a*. In operating, the circuit 218 impresses a positive potential upon the cut through conductor 251*a* which is applied to the busy lock circuit 219 to prevent the latter circuit from operating at the end of the busy test interval. The positive potential applied to the cut through conductor 251*a* in the busy test circuit 218 when this circuit operates is also applied to the units register advancer 281 over the conductor 289 to prevent this circuit from responding to trunk hunting drive pulses as will be described in more detail hereinafter. When the busy test circuit 218 operates, it also impresses a positive cut through potential upon the conductor 251 which is applied to the called line out gate circuit 224 to condition the latter circuit to repeat connector signal pulses in the time position 63*c* to the distributor 15 and is also applied to the busy gate circuit 220 so that connector pulses are released to the common busy pulse out conductor 52*a*. The cut through potential on the conductor 251 is also impressed upon the calling line in gate circuit 207. However, in the illustrated non-revertive call, the circuit 207 is not blocked since no change in potential on the conductor 296*a* is produced by the revertive busy test circuit 296 for non-revertive calls. The cut through potential is also impressed upon the revertive busy tone gate circuit 298 but since this circuit is also controlled by the potential on the conductor 296*a* no revertive busy tone signal is gated through the circuit 298. The cut through potential is also impressed upon the ring trip circuit 221 and the code start circuit 268 to condition these circuits to perform the functions described heretofore.

In the event the called line 32 tests busy and is a member of one of the private branch exchange trunk groups discussed generally heretofore, the trunk hunting facilities in the connector 12*b* operate to hunt for an idle trunk within the remaining lines in the called trunk group. Effectively, the trunk hunting control circuit 283, the tens register advancer 280, and the units register advancer 281 cooperate to perform the trunk hunting operation in the connector 12*b*. More specifically, if the called line 32 is busy, i.e., occupied with a call, busy pulses are present on the busy pulse in conductor 52*b* in the time position 63*c* assigned to the called line, and these busy pulses are impressed upon the trunk hunting control circuit 283 together with connector pulses which also appear in the time position 63*c* assigned to the called line, the connector pulses being impressed upon the circuit 283 over the conductor 239. Simultaneously with the transmission of busy pulses and connector pulses to the trunk hunting control circuit 283, the trunk marking pulses produced in the manner described generally above in connection with Fig. 12, are also impressed upon the trunk hunting control circuit 283 over the conductor 56*a*. Coincidence of the connector pulses, busy pulses and trunk marking pulses indicates that the called line is busy and is a member of a trunk group. The trunk hunting control circuit 283 responds to the coincidence between the connector pulses, the busy pulses, and the trunk marking pulses by developing a control potential which is transmitted over the conductor 288 to the units register advancer 281 to enable the advancer 281 to respond to trunk hunting drive pulses which are developed by the trunk hunting drive pulse generator 55 in the common equipment 17 and are transmitted to the units register advancer 281 over the conductor 55*a*. The units register advancer 281, once it is enabled, produces register drive pulses of uniform amplitude and duration in response to each trunk hunting drive pulse transmitted thereto over the conductor 55*a*, and each register drive pulse is transmitted to the units digit register 215 over the conductor 290. Each register drive pulse produced by the units register advancer 281 operates to advance the setting of the units digit register 215 by one time position so that the time position of the connector pulses produced on the conductor 239 by the connector pulse forming circuit 217 is advanced one unit's time position for each trunk hunting drive pulse impressed upon the enabled units register advancer 281. Each time the time position of the connector pulses is advanced by the units register advancer in the manner described above, the busy test circuit 218 compares the new time position of the connector pulses with the busy pulses which are impressed upon the busy test circuit 218 over the conductor 52*b*.

If the new time position of the connector pulses coincides again with the busy pulses impressed upon the conductor 52*b*, thereby indicating that the next line in the called trunk group is busy, the busy test circuit is prevented from operating and the units register advancer 281 continues to advance the setting of the units digit register under the control of the trunk hunting drive pulses until the connector pulses are shifted to a time position in which they do not coincide with busy pulses impressed upon the common busy pulse in conductor 52*a*, or, until the time position assigned to the last line in a called trunk group is reached, in which case no trunk marking pulse is present. Under these conditions, coincidence between the connector pulses, the busy pulses and the trunk marking pulses ceases so that the trunk hunting control circuit 233 removes the control potential from the conductor 288 thus preventing the units register advancer from responding to further trunk hunting drive pulses and terminating further increase in the setting of the units digit register 215. In the event the last line in the called trunk group is busy, the busy lock circuit 219 functions in the manner described above at the end of the busy test interval to feed a bias potential back over the conductor 248 which has the effect of positively locking the busy test circuit 218 from subsequent operation. However, the busy test interval is of sufficient duration to permit the trunk hunting facilities to advance the time position of the connector pulses in the manner described above through substantially the entire pulse time position frame, if necessary, before the busy lock circuit 219 operates to block up the connector and advise the calling subscriber of the busy condition of all of the lines in the called trunk group. It will also be understood that the link timeout interval, which it will be recalled is reinitiated after the end of the third digit, is considerably longer than the busy test interval so that the trunk hunting facilities are permitted to scan the time positions of the lines in the called trunk group and return a busy signal to the calling subscriber well before the end of the link timeout interval.

In order to provide for trunk hunting through a group of consecutive time positions which are positioned in different tens digit levels, facilities are provided in the units digit register 215 for recycling this register each time the register is driven beyond the setting of ten. Simultaneously therewith there is produced a control pulse in the units digit register 215 which is transmitted over the conductor 286 to the tens register advancer 280. The tens register advancer 280 responds to the pulse impressed thereon over the conductor 286 by advancing the setting of the tens digit register 211 by one tens pulse interval each time the units digit register 215 is recycled.

In order to provide for trunk hunting through a group of lines such as the 8th trunk group illustrated in Fig. 12, i.e., where some of the lines occur in the last tens digit level and other succeeding lines occur in the first tens digit level, tens digit register 211 is also provided with facilities for recycling this register after it has been advanced to a setting of ten.

Assuming again that the line 32 is idle when called, when the called line out gate circuit 224 is conditioned for operation through application of the above described potential to the cut through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 are gated by the connector pulses produced on the conductor 239 in the pulse time position **63*c* assigned to the called line 32, whereby very narrow connector signal pulses are released over the conductor 51 to the distributor 15 which are well within the limits of the pulse time position 63*c* assigned to the called line. However, it will be understood that until ringing of the called line is effected, the above described connector signal pulses, supplied to the distributor 15 in the pulse time position 63*c*, are ineffective to establish talking communication with any of the substations associated with the called line. The positive potential applied to the cut through conductor 251 is also impressed upon the ring trip circuit 221 to enable this circuit to terminate ringing at the proper time, as described above, and is applied to the code start circuit 268**.

When the cut through potential is impressed upon the conductor 251, the code start circuit 268 is conditioned to respond to the next code start pulse transmitted thereto over the conductor 5 from the code forming circuit 99. The code start circuit 268 is also controlled by the potentials on the conductors **296*a* and 12*e*. However, for a non-revertive call the potential on the conductor 296*a* does not change to its revertive call value and the potential on the conductor 12*e* does not change since a calling condition is continuously present on the calling line 23. Accordingly, the potentials on the conductors 296*a* and 12*e* are such that the code start circuit 268 develops a code start potential on the conductors 241 and 268*a*** in response to the first code start pulse after cut through.

The code start potential developed on the conductor 241 is transmitted to the ringback tone gate circuit in the network 225 and this circuit responds by gating therethrough the interrupted ringback tone signal developed on the conductor 275 in the manner described above. This gated interrupted ringback tone signal is transmitted over the conductor 244 to the calling line out gate circuit 226. The circuit 226 is open for non-revertive calls, since no change in potential is produced on the conductor **296*a*. Accordingly, the interrupted ringback tone signal is modulated on the connector signal pulses released by the circuit 226 in the time position 64*b* assigned to the calling line 23 and is transmitted by way of the distributor 15 and the line circuit 10 to the calling line 23 to inform the calling subscriber that the called line is being rung. At the same time, the interrupted ringback tone signal is rectified and employed to control the amplitude of the connector signal pulses released by the called line out gate circuit 224 in the time position 63*c* assigned to the called line 32. The line ringing facilities in the line circuit 16 respond to the above described change in amplitude of the called line connector signal pulses by transmitting a ringing current over the called line 32 in the manner described in detail above in connection with a revertive call. Ringing of the substations A′ and B′ persists until either the call is answered at the called substation B′, the call is abandoned at the calling substation A, or the link timeout and release circuit 301 functions at the end of the link timeout interval which is initiated when ringing starts to transmit a link release signal over the conductor 12*h* which has the effect of releasing the link 12** in the manner described above.

Assuming that the non-revertive call is answered at the substation B′ before the end of the link timeout interval, the loop circuit including the conductors of the line 32 is closed to the line circuit 16 and the multiplexer 11 responds thereto by developing multiplexer pulses **83*c* in the time position 63*c* which are impressed upon the calling and called line in gate circuits 207 and 223 in the connector 12*b*. Although the circuit 207 is held open for non-revertive calls, due to the above described combination of potentials on the conductors 251 and 296*a*, the multiplexer pulses 83*c* are not in coincidence with the finder gate pulses impressed upon the circuit 207 over the conductor 12*d* and hence are not repeated through the circuit 207. However, in the called line in gate circuit 223, the multiplexer pulses 83*c* occur in time coincidence with the connector pulses impressed upon the circuit 223 over the conductor 229*c* in the connector pulse forming circuit 217**.

The circuit 223 is also controlled by the code start potential developed on the conductor **268*a* by the code start circuit 268 to block this circuit during the initial stages of the revertive call and prevent ring trip prior to answering of the revertive call. However, for a non-revertive call, the code start potential on the conductor 268*a* is produced prior to transmission of a ringing current over the called line and no multiplexer pulses are produced in the time position 63*c* until the called line answers in response to ringing so that the circuit 223 is able to repeat the multiplexer pulses 83*c* to the called line reconstructor circuit 222 over the conductor 254. The circuit 222 is controlled in the same manner as the circuit 223 by the signals developed on the conductors 239*c* and 268*a* and hence is conditioned to respond to the multiplexer pulses 83*c* transmitted thereto over the conductor 254 by detecting the call answering signal carried thereby, the detected call answering signal being transmitted over the conductor 252 to the ring trip circuit 221. It will be noted that by controlling the circuits 222 and 223 in accordance with the code start potential developed by the code start circuit 268** so that these circuits are not open prior to initiation of ringing, the calling subscriber, on a non-revertive call, is prevented from listening in on a conversation being held on the called line when the called line is busy, while at the same time the above described feature of preventing ring trip prior to answering is provided for revertive calls.

The ring trip circuit 221 is enabled by the cut through potential on the conductor 251 and responds to the call answering signal on the conductor 252 by developing a ring trip potential on the conductor 253. This ring trip potential is employed to control the circuits 265, 282, 284, and the ringback tone gate circuit in the network 225 so that ringing is terminated and the conversation timing facilities in the connector 12b are conditioned for operation. The ring trip potential on the conductor 251 is also transmitted to the revertive call tone gate circuit 297 and the revertive call test circuit 296. However, the circuit 297 is not enabled by the potential on the conductor 296a and hence is prevented from gating a revertive call tone signal therethrough in response to the ring trip potential developed on the conductor 253. Also, the +B switching circuit 201 in the finder 12a is provided with facilities for preventing a change in potential on the revertive call hold conductor 12f in response to the ring trip potential transmitted to the circuit 296. Accordingly, the +B switching circuit 201 in the finder 12a is held in a condition to respond to multiplexer pulse termination in the time position 64b assigned to the calling line 23 for the duration of the non-revertive call.

When the non-revertive call is answered at the substation B′ and the loop circuit including the conductors of the line 32 is closed, the line lockout facilities in the line circuit 16 respond thereto by impressing busy pulses on the common busy pulse out conductor 52a in the time position 63c assigned to the called line 32.

Following the described operations in the connector 12b, a two-way talking or communication circuit is fully established between the calling substation A and the party line called substation B′. Thus, voice or other signals developed in the substation A and transmitted over the line 23 to the line circuit 10 serve to vary directly the bias voltage impressed upon the gate circuit of the multiplexer 11 over the conductor 53a in accordance with the instantaneous amplitude of such signals. As a consequence, the multiplexer pulses 84b released by the multiplexer 11 over the conductor 50 to the finders and connectors of the system in the pulse time position 64b are modulated in accordance with the voice or other signals developed in the calling substation A. These signal modulated multiplexer pulses cannot be accepted by any finder of the system other than the finder 12a or any connector of the system other than the connector 12b because of the busy pulses fed to the busy pulse out conductor 52a from the circuit 202 in the finder 12a and the line lockout facilities in the line circuit 10. In the finder 12a, the multiplexer pulses 84b maintain the +B switching circuit 201 operated to hold the link 12 associated with the line circuit 10. The signal modulated multiplexer pulses 84b are also transmitted through the calling line in gate circuit 207 and over the conductor 255 to the calling line reconstructor circuit 208, which circuits are not blocked for non-revertive calls, wherein they occur in time coincidence with the finder gating pulses impressed upon the reconstructor circuit 208 over the conductor 12d in the pulse time position 64b. As a consequence, the voice signal components thereof are detected or reconstructed and stored in the circuit 208. This stored signal information is impressed upon the called line out gate circuit 224 over the conductor 256. In the called line out gate circuit 224, the signals derived from the calling line reconstructor circuit 208 are modulated upon the connector signal pulses developed by the out gate circuit 224 in the pulse time position 63c assigned to the called line. These modulated signal pulses are transmitted to the distributor 15 over the conductor 51 wherein the signal components of the connector signal pulses are detected and released by the distributor 15 to the line circuit 16. In the line circuit 16, the detected signals are transmitted over the line 32 to the called substation B′ where they are audibly reproduced by the receiver of the telephone instrument provided at this substation.

Voice signals developed at the called party line substation B′ and transmitted over the line 32 to the line circuit 16 cause the bias potential delivered over the conductor 45a to the gate circuit of the multiplexer 11 which corresponds to the line circuit 16, to vary in exact accordance therewith. As a consequence, the voice signals are modulated upon the multiplexer pulses 83c occurring within the pulse time position 63c and released through the gate circuit of the multiplexer 11 and over the conductor 50 to the finders and connectors of the system. These signal modulated multiplexer pulses cannot be accepted by any finder of the system for the reason that the finder 12a is synchronised to accept only multiplexer pulses 84b occurring in the time position 64b and the busy pulses fed to the busy pulse out conductor 52b in the time position 63c assigned to the called line by the busy gate circuit 220 of the connector 12b prevent the other finders from accepting or responding to the described signal modulated multiplexer pulses 83c. In the connector 12b, the signal modulated multiplexer pulses 83c are impressed upon the calling line in gate circuit 207, which circuit is held open for non-revertive calls, and the called line in gate circuit 223, which is enabled after code start, and these multiplexer pulses are repeated by the circuit 223 over the conductor 254 to the called line reconstructor circuit 222, this latter circuit also being enabled after code start in the manner described above. Due to the lack of coincidence between the signal bearing multiplexer pulses 83c and the finder gating pulses impressed upon the calling line in gate circuit 207 over the conductor 12b, the circuit 207 does not gate these pulses to the reconstructor circuit 208. By virtue of the coincidence between the signal bearing multiplexer pulses 83c and the connector pulses appearing coincidentally on the conductor 239, both of which are impressed upon the called line reconstructor circuit 222, this circuit detects or reconstructs and stores the voice signal components carried by the multiplexer pulses 83c. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12d. The voice signal modulated pulses developed in the calling line out gate circuit 226 are supplied to the distributor 15 over the conductor 51 wherein the signal components thereof are detected and released to the line circuit 10. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations on a non-revertive call. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation.

The link timeout and release circuit 301 normally functions to release the link 12 at the end of the link timeout interval which is initiated when ringing starts, for both revertive and non-revertive calls, so that the link 12 will be released on an unanswered call. However, if the non-revertive call is answered at the called substation B′ it is then necessary to hold the link 12 operatively associated with the calling and called lines so that the talking circuit will not be broken and conversation may continue until the end of the conversation timing period.

In order to prevent the circuit 301 from releasing the link 12 at the end of the described link timeout interval, the circuit 301 responds to the ring trip potential, developed on the conductor 253 by the circuit 221 when the non-revertive call is answered, by disabling the link timeout facilities in the circuit 301 so that a link release signal is not impressed on the conductor 12*h* due to the above described two to four minute link timeout intervals. However, the circuit 301 is thereafter conditioned to respond to the conversation timing facilities at the end of the conversation timing period in the manner described below.

In order to provide conversation timing for the non-revertive call, the ring trip potential, which is impressed upon the conductor 253 by the circuit 221 when the call is answered, is transmitted to the party register advancer 282 and this latter circuit is thereby conditioned to respond to conversation timing pulses impressed upon the conductor 57*a*. Concurrently with conditioning of the party register advancer 282, the party digit register 265 is reset to zero since this register is no longer required for the gating of a ringback tone signal after the call is answered and a two-way talking circuit is established in the manner described above. The conversation timing pulses are produced at periodic intervals and the party register advancer 282 responds to each conversation timing pulse by producing a register drive pulse which is supplied to the party digit register 265 over the conductor 291 to advance this register one step for each conversation timing pulse. The conversation timing pulse may occur, for example, at 40 second intervals so that the party digit register is advanced one stage for each forty second interval of the call. When the ninth counting tube of the party digit register 265 is extinguished by the tenth register drive pulse produced by the party register advancer 282, a positive potential is developed on the conductor 292 which is transmitted to the conversation timing warning tone circuit 284.

The conversation timing warning tone circuit 284 is conditioned to respond to the above described positive potential developed on the conductor 292 when the ninth counting tube in the party digit register 265 is extinguished, and transmits therethrough a short pulse of warning tone signal impressed on the circuit 284 from the warning tone generator 58 over the conductor 58*a*. This short pulse of warning tone is transmitted over the conductor 244 to the calling line out gate circuit 226 wherein it is modulated on pulses gated by this circuit in the time position 64*b* assigned to the line 23 and these warning tone pulse modulated signal pulses are transmitted over the conductor 51 to the distributor 15 wherein they are detected and supplied to the line circuit 10 to inform the calling subscribed at the substation A that the call will be terminated shortly. The warning tone signal gated by the circuit 284 is also transmitted over the conductor 294 to the called line out gate circuit 224 wherein it is modulated on the connector signal pulses gated by the circuit 224 to the output conductor 51 and these modulated connector signal pulses are transmitted to the distributor 15 wherein they are detected and sent to the line circuit 16 so that the called subscriber at the called substation B′ is also informed that the call is about to be terminated.

When the tenth counting tube of the party digit register 265 is extinguished by the eleventh register drive pulse produced by the party register advancer 282, a positive control potential is developed on the conductor 293 which is transmitted to the link timeout and release circuit 301. The circuit 301 responds to this potential on the conductor 293 by impressing a link release signal on the conductor 12*h* which is transmitted to the finder 12*a* and has the effect of releasing the link 12 in the manner described in detail heretofore. In addition, the circuit 301 is provided with facilities for preventing the circuit 301 from responding to a potential produced on the conductor 293 during the initial stages of the call wherein the tenth counting tube in the party digit register 265 may be selected for party line ringing. More specifically, the circuit 301 responds only to a potential developed on the conductor 293 which occurs after the ring trip potential is produced on the conductor 253 by the circuit 221 when the call is answered.

In describing the manner in which the system components 10, 11, 12*a*, 12*b*, 15 and 16 are partially or wholly released upon termination of the non-revertive call by either party and independently of the above described conversation timing facilities, it may be assumed first that the called party at the party line substation B′ is the first to hang up. In such case, the bias potential delivered from the line circuit 16 over the conductor 45*b* to the gating circuit of the multiplexer 11 individually assigned to the line circuit 16 is restored to its normal value when the called line loop circuit is open, with the result that multiplexer pulses 83*c* appearing in the time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of the circuit 226 from the distributor 15 to the line circuit 10. In other words, busy pulses in the time position 63*c* assigned to the called line continue to be fed to the busy pulse out conductor 52*b* from the busy gate circuit 220 of the connector 12*b*, thereby to prevent substations associated with the called line 32 from originating a call or accepting an incoming call. This, of course, means that if the subscriber at any one of the substations associated with the called line picks up his receiver before the connection is released at the calling substation A, a two-way talking circuit between the calling and called line is re-established.

When the calling line subscriber disconnects by replacing the receiver or hand set at the substation A on its supporting hook or cradle, the loop circuit extending by way of the line 23 to the line circuit 10 is open, with the result that the bias potential applied over the conductor 53*b* to that gate circuit of the multiplexer 11 which individually corresponds to the line circuit 10 is restored to its normal value. As a consequence, this gate circuit is biased to terminate the transmission of multiplexer pulses 84*b* occurring in the pulse time position 64*b* over the conductor 50 to the various finders and connectors of the system. When the transmission of multiplexer pulses 84*b* to the pulse input circuit 200 of the finder 12*a* is thus terminated, this circuit is rendered inactive to repeat pulses to the finder circuits 201, 203 and 204. After a predetermined time interval, measured by the overall time constant of the +B switching circuit 201, this circuit responds to cessation of multiplexer pulse transmission thereto by removing operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy pulse out conductor 52*a* in the pulse time position 64*b* assigned to the calling line 23 is arrested. Removal of the operating anode potential from the conductor 12*c* has the effect of rendering the self-allotting circuit 206 in the finder 12*a* operative to reassociate the link 12 with another calling line to handle another call. Cessation of busy pulse transmission to the busy pulse out conductor 52*a* in the pulse time position 64*b* has the effect of marking the calling line 23 as idle to permit initiation of a second call on this line or seizure of the line on a call incoming thereto.

Removal of operating anode potential from the conductor 12*c* also has the effect of restoring the controlled circuits of the connector 12*b* to normal, thereby to condition the connector 12*b* to handle another call. Concurrently therewith, connector pulse production on the conductor 239 in the pulse time position 63c assigned to the called line 32 is terminated to arrest the application of busy pulses to the common busy pulse out conductor 52a by the busy pulse gate circuit 220 in this pulse time position. Thus, the called line is unguarded to free the same for use in initiating another call or accepting a call incoming thereto. As soon as the loop circuits to the lines 23 and 32 are broken, the line lockout facilities in the line circuit 10 and the line circuit 16 respond by removing busy pulses from the common busy pulse out conductor 52a in the time positions respectively assigned to the lines 23 and 32 so that these lines are no longer operated in a line lockout condition and new calls may be initiated on either line. It will be noted that normalizing of the identified components of the connector 12b has the effect of restoring all components of this connector to the condition which prevails at the time the link 12 was taken into use to handle the call just described. Also, it will be noted that if the calling subscriber is the first to release the connection, i.e. hang up, the link 12 is immediately released under the control of the +B switching circuit 201 embodied in the finder 12a. However, in such case, the line lockout facilities in the line circuit 16 remain in a line lockout condition until the subscriber at the called party line substation B′ hangs up so that the line 32 is locked out of service until the loop circuit including the conductors of the line 32 is broken.

DETAILED DESCRIPTION OF THE SYSTEM

Figures 1, 5:
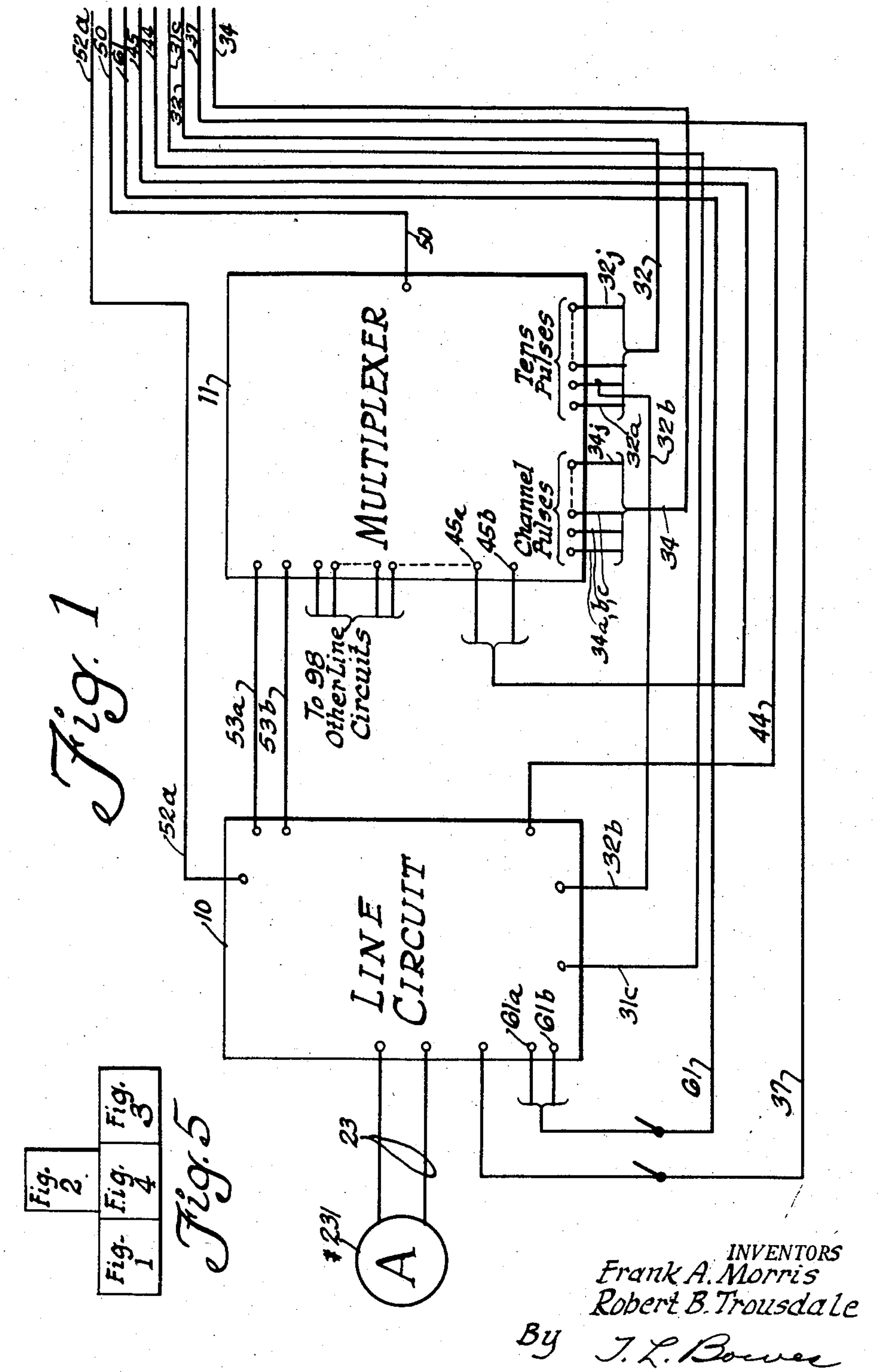

In considering the detailed circuitry of the system components described generally above, operation of these components will be analyzed insofar as possible in terms of the functions which they perform in establishing the above described revertive call connection between the substations A′ and B′ in response to a call initiated at the substation A′, and in establishing the above described non-revertive call connection between the substation A and the substation B′ in response to a call initiated at the substation A. Before considering the details of the system components, however, it is pointed out generally that corresponding reference characters have been used throughout the drawings to identify the corresponding circuit elements of the system. It is also pointed out that all pulse carrying conductors, such for example, as the signal pulse transmission conductors 50 and 51, are in the form of coaxial cables or transmission lines having low pulse attenuating properties at the pulse frequencies employed. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuit, namely, functions which will be readily understood by those skilled in the art, have not been identified in the drawings or referred to in the following description of the system components.

As used in this specification, the terms "electronic" and "electronic means" refer to and are intended to define means comprising electron conducting devices such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

Also, in order to reduce the complexity of this specification, those system components which are substantially identical to the corresponding system components of the copending applications of Robert B. Trousdale, Serial No. 301,215, filed July 28, 1952; Serial No. 301,087, filed July 26, 1952; Serial No. 257,712, filed November 23, 1951, and Serial No. 336,316, filed February 11, 1953, which are assigned to the same assignee as the present invention, will be only briefly described in this specification, reference being had to these copending applications for a complete and detailed description of these system components. However, in order to facilitate an understanding of all of the system components in the line lockout system of the present invention, on both revertive and non-revertive calls, these components will be discussed in such detail as is necessary to bring out the functions thereof in the present system.

*Common Equipment 17*

Component circuits of the common equipment 17 may all be substantially identical to the corresponding component circuits described in detail in the copending application of Robert B. Trousdale, Serial No. 336,316, identified above, and reference may be had to this copending application for a complete and detailed description of these circuit components. In this connection it will be understood that a code ringing party line system may be employed instead of the harmonic ringing system described above, in which case certain components of the common equipment 17 are modified in the manner described in detail in the copending application Serial No. 257,712, identified above.

*Substations A′–J′, inclusive*

The substations respectively terminating the various lines of the system, including party line substations as well as private line substations, are substantially identical in arrangement and these substations may be identical to the corresponding system components shown and described in detail in the copending application, Serial No. 301,215, identified above, reference being had to this copending application for a detailed description of these substations. In this connection, it will be understood that in the illustrated system wherein harmonic party line ringing is employed, the private line substation A is assigned a party line ringing digit of "1" to provide uniform directory numbering and is provided with harmonic ringing facilities which will respond to the frequency of the code #1 harmonic ringing signal of the system.

*Line circuits 10 and 16*

As previously indicated, the two identified line circuits are respectively utilized to terminate the private line 23 and the party line 32 at the exchange end of the system. These two line circuits, as well as the line circuits terminating the other lines of the system, are identical in circuitry and mode of operation and hence only a detailed description of the line circuit 16 will be given herein, it being understood that this description applies to all of the other line circuits of the system.

Figure 27:
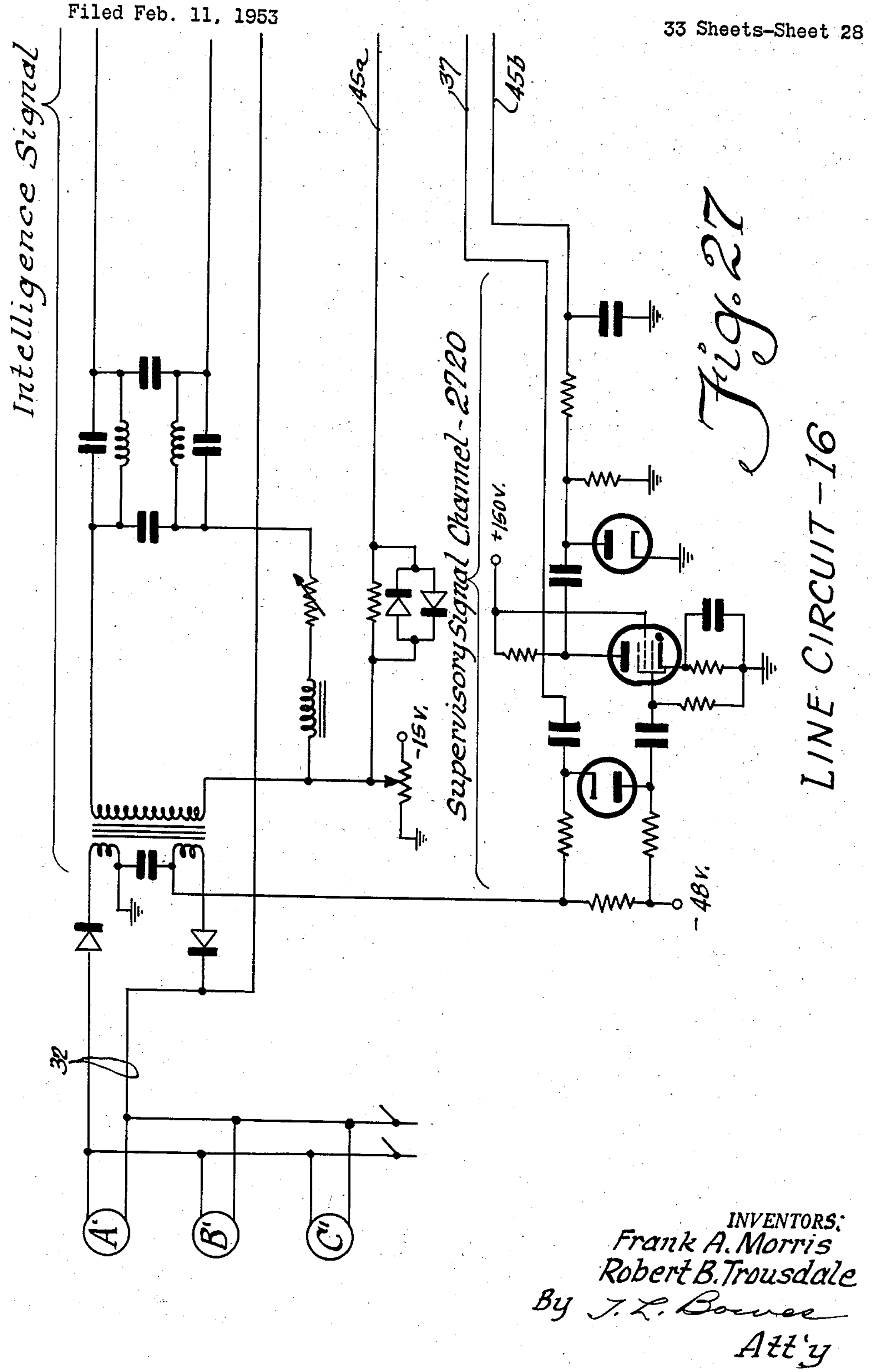
Figure 28:
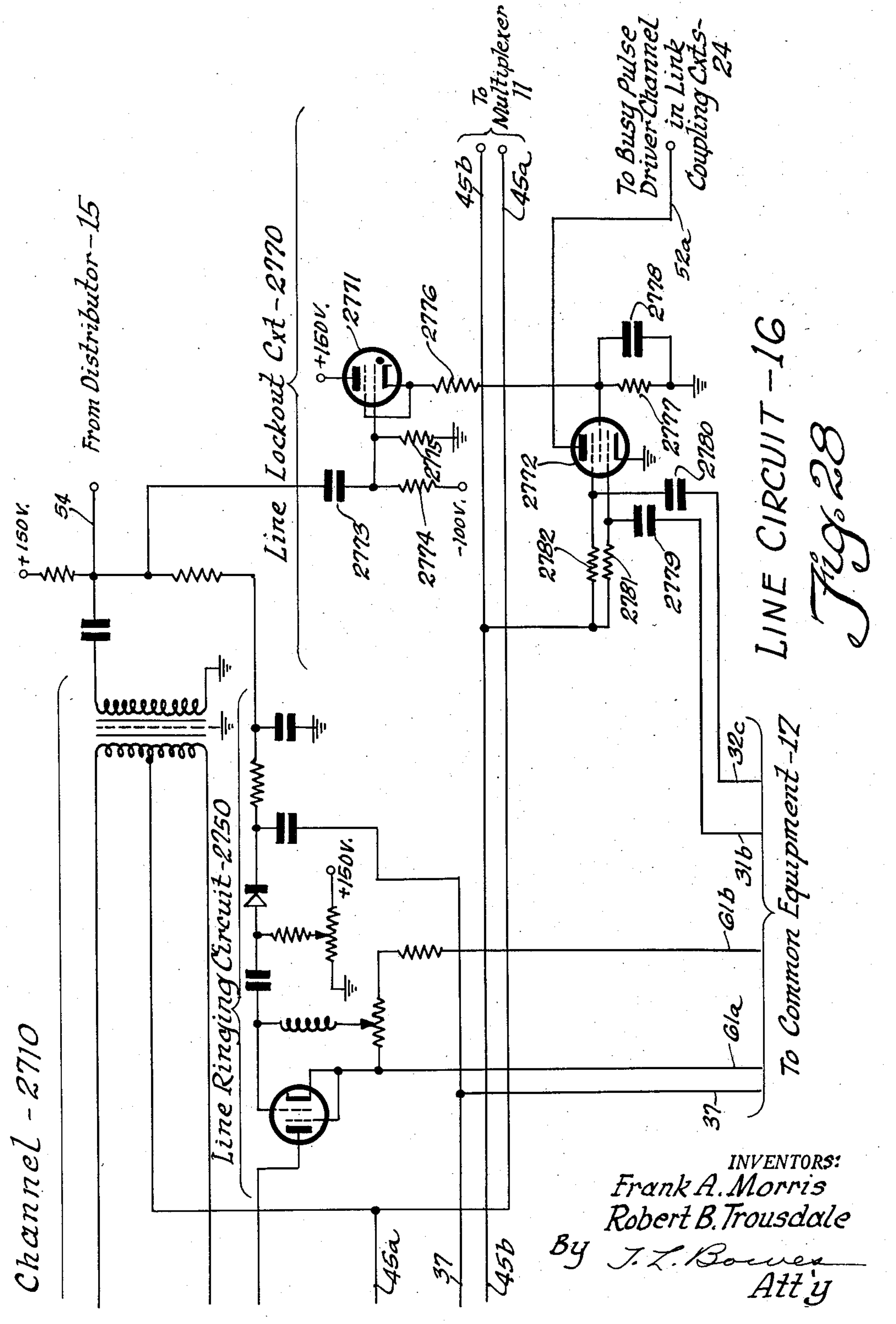

Referring now more particularly to Figs. 27 and 28 wherein the details of the line circuit 16 are illustrated, this line circuit generally comprises the intelligence signal channel 2710, the supervisory signal channel 2720, the line ringing circuit 2750 and the line lockout circuit 2770. As will be recalled from the foregoing general description of the system, the intelligence signal channel 2710 is utilized in transmitting intelligence signals which are produced at one of the substations associated with the line 32 to the corresponding gate circuit of the multiplexer 11 over the conductor 45a in such manner that these signals are not coupled to the distributor 15. Furthermore, the intelligence signal channel 2710 is utilized in transmitting intelligence signals from the distributor 15 to the line 32 and over this line to one of the substations associated therewith in such manner that these signals are not revertively transmitted back to the multiplexer 11.

The supervisory signal channel 2720 converts the 100 kilocycle supervisory carrier voltage developed by the supply circuit 26 into a bias voltage of constant amplitude which is supplied over the conductor *45b* to the multiplexer 11 and is utilized normally to bias to a non-conductive state that particular gate tube of the multiplexer 11 which individually corresponds to the line 32. The channel 2720 also responds to closure of the loop circuit including the conductors of the line 32, during off hook periods, dial impulsing periods, etc., by removing the above described bias potential from the conductor *45b* during periods when this loop circuit is closed and reapplying this bias potential to the conductor *45b* when this loop circuit is closed and reapplying this bias potential to the conductor *45b* when the loop circuit is open.

The line ringing circuit 2750 is provided for the purpose of controlling the transmission of ringing current over the line 32 to the harmonic ringers provided in the substations A'–J', inclusive, on calls incoming to the line 32. Thus, the circuit 2750 responds to an increase in the average height of the connector signal pulses released to the distributor 15 during the ringing periods of the selected party line ringing signal and transmitted over the conductor 54 from the distributor 15 to the line circuit 16, by transmitting a ringing current over the line 32 which has a frequency to which the harmonic ringer at the called substation will respond.

The intelligence signal channel 2710, the supervisory signal channel 2720 and the line ringing circuit 2750 may all be substantially identical to the corresponding system components shown and discussed in further detail in the copending application Serial No. 301,215, identified above, and reference may be had to this copending application for a detailed description of these circuit components of the line circuit 16.

Considering now the line lockout circuit 2770, it will be recalled from the general description of the system that this circuit is provided for the general purpose of busying the line 32 to the other lines of the system and the finder-connector links of the system after the line 32 becomes operatively associated with one of these links. More specifically, the line lockout circuit 2770 comprises a line lockout control tube 2771 and a line lockout gate tube 2772. The tube 2771 is a gas filled thyratron of the hot cathode type, preferably of the commercial type 5696 and the gate tube 2772 is preferably a pentode of the commercial type 6AS6. The control tube 2771 is controlled by the signals developed on the conductor 54 in the distributor 15 and acts as a source of screen potential for the gate tube 2272. More particularly, signals appearing on the conductor 54 are coupled through the condenser 2773 to the control grid of the tube 2771 and this control grid is connected through the resistor 2774 to the −100 volt supply and through the resistor 2775 to ground. The anode of the tube 2771 is connected to the +150 volt supply and the cathode of this tube is connected through the series resistors 2776 and 2777 to ground potential, the voltage produced across the resistor 2777 being employed as a screen voltage for the gate tube 2772. A condenser 2778 is connected across the resistor 2777 to prevent short time changes in the potential across the resistor 2777.

In order to permit the lockout circuit 2770 to develop pulses in the time position assigned to the line 32 when a line lockout condition is to be established, certain ones of the tens and units pulses developed in the tens and units pulse rings 20 and 21 in the common equipment 17 are combined in the circuit 2770. More specifically, the units pulses *63a*, *63b*, *63c*, etc., appearing on the conductor *31b* are coupled through the condenser 2779 to the first control grid of the gate tube 2772. Also, the tens pulses *74a*, appearing on the conductor *32c* are coupled through the condenser 2780 to the suppressor grid of the gate tube 2772. The first control grid of the tube 2772 is connected through the resistor 2781 to the conductor *45b* and the suppressor grid of the tube 2772 is likewise connected through the resistor 2782 to the conductor *45b*. Accordingly, during periods when the loop circuit including the conductors of the line 32 is open, i.e. during periods when the line 32 is not in use, the large negative bias potential developed on the conductor *45b* operates to hold both the first control grid and the suppressor grid of the tube 2772 well beyond cut off so that this tube does not respond to the positive units pulses impressed on the first control grid thereof and the positive tens pulses impressed on the suppressor grid thereof. Accordingly, until a calling condition exists on the line 32, the tube 2772 is prevented from conducting by means of the above described bias potential on the conductor *45b*.

Considering now the operation of the line lockout circuit 2770 on a call initiated at one of the substations associated with the line 32, when the loop circuit including the conductors of the line 32 is closed, the supervisory signal channel 2720 responds thereto by reducing the negative bias potential normally developed on the conductor *45b*, and the multiplexer 11 responds to this change in bias potential on the conductor *45b* by releasing signal pulses *83c* which occur during the pulse time position *63c* assigned to the line 32. These multiplexer pulses are transmitted over the conductor 50 to the pulse imput circuit 200 of the finders *12a*, *13a*, and *14a* of the system. However, at this point in the call, the line lockout control tube 2771 is not conducting, since the potential impressed upon the control grid thereof from the network 2774, 2775 is well beyond cut off, so that no current flows through the resistor 2777 and the gate tube 2772 is without screen potential. Accordingly, even though the bias potential on the conductor *45b* is reduced in the manner described above when the loop circuit including the conductors of the line 32 is initially closed, the gate tube 2772 does not immediately respond to this reduction in bias potential by gating pulses therethrough.

Assuming that the finder *12a* is idle, the multiplexer pulses *83c* repeated by the pulse input circuit 200 in this finder effect substantially immediate operation of the +B switching circuit 201 in this finder so that operating anode potential is delivered to the controlled circuits in the connector *12b* over the conductor *12c* with the result that the connector *12b* is conditioned to respond to the multiplexer pulses *83c* delivered thereto over the conductor 50. At the same time, the finder *12a* transmits finder gate pulses over the conductor *12d* to the calling line out gate circuit 226 in the connector *12b* and the circuit 226 responds thereto by gating connector signal pulses occurring in the time position *63c* assigned to the line 32 over the conductor 51 to the distributor 15.

These connector signal pulses are partially integrated in the distributor 15. However, a substantial amount of the fundamental 10 kilocycle component of these pulses remains and this 10 kilocycle signal is transmitted over the conductor 54 to the line circuit 16. The 10 kilocycle signal transmitted over the conductor 54, which may be called a return supervision signal, is coupled through the condenser 2773 to the control grid of the line lockout control tube 2771 and has the effect of firing this tube. After the tube 2771 fires the control grid thereof is rendered ineffective to control conduction through the tube so that the tube 2771 continues to conduct until the current through this tube becomes too small to support conduction through the tube 2771. Accordingly, as soon as the return supervision signal is transmitted over the conductor 54, indicating that the line circuit 16 has been seized by one of the finder-connector links of the system, the line lockout control tube 2771 is fired and current flow through this tube produces a voltage drop across the resistor 2777 which is of sufficient magnitude to operate the screen grid of the gate tube 2772 in its normal operating range. Since the first control grid and suppressor grid of the tube 2772 are operated close to cut off when the bias potential on the conductor 45b is relatively small, i.e. when a calling condition exists on the line 32, the tube 2772 responds to firing of the tube 2771 by gating therethrough that one of the units pulses appearing on the conductor 31b which coincides with the tens pulses impressed upon the conductor 32c. More specifically, the units pulses 63c, occurring during the tens pulse interval 74a, are gated through the tube 2772 and appear as negative pulses at the anode of this tube. These negative pulses, which occur in the time position 63c assigned to the line 32, are transmitted over the common busy pulse out conductor 52a to the busy pulse drive channel in the link coupling circuit 24 wherein they are amplified and inverted and are transmitted by way of the conductor 52b to all of the finders and connectors of the system. It will thus be evident that when a return supervision signal is received on the conductor 54, the line lockout circuit 2770 in the line circuit 16 operates to develop busy pulses in the time position 63c assigned to the line 32 independently of any of the finder-connector links of the system, and these busy pulses are transmitted to all of the finders and connectors to indicate a line lockout condition on the line 32.

It will be recalled from the general description of the system that during a revertive call the calling subscriber must hang up in order to permit the harmonic ringers at the called substation or substations to respond to the ringing current transmitted over the line 32. Accordingly, during these periods, as well as during the break periods of the dial impulses, the loop circuit including the conductors of the line 32 is broken and the supervisory signal channel 2720 responds thereto by increasing the negative bias potential on the conductor 45b so that the first control grid and suppressor grid of the gate tube 2772 are driven well beyond cut off and the tube 2772 is prevented from responding to the tens and units pulses impressed on the control grids of this tube. When the gate tube 2772 is thus biased beyond cut off, the flow of screen current through the screen-cathode space current path of the tube 2772 ceases. As a result, the shunting effect of the screen-cathode resistance of the tube 2772 is removed from across the resistor 2777 when the tube 2772 is biased beyond cut off by the increased supervisory bias voltage on the conductor 45b. The cathode resistors 2776 and 2777 of the line lockout control tube 2771 are of relatively high value such that they do not in and of themselves permit sufficient current to flow through the tube 2771 to support conduction through this tube in the absence of any shunting effect across the resistor 2777. Once the tube 2772 is driven beyond cut off so that screen current does not flow through this tube, the potential at the cathode of the control tube 2771 rises until the flow of current through the tube 2771 is no longer sufficient to support conduction through the tube and the tube 2771 is extinguished. Accordingly, with the described arrangement the line lockout control tube 2771 is extinguished when the bias potential on the conductor 45b is increased sufficiently to hold the tube 2772 beyond cut-off, and the line lockout circuit 2770 responds to the above described on-hook condition during a revertive call by removing busy pulses from the conductor 52a. However, since the finder 12a remains operatively associated with the line 32 and continues to impress busy pulses on the conductor 52a from the finder pulse and busy pulse combining circuit 202 in this finder, the line 32 continues to be busied to the other linkage of the system.

When the revertive call is answered and either the calling or called party comes off hook so that the loop circuit including the conductors of the line 32 is again closed, the bias voltage on the conductor 45b is again decreased in the manner described above so that the control grid and suppressor grid of the tube 2772 are again operated at potentials which permit these grids to respond to the tens and units pulses respectively impressed on these control grids. On a revertive call, the line 32 is held operatively associated with the finder 12a and connector 12b while a calling condition does not exist on these lines. Accordingly, the line lockout control tube 2771 continues to respond to the 10 kilocycle signal which is transmitted to this line circuit over the conductor 54 from the distributor 15. Since the gate tube 2772 is not conducting during periods when a calling condition does not exist on the line 32, the control tube 2771 continues to be fired by this signal and extinguished in the manner described above so that a form of relaxation oscillation is produced at the cathode of the tube 2771. However, when a calling condition again exists on the line 32 and the tube 2772 is again rendered conductive so that screen current can flow through this tube, the shunting effect of the tube 2772 across the resistor 2777 prevents the control tube 2771 from being extinguished so that a substantially unidirectional potential is produced across the resistor 2777 which is employed as screen potential for the tube 2772. In this connection it will be noted that the screen grid circuit of the tube 2772 is employed as the controlling element for the gas tube 2771 and the tens pulses are impressed upon the first control grid of the tube 2772. With this arrangement a relatively large controlling effect on the tube 2771 is provided since the screen grid is conducting for ten percent of the time and a relatively large average screen current is produced. If, however, the anode circuit of the tube 2772 is employed to control the gas tube 2771, current would flow in the anode-cathode path of the 2772 only for one percent of the time, i.e. one pulse time position in each pulse frame, so that the average anode current available for controlling the gas tube 2771 would be relatively small. It will also be noted that by using the screen grid circuit of the tube 2772 to control the gas tube 2771, the anode circuit of the tube 2772 may be used to couple the pulses gated through the tube 2772 directly to the busy pulse out conductor 52a.

When the revertive call is answered and the finder-connector link 12 is released from operative association with the line 32 in the manner generally described above, the line lockout circuit 2770 continues to function to impress busy pulses on the conductor 52a in the time position 63c assigned to the line 32.

Accordingly, even though the finder-connector link 12 is released from the line 32 this line is held in a lockout condition by virtue of the busy pulses appearing on the conductor 52a for the duration of the revertive call so that none of the other finder connector links of the system can seize the line 32.

When the revertive call is completed and both the calling and called parties have hung up, the loop circuit including the conductors of the line 32 is again broken so that the bias potential on the conductor 45b is increased to a relatively high negative value and the tube 2772 is driven well beyond cut-off. When this occurs, the shunting effect of the screen-cathode space current path of the tube 2772 is removed so that the line lockout control tube 2771 is permitted to be extinguished in the manner described above. When this occurs, the line lockout circuit 2770 is returned to its quiescent condition wherein no busy pulses are impressed upon the conductor 52a and the line 32 is again conditioned for service.

In this connection it will be understood that the above described line lockout condition is assumed by the circuit 2770 as soon as the return supervision signal is received over the conductor 54 so that the line 32 is placed in a line lockout condition immediately after this line is seized by a finder-connector link and the line 32 will remain in a line lockout condition even though the finder-connector link is timed out in the manner described above on any prolonged calling condition on the line so that the line 32 is prevented from seizing other linkage of the system. Accordingly, if a permanent off hook condition exists on the line 32, for any reason whatever, the line 32 is locked out of service until the loop circuit including the conductors of this line is opened.

Figure 29:
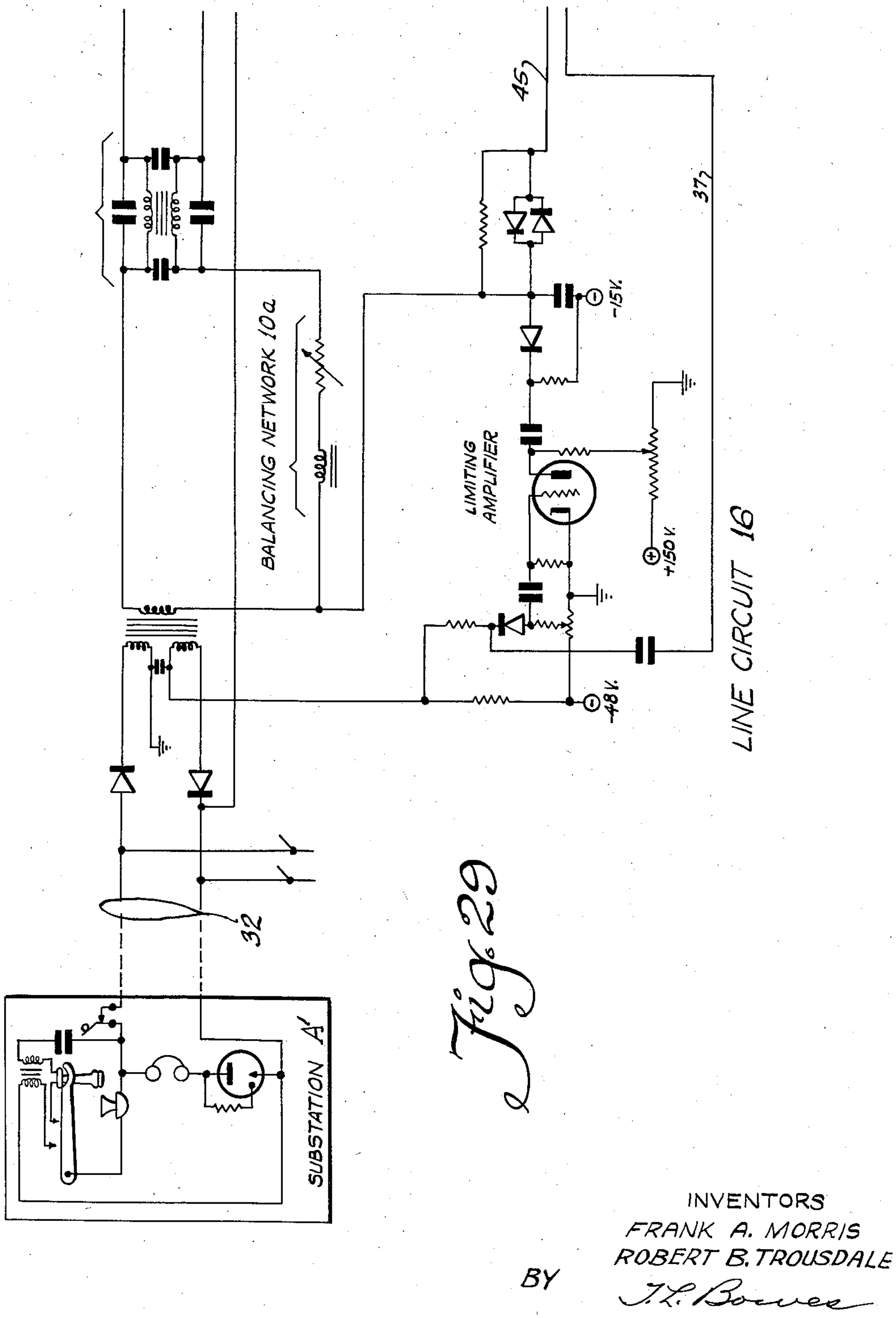
Figure 30:
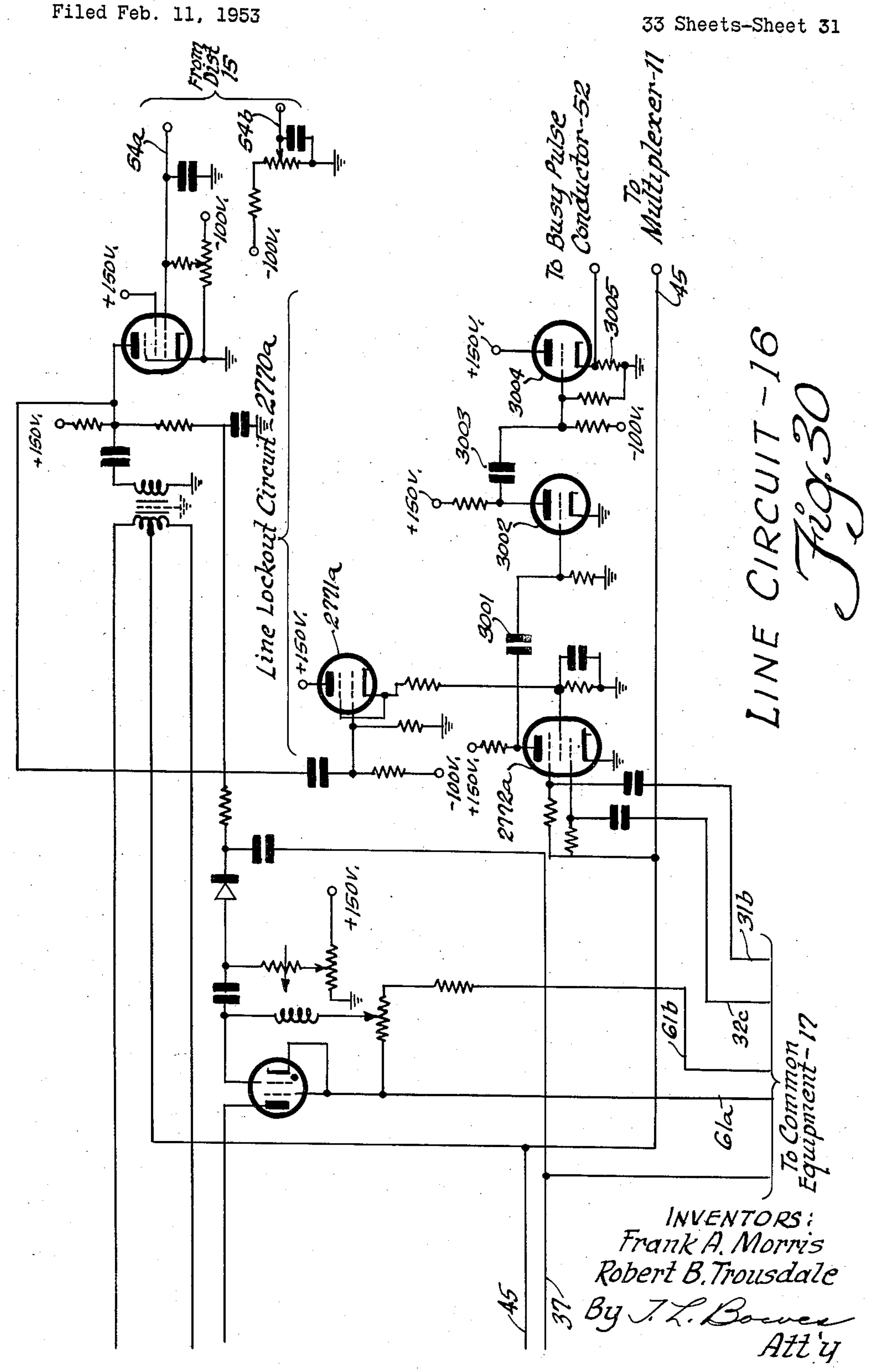

In Figs. 29 and 30 of the drawings, there is illustrated an alternative line circuit arrangement wherein line lockout facilities are provided which are adapted to operate with a system of the type shown and described in detail in the copending application Serial No. 134,974, identified above. In a system such as described in the above identified application, a single busy pulse channel is employed for both in and out busy pulses and the line lockout circuit 2770*a* in Fig. 30 is adapted to function with such a busy pulse system. More specifically, the line lockout control tube 2771*a* and the gate tube 2772*a* are substantially identical to that described above in connection with the line lockout circuit 2770 shown in Fig. 28, and function to develop busy pulses at the anode of the tube 2772*a* during periods when the loop circuit including the conductors of the line 32 is closed. In this connection it will be understood that in the system described in this copending application the bias potential on the illustrated conductor 45 changes in accordance with the loop circuit conditions of the line 32 even though the conductor 45 is also employed for speech signal transmission to the multiplexer of the system. Accordingly, during periods when the loop circuit including the conductors of the line 32 is closed, the bias potential on the conductor 45 is such that the first control grid and suppressor grid of the gate tube 2772*a* can respond to the tens and units pulses impressed thereon, and, when an answering supervision signal is transmitted to the control grid of the control tube 2771*a*, this tube is fired and the gate tube 2772*a* is conditioned to develop busy pulses at the anode thereof. These busy pulses are coupled through the condenser 3001 to the control grid of an inverter tube 3002 wherein these busy pulses are amplified and inverted and are coupled through the condenser 3003 to the control grid of a cathode follower tube 3004. Accordingly, there is produced across the cathode resistor 3005 of the tube 3004 positive busy pulses appearing in the time position 63*c*, which are impressed upon the common busy pulse conductor 52 and are multipled to all of the finders and connectors of the system.

While the line lockout facilities have been illustrated as included in the line circuits of the system which are individually associated with the lines of the system, it will be readily understood that line lockout circuits for each line may be incorporated in a single system component. For example, the line lockout circuits for each line may readily be incorporated in the multiplexer 11 since this unit is connected to the line circuits over the bias potential conductors, such as the conductor 45*b* from the line circuit 16, and also has tens pulses supplied thereto to perform the tens gating function described generally heretofore. With this arrangement, the busy pulses developed by the individual line lockout circuits are multipled to the common busy pulse out conductor 52*b* within the multiplexer 11 and return supervision signals are connected from the distributor 15 to the individual line lockout circuits in the multiplexer 11 by way of a multi-conductor cable so that a fewer number of conductors to the individual line circuits of the system is required.

While the line lockout circuits 2770 and 2771*a* have been illustrated as operating with a line ringing circuit wherein the ringing control signal consists of changes in the amplitude of the connector signal pulses developed in the connector 12*b*, it will be understood that a ringing carrier control system may be employed such as described in detail in the copending application of Robert B. Trousdale, Serial No. 326,453, filed on December 17, 1952, and assigned to the same assignee as the present invention. Accordingly, if a carrier system is employed, a line ringing circuit of the type shown in the copending application Serial No. 326,453, identified above, is employed. However, it will be understood that the line lockout control tube 2771 in the circuit 2770 is adapted to respond to an answering supervision signal irrespective of the type of line ringing control system which is employed since the control grid of the tube 2771 is capacitively coupled to the conductor 54. It will also be understood that various combinations of different types of supervisory signal channels, signal transmission channels and line ringing circuits may be employed in the line circuit 16 without affecting the operation of the line lockout circuits 2770 or 2770*a*.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links 12, 13 and 14 of the system. The multiplexer circuit is capable of sampling signals appearing on each of the 100 lines of the system at a sampling repetition rate of 10 kilocycles.

Figures 3, 20:
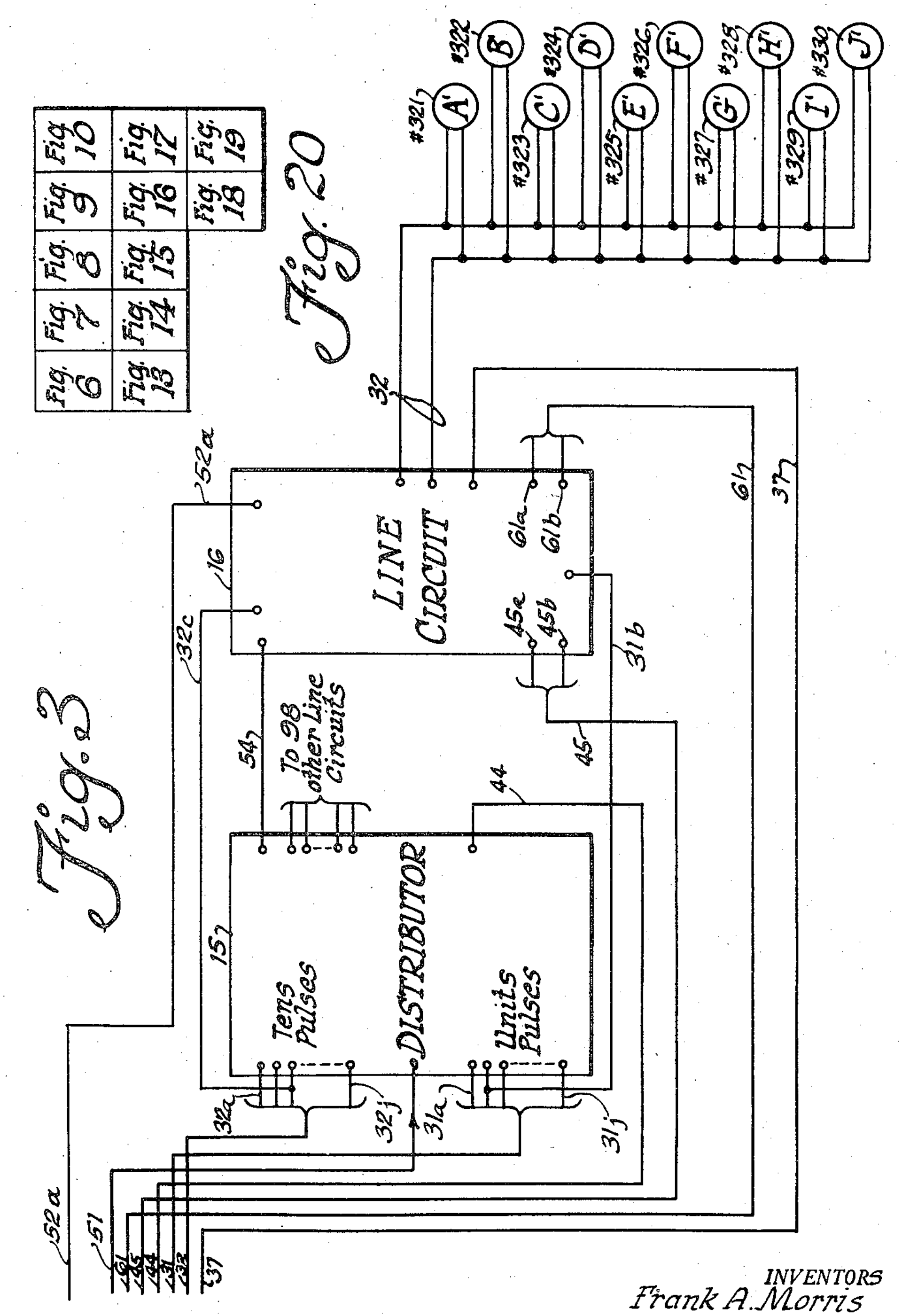
Figure 4:
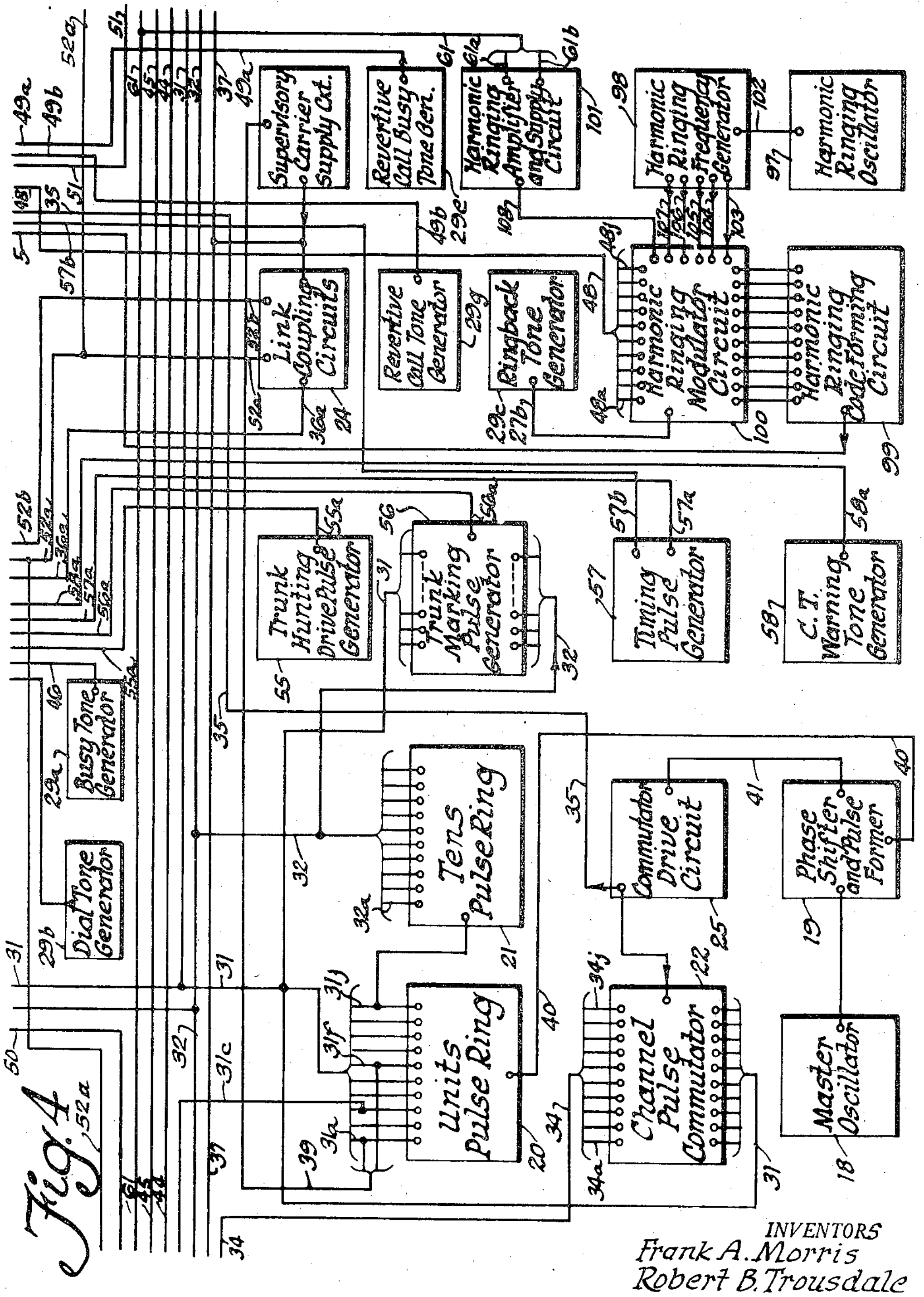

The multiplexer 11 may be identical to the corresponding system component described in the copending application Serial No. 134,974 identified above, or the copending application of Robert B. Trousdale, Serial No. 205,641, filed January 12, 1951, and assigned to the same assignee as the present invention. However, it will be understood that a given type of multiplexer is designed to operate with the intelligence and supervisory signal channels of a given type of line circuit. Thus, the type of line circuit disclosed in copending application, Serial No. 134,974, identified above, is adapted to supply the intelligence and control signals over the same conductor to the corresponding gate tube of the multiplexer 11, whereas in the copending application Serial No. 205,641 the intelligence and control signals are supplied over separate paths to separate control grids of the corresponding gate tube in the multiplexer 11. Since the intelligence and supervisory signal channels of the line circuits 10 and 16, shown in Figs. 1 and 3 of the present invention, are of the latter type, it will be understood that a multiplexer of the type shown in copending application Serial No. 205,641 is to be used with these line circuits. However, it will be understood that either type of line circuit and multiplexer combination may be employed in so far as the line lockout system of the present invention is concerned.

*Finder 12a*

As generally explained heretofore, the finders 12*a*, 13*a*, and 14*a* of the system of the present invention are provided with novel facilities for line lockout operation on either revertive or non-revertive calls. More specifically, the finder 12*a* is provided with facilities for releasing the link 12 in response to the link release signal transmitted to the finder over the conductor 12*h* from the associated connector 12*b*, even though a calling condition exists on the line with which the finder 12*a* is operatively associated. In addition, the finder 12*a* is provided with facilities for responding to a revertive call hold signal transmitted to this finder over the conductor 12*f* from the connector 12*b* to permit a revertive call to be set up and also is provided with facilities for transmitting a revertive ring start signal over the conductor 12*e* to the connector 12b in response to a first disconnect signal transmitted over the calling line when a revertive call is in progress.

Figure 18:
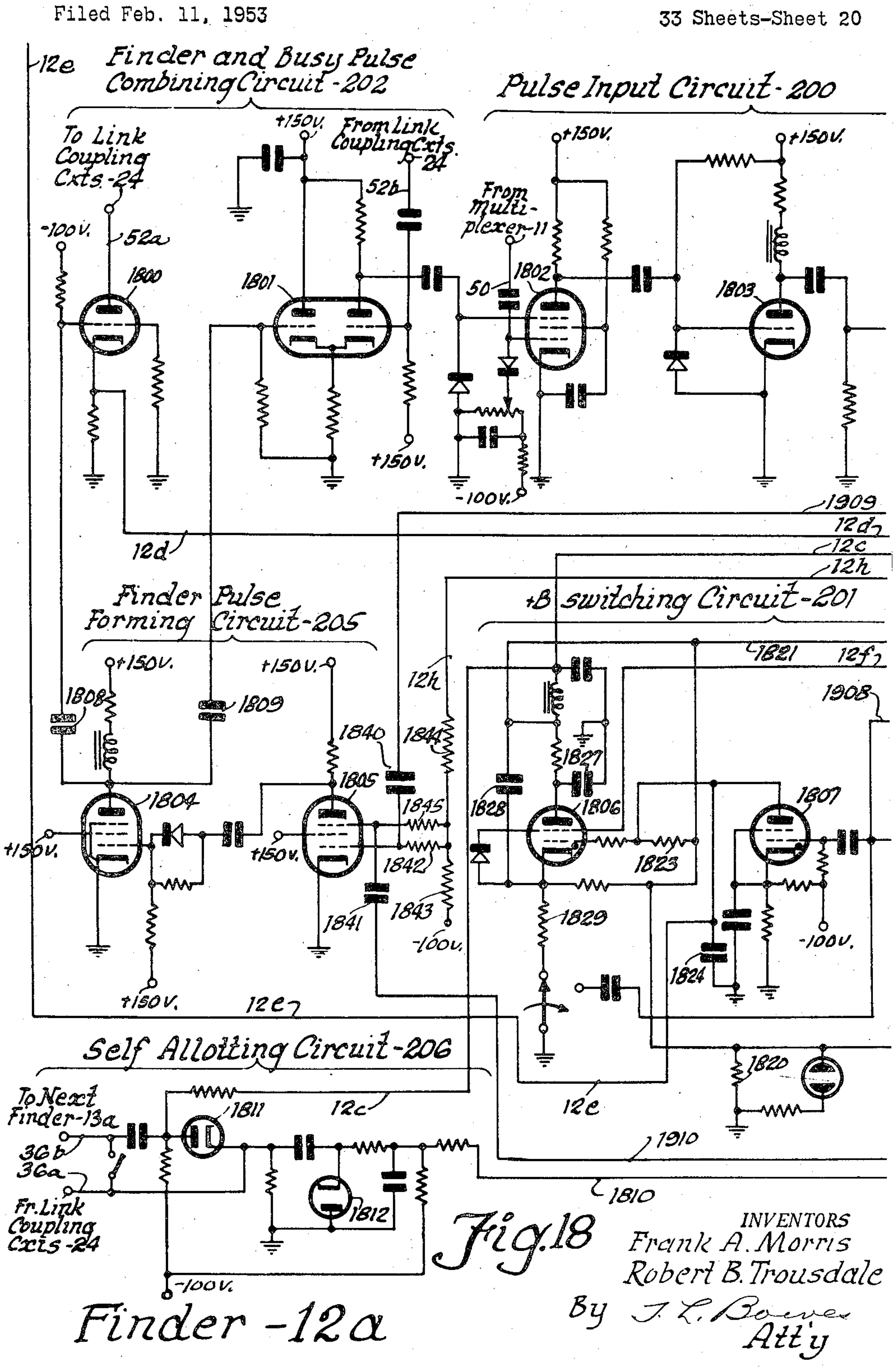

As previously explained in connection with Fig. 2A of the drawings, the finder 12*a*, which is shown in detail in Figs. 18 and 19 of the drawings, comprises a pulse input circuit 200, a +B switching circuit 201, a finder pulse and busy pulse combining circuit 202, a tens coincidence tube circuit 203, a units coincidence tube circuit 204, a finder pulse forming circuit 205 and a self-allotting circuit 206. The pulse input circuit 200 comprises a finder control gate tube 1802, an inverter tube 1803 and a cathode follower output tube 1900, which are connected in tandem in the order named and are arranged to impress multiplexer pulses gated therethrough upon a common output conductor 1908. These multiplexer pulses are distributed over the conductor 1908 to the input terminals of the tens coincidence tube circuit 203, the units coincidence tube circuit 204 and the +B switching circuit 201 in parallel.

In order to provide the above described revertive call operation, the +B switching circuit 201 is jointly controlled by the multiplexer pulses gated thereto from the pulse input circuit 200 over the conductor 1908, the revertive call hold signal transmitted thereto over the conductor 12*f* from the connector 12*b*, and the allotting signal developed by the circuit 206 and transmitted to the circuit 201 over the conductor 1810, and responds to these potentials in a manner described in more detail hereinafter by developing a +B switch potential on the conductor 12*c*. The circuit 201 comprises a +B switch tube 1904, a +B switch timing or discharging tube 1807 and a +B switch extinguishing tube 1806. The self-allotting circuit 206 comprises the diodes 1811 and 1812 and responds to an allotting signal developed on the conductor 36*a* in the link coupling circuits 24 by enabling the finder 12*a* by means of the above described potential produced on the conductor 1810 and also diverts the supervisory carrier signal appearing on the conductor 36*a* over the conductor 36*b* to the next finder 13*a* to enable this finder to handle the next call.

Figure 19:
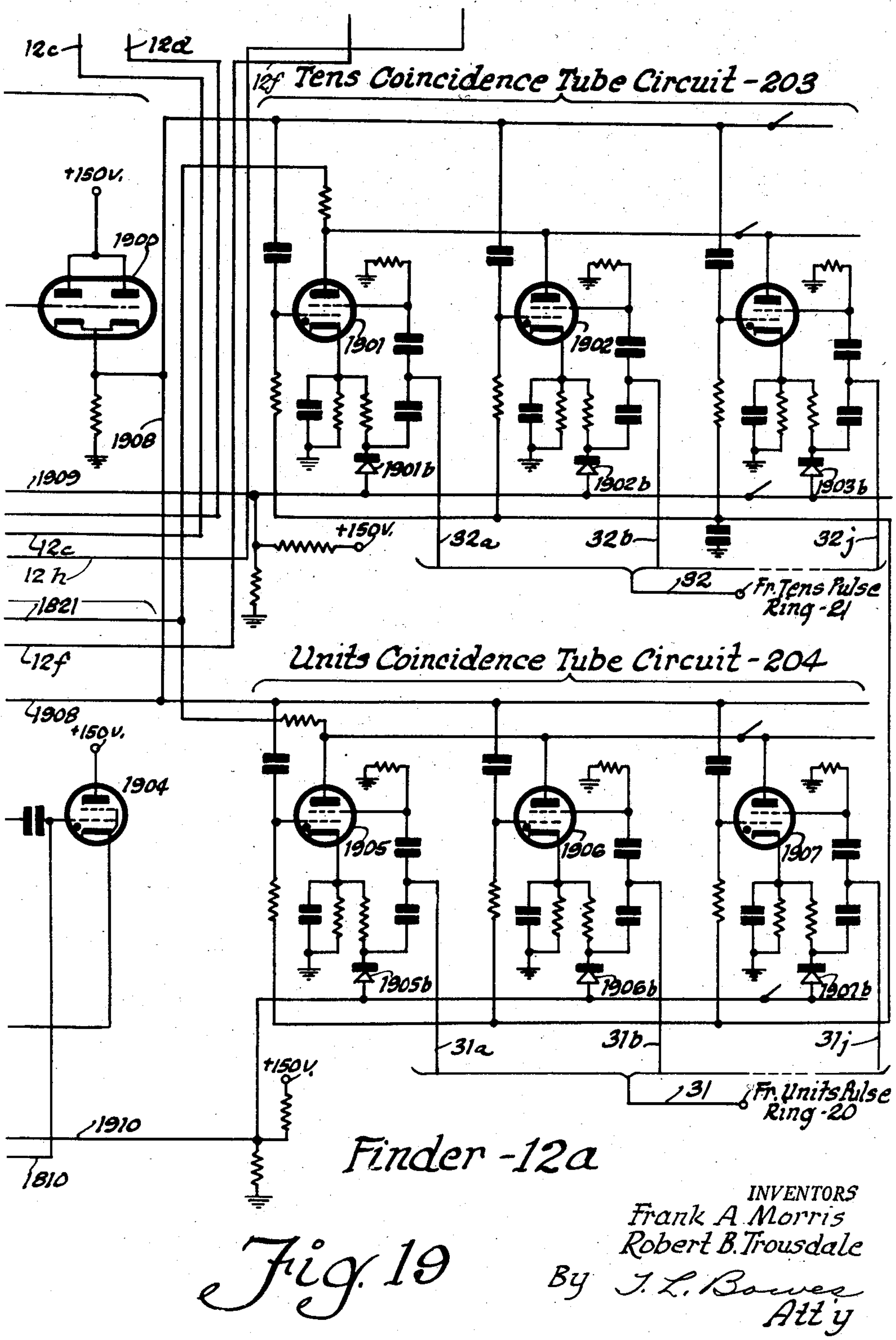
Figure 21:
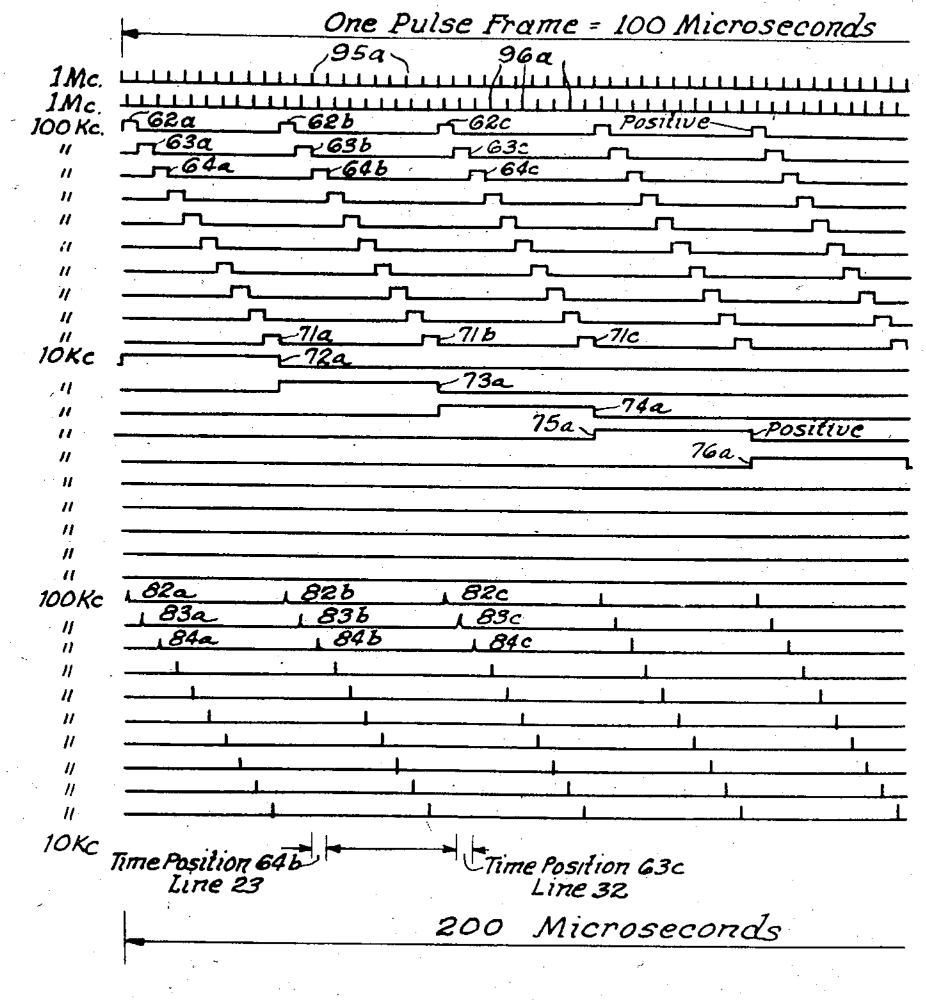
Figure 22:
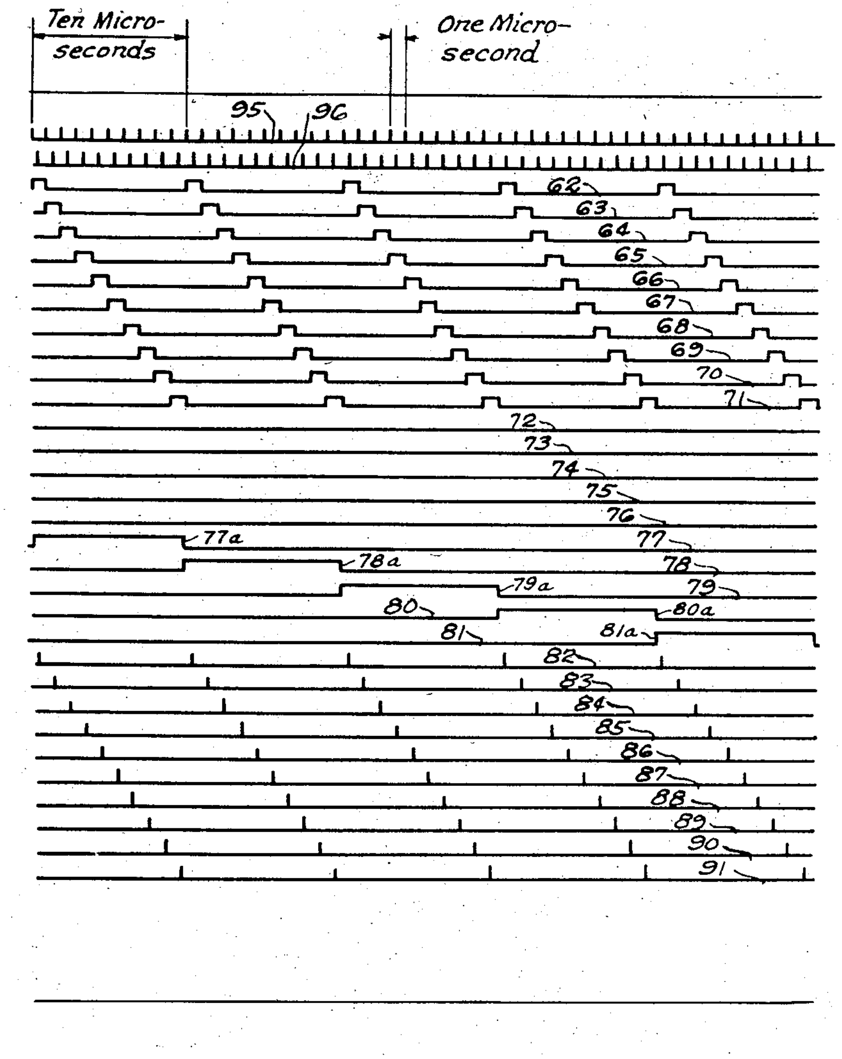
Figure 23:
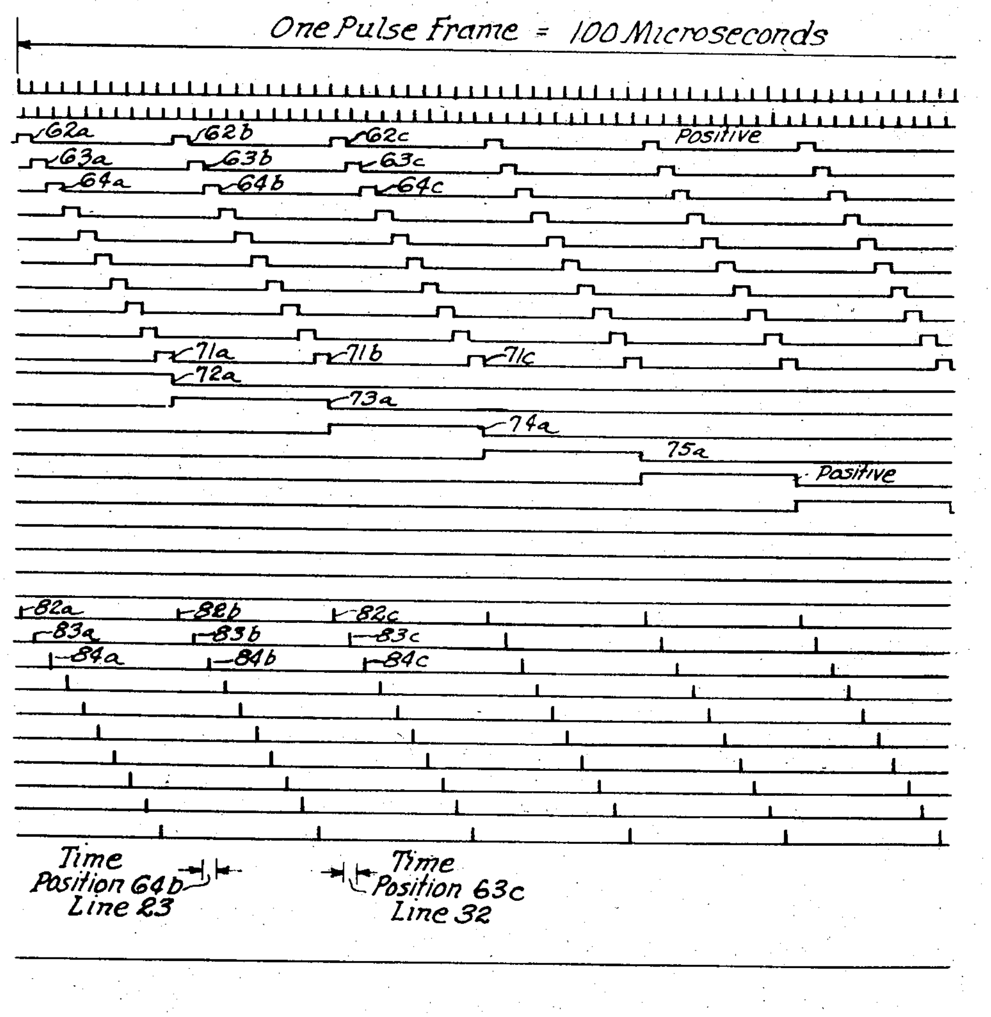
Figure 24:
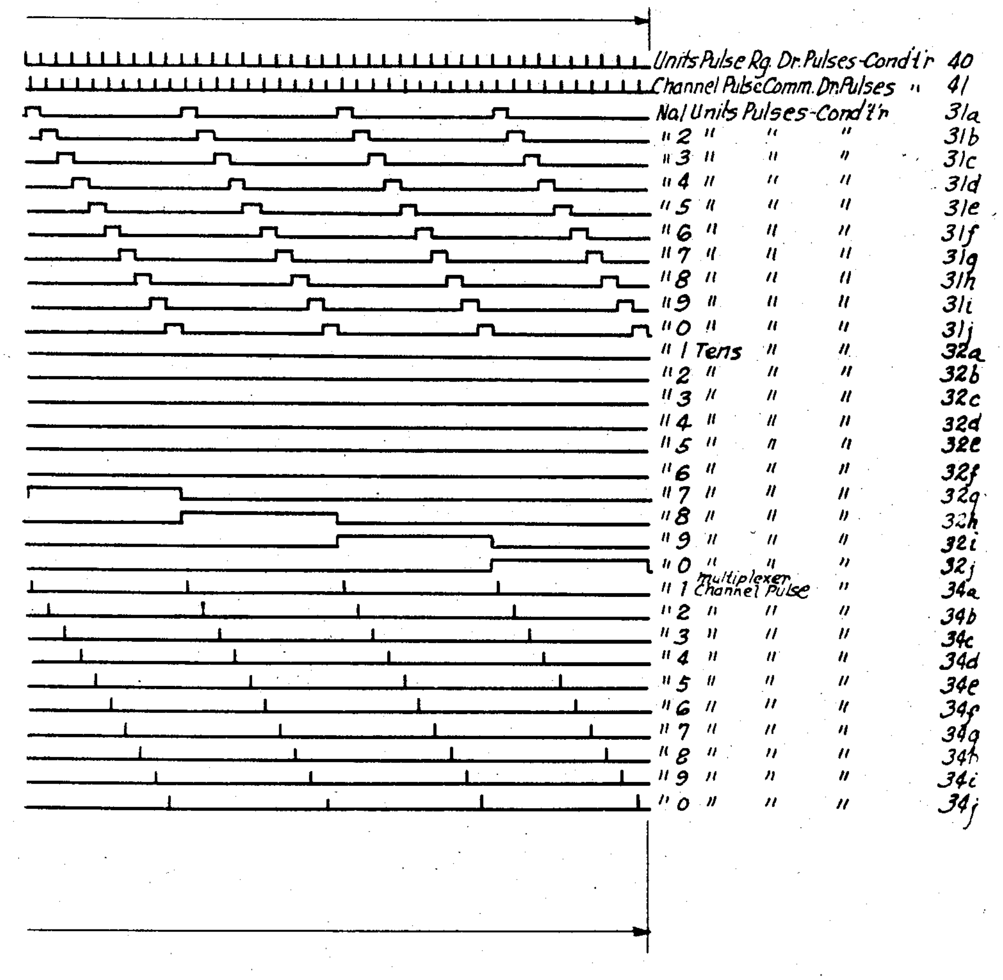

The tens coincidence tube circuit 203 comprises 10 gate control tubes, of which the first, second and third are indicated as the tubes 1901, 1902 and 1903, in Fig. 19. These gate control tubes have individually associated therewith the pulse gating rectifiers 1901*b*, 1902*b*, 1903*b*, etc. and the gate control tubes are arranged to be jointly controlled by pulses delivered thereto from the pulse input circuit 200 over the conductor 1908 and the positive tens pulses successively transmitted thereto over the positive tens pulse conductors 32*a*, 32*b*–32*j*, inclusive, from the tens pulse ring circuit 21. The tens pulses gated by the "on" tube of the circuit 203 are impressed upon the finder pulse forming circuit 205 over a path which includes the conductor 1909. Similarly, the units coincidence tube circuit 204 comprises ten gate control tubes, of which the first, second and third tubes 1905, 1906 and 1907 are illustrated in Fig. 19, these tubes having pulse gating crystal rectifiers 1905*b*, 1906*b* and 1907*b* individually associated therewith. As jointly controlled by pulses delivered to the circuit 204 over the conductor 1908 and the positive units pulses successively transmitted thereto over the units pulse conductors 31*a*, 31*b*–31*j*, inclusive, from the units pulse ring circuit 20, the circuit 204 responds by gating units pulses to the finder pulse forming circuit 205 over a path which includes the conductor 1910. The finder pulse forming circuit 205 comprises a pulse forming tube 1805 and a pulse shaping and inverter tube 1804 connected in tandem in the order named.

In order to provide the above described line lockout operation, the pulse forming circuit 205 is controlled by the potential developed on the conductor 12*h* by the link timeout and release circuit 301 in the associated connector 12*b*, as well as the pulses gated to the circuit 205 from the two coincidence tube circuits 203 and 204. When the potential on the conductor 12*h* is at a relatively high positive value, the circuit 205 develops finder pulses at the output side of this circuit which are impressed upon the pulse combining circuit 202 over two paths which respectively include the coupling condensers 1808 and 1809. The pulse combining circuit 202 comprises a busy pulse and finder gate pulse output tube 1800 and a pulse mixer tube 1801, both of which tubes are arranged to be controlled by the finder pulse forming circuit 205. The tube 1801 is also arranged to respond to busy pulses transmitted thereto over the busy pulse in conductor 52*b* from the busy pulse driver channel in the link coupling circuits 24. The circuit 202 functions to gate busy pulses to the busy pulse out conductor 52*a* when the finder 12*a* is operatively associated with a calling line and these busy pulses are transmitted over the conductor 52*b* to all of the finders and connectors of the system. The circuit 202 also functions to gate finder gate pulses to the connector 12*b* over the connector 12*d* when the finder 12*a* is operatively associated with a calling line, and conditions the pulse input circuit 200 so that this latter circuit will accept only those pulses which occur in the time position assigned to the calling line with which the finder 12*a* is operatively associated.

The pulse input circuit 200, the finder pulse and busy pulse combining circuit 202, the tens coincidence tube circuit 203, the units coincidence tube circuit 204, and the +B switching circuit 201 may all be substantially identical to the corresponding system components shown and described in detail in the copending application Serial No. 336,316, identified above. However, these circuits are adapted to operate with the line lockout facilities described above so that these circuits will be described in sufficient detail to facilitate an understanding of the line lockout operation of the finder 12*a*. With regard to the self-allotting circuit 206, this circuit may be identical to the corresponding circuit component shown in the copending application Serial No. 257,712, filed November 23, 1951, which is assigned to the same assignee as the present invention, so that a detailed description of this circuit is considered unnecessary herein. The gas filled tubes embodied in the finder 12*a*, namely, the ten tubes of the tens coincidence tube circuit 203, the ten tubes of the units coincidence tube circuit 204, and the three tubes of the +B switching circuit 201 are highly sensitive thyratrons, preferably of the RCA commercial type 5696. The two dual triodes 1601 and 1700 are preferably of the commercial 6J6 type, the triodes 1600 and 1603 are preferably of the commercial 6C4 type, the pentode 1604 is preferably of the commercial 6AU6 type and the pentode 1602 and 1605 are preferably of the 6AS6 commercial type.

Operational details of the components of the finder 12*a* may best be explained with reference to the functions performed by this finder in handling a line knockout condition on the above described revertive call originating at the substation A′ and routed to the substation B′. In this regard, it will be recalled from the general description of the system that when the revertive call is initiated on the line 32, multiplexer pulses 83*c* appearing in the time position 63*c* assigned to the line 32 are transmitted from the multiplexer 11 over the conductor 50 to the first control grid of the finder control gate tube 1802. These multiplexer pulses are transmitted through the pulse input circuit 200 and over the conductor 1908 to the circuits 203, 204 and 201.

The +B switching circuit 201 responds to the pulses transmitted to this circuit over the conductor 1908 by developing positive operating anode potential of approximately 140 volts on the conductor 12c, which is transmitted to the associated connector 12b, and also supplies operating anode potential to the circuits 203 and 204 in the finder 12a over the conductor 1821. The tens coincidence tube circuit 203 responds by gating tens pulses 74a appearing on the conductor 32c over the conductor 1909 to the finder pulse forming circuit 205. Also, the units tube coincidence circuit 204 responds to this operating anode potential by gating units pulses appearing on the conductor 31b and transmitting these pulses over the conductor 1910 to the finder pulse forming circuit 205.

In the circuit 205, the tens pulses impressed upon the conductor 1909 are coupled through the condenser 1840 to the first control grid of the finder pulse mixing tube 1805 and the units pulses impressed upon the conductor 1910 are coupled through the condenser 1841 to the suppressor grid of the tube 1805. Both the first control grid and suppressor grid of the tube 1805 are controlled in accordance with the potential developed on the conductor 12h so that the tube 1805 is prevented from developing finder pulses in the time position assigned to the calling line in the event that the potential on the conductor 12h is at a relatively low positive value. More specifically, the first control grid of the tube 1805 is coupled through the resistor 1842 to a voltage divider network including the resistors 1843 and 1844 connected between the −100 volt supply and the conductor 12h and the suppressor grid of the tube 1805 is connected through the resistor 1845 to the junction point of the resistors 1843 and 1844. Normally, i.e., during periods when a link release signal is not transmitted over the conductor 12h, the potential on the conductor 12h is at a relatively high positive value substantially equal to the +B switch potential on the conductor 12c, so that both the control grid and suppressor grid of the tube 1805 are operated just below cut-off and can respond to the tens and units pulses impressed upon these grids. Accordingly, during the periods when the potential on the conductor 12h is at a relatively high positive value, the tube 1805 develops negative finder pulses at the anode thereof which occur during the time position 63c assigned to the calling line 32. These finder pulses are clipped, amplified and inverted in the tube 1804 and are coupled through the condenser 1808 to the control grid of the output tube 1800 and through the condenser 1809 to the left hand control grid of the pulse mixing tube 1801. In the circuit 202, the finder pulses impressed upon the left hand control grid of the tube 1801 have the effect of blocking the right hand section of this tube so that the busy pulses impressed upon the right hand control grid of this tube do not cause a response at the anode of the right hand section of the tube 1801. As a result, no negative busy pulses are developed at the anode of the right hand section of the tube 1801 during the time position 63c and the suppressor grid of the finder control gate tube 1802 is not driven negative during the time position 63c so that the tube 1802 is permitted to transmit or gate therethrough the multiplexer pulses 83c impressed upon the first control grid of the tube 1802 in the time position 63c

It will be recalled from the general description of the system that the link timeout and release circuit 301 in the associated connector 12b functions at the end of a link timeout interval to impress a link release potential, or, signal on the conductor 12h so that the link 12 is released irrespective of the calling condition which exists on the line 32. When the link 12 is released, the line lockout facilities in the line circuit 16 hold the line 32 in a line lockout condition so that this line cannot call in additional linkage and is held out of service until the calling condition is removed from the line.

More specifically, at the end of a link timeout interval, the potential on the conductor 12h is reduced to a relatively small positive value so that the first control grid and suppressor grid of the tube 1805 in the finder pulse forming circuit 205 are driven well beyond cut off and finder pulses are no longer developed by this tube. When this occurs, finder pulses are no longer impressed upon the left hand control grid of the tube 1801 so that the right hand section of this tube is permitted to respond to busy pulses which are impressed upon the right hand control grid of this tube over the conductor 52b. In this connection it will be understood that even though finder pulses are removed from the control grid of the output tube 1800 so that the finder no longer impresses busy pulses on the conductor 52a in the time position 63c, the line lockout circuit 2770 in the line circuit 16 continues to impress busy pulses on the conductor 52a in this time position and these busy pulses are repeated through the link coupling circuits 24 and over the conductor 52b to the right hand control grid of the tube 1801. Accordingly, these busy pulses are transmitted through the right hand section of the tube 1801 and the suppressor grid of the finder control gate tube 1802 is driven highly negative for the duration of the busy pulses appearing in the time position 63c assigned to the line 32. When the suppressor grid of the tube 1802 is thus driven highly negative during the time position 63c, the multiplexer pulses impressed upon the first control grid of the tube 1802 are prevented from being transmitted through this tube so that multiplexer pulse transmission through the input circuit 200 ceases.

When multiplexer pulse transmission through the circuit 200 ceases the +B switching circuit 201 responds thereto by removing operating anode potential from the conductor 12c so that the link 12 is released. More specifically, when multiplexer pulse transmission through the circuit 200 ceases, the condenser 1824 in the +B switching circuit 201 is permitted to charge through the resistor 1823 from the cathode resistor 1820 so that the potential across this condenser is increased to a value such that the tube 1806 fires. In firing, the tube 1806 discharges the condenser 1827 through the space current path thereof and the resistor 1829. Thus, a voltage of approximately 130 volts is developed across the resistor 1829 and this voltage spike is additively combined with the 140 volts across the condenser 1828 to produce a voltage across the resistor 1820 of approximately 270 volts. Thus, the cathode of the tube 1904 is driven positive relative to the anode of this tube and space current flow through this tube is interrupted so that the operating potentials are removed from the conductor 12c and the conductor 1821.

In the above description of the operation of the circuit 201 it has been assumed that the potential on the conductor 12f, which is connected to the shield grid of the +B extinguishing tube 1806, is substantially equal to ground potential so that the tube 1806 is permitted to fire when the timing tube 1807 remains extinguished and the potential across the condenser 1824 increases positively by an amount sufficient to bring the main control grid of the tube 1806 into the conductive region of this tube. However, as described above in connection with the general description of the system, the connector 12b, and more particularly the revertive call test circuit 296 thereof, is arranged to reduce the potential on the conductor 12f to a relatively high negative value when the revertive call test operation indicates that the call is revertive. When the potential on the conductor 12f is thus reduced to a relative large negative value, the +B extinguishing tube 1806 is prevented from firing even though multiplexer pulses are not transmitted to the +B switch timing tube 1807 and the condenser 1824 charges positively through the resistor 1823. Accordingly, the circuit 201 may be changed to a revertive call setting, by means of the revertive call hold signal or potential, on the conductor 12f, in which setting the circuit 201 does not respond to termination of multiplexer pulse transmission by releasing the link 12, but instead remains operatively associated with the calling line and continues to impress busy pulses on the conductor 52*a*, finder gate pulses upon the conductor 12*d* and a +B switch potential upon the conductor 12*c*. However, the circuit 201 is not changed to a revertive call setting until after the end of the second digit is dialed at the calling substation, so that the above described operation of the finder pulse forming circuit 205 in response to a change in the potential on the conductor 12*h* is effective to release the link 12 on a prolonged calling condition at any time until the second digit is completed.

On a revertive call, the hold signal on the conductor 12*f*, which is developed after the second digit is completed, may prevent the circuit 201 from responding to termination of multiplexer pulse transmission so that the link 12 could not be released if either the third digit is not completed or ringing on the revertive call continues beyond the link timeout interval. However, in order to permit the link 12 to be released at the end of the link timeout interval under any of the conditions described above in connection with the general description of the system, the connector 12*b* is arranged to change the potential on the conductor 12*f* back to its non-revertive condition so that the circuit 201 is always in a non-revertive setting when a link release signal is transmitted over the conductor 12*h*. Accordingly, the link 12 is released in response to the link release signal impressed upon the conductor 12*h* at the end of a link timeout interval for both revertive and non-revertive calls.

*Connector 12b*

Figure 2:
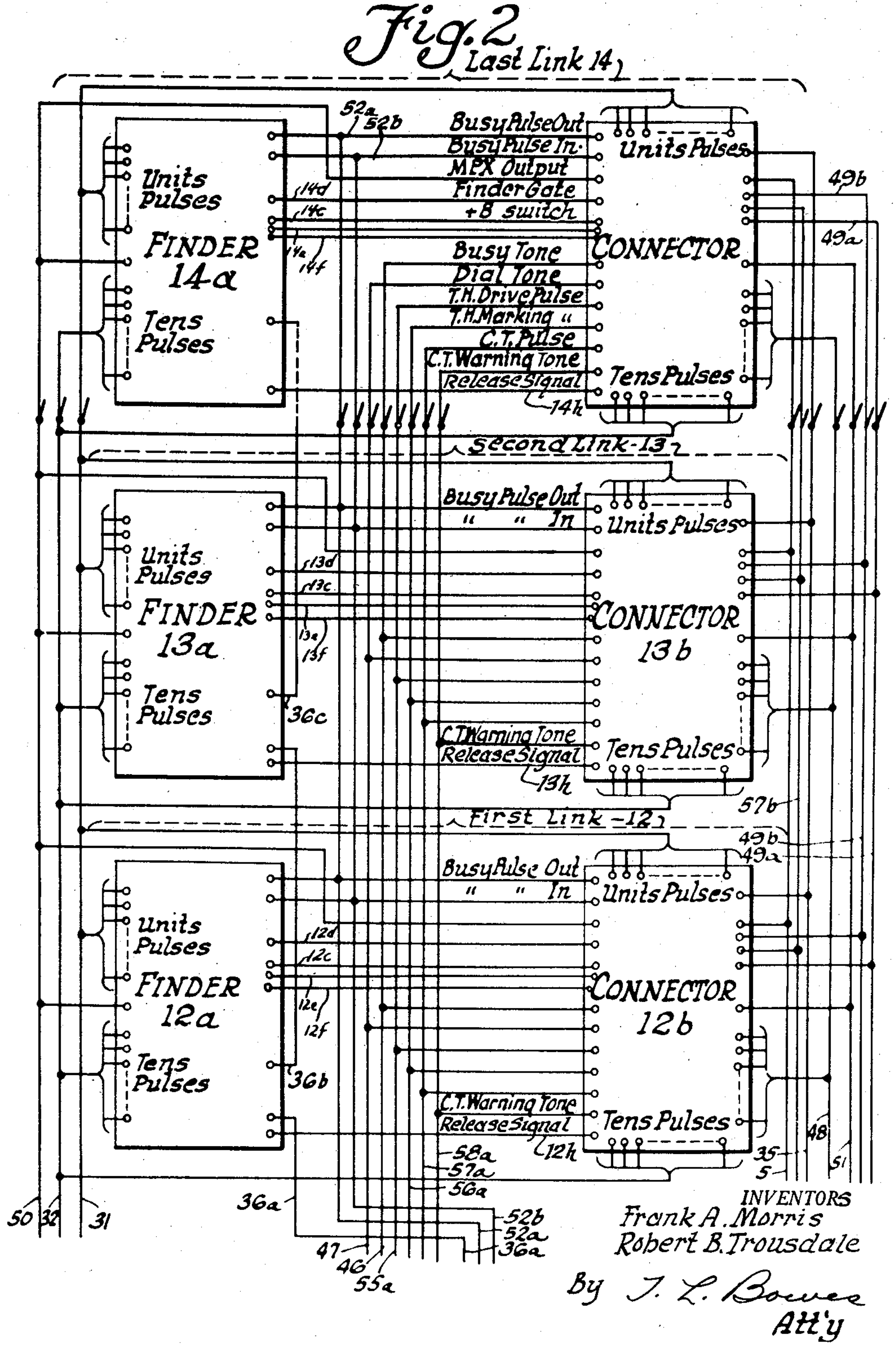
Figure 2A:
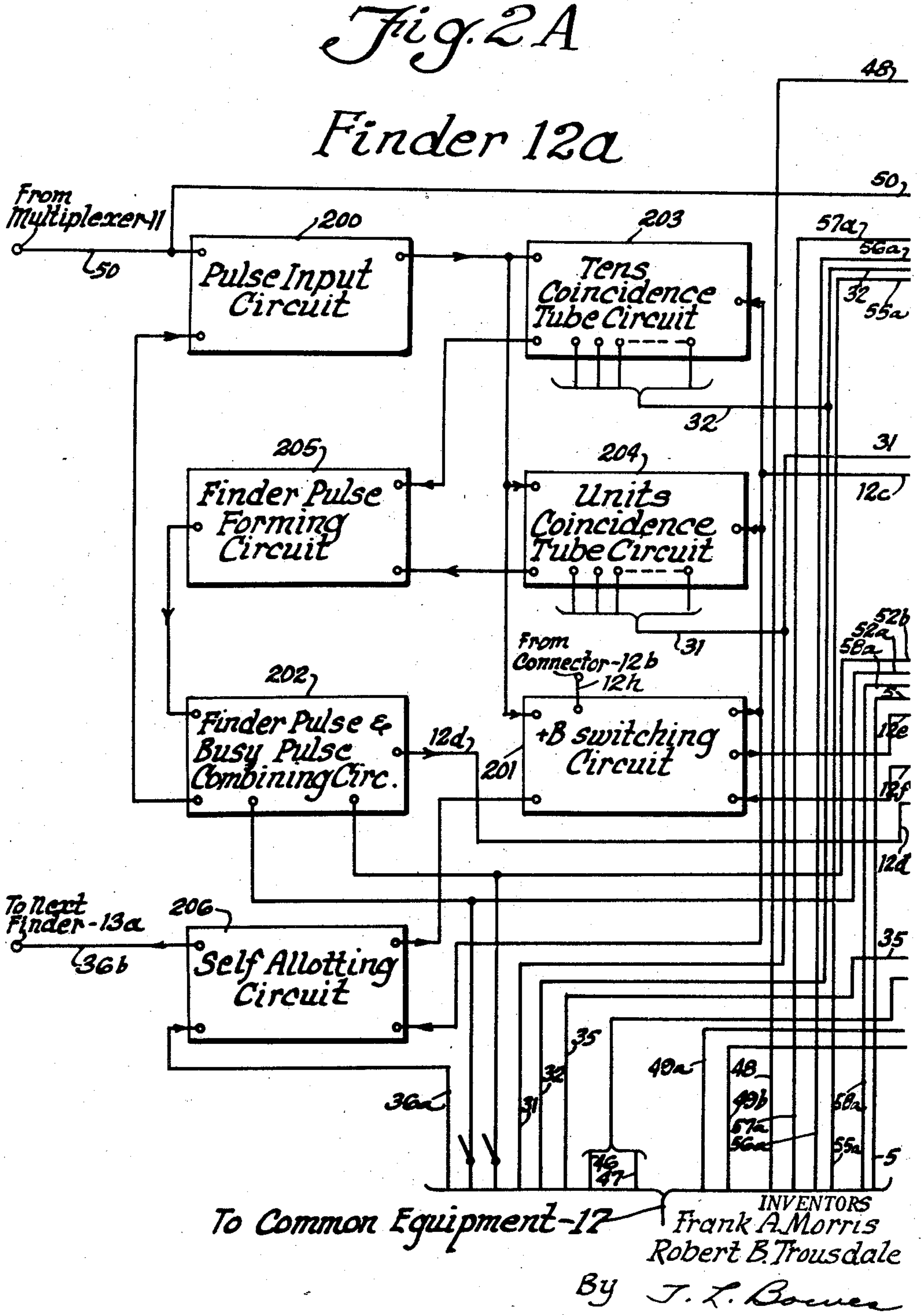
Figure 2B:
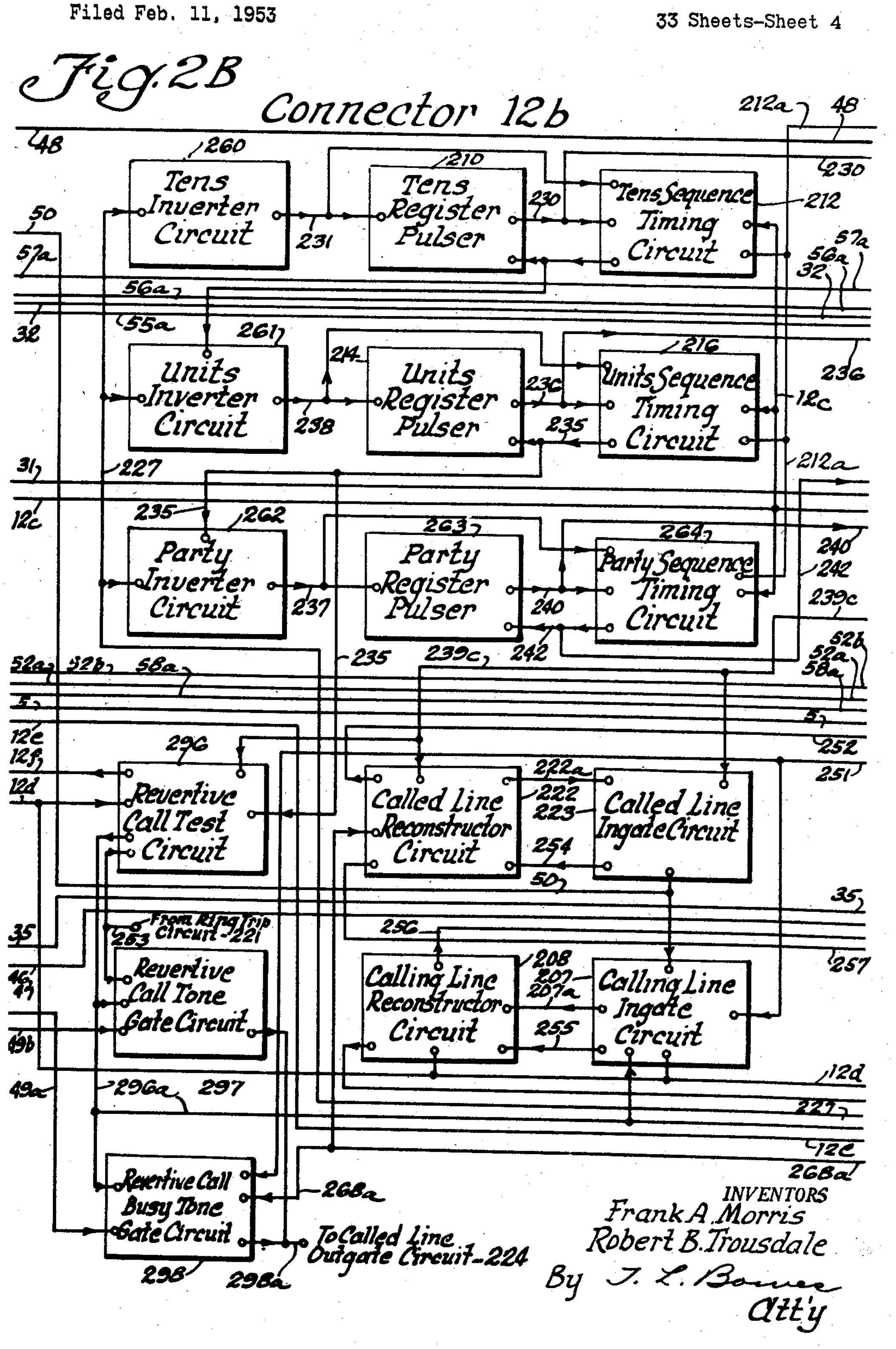

As explained generally heretofore in connection with Figs. 2B and 2C of the drawings, the connector 12*b* generally comprises the calling and called line in gate circuits 207 and 223, the calling and called line out gate circuits 226 and 224, the calling and called line reconstructor circuits 208 and 222, a dial impulse integrator circuit 209; tens, units and party register pulsers 210, 214 and 263; tens, units and party inverter circuits 260, 261 and 262; tens, units and party sequence timing circuits 212, 216 and 264; and tens, units and party digit registers 211, 215 and 265. The connector 12*b* is also diagrammatically illustrated in Figs. 2B and 2C of the drawings as comprising tens, units and party register advancers 280, 281 and 282; a connector pulse forming circuit 217, a busy test circuit 218, a busy lock circuit 219, a busy gate circuit 220, a ring trip circuit 221, a trunk hunting control circuit 283, a conversation timing warning tone circuit 284, supervisory tone gate circuits 225, a code start circuit 268, a conversation timing control circuit 285, a revertive call test circuit 296, a revertive call tone gate circuit 297, a revertive call busy tone gate circuit 298, and a link timeout and release circuit 301. The functions performed by the above-identified components of the connector 12*b* are also generally described above with reference to Figs. 2B and 2C of the drawings.

Figure 6:
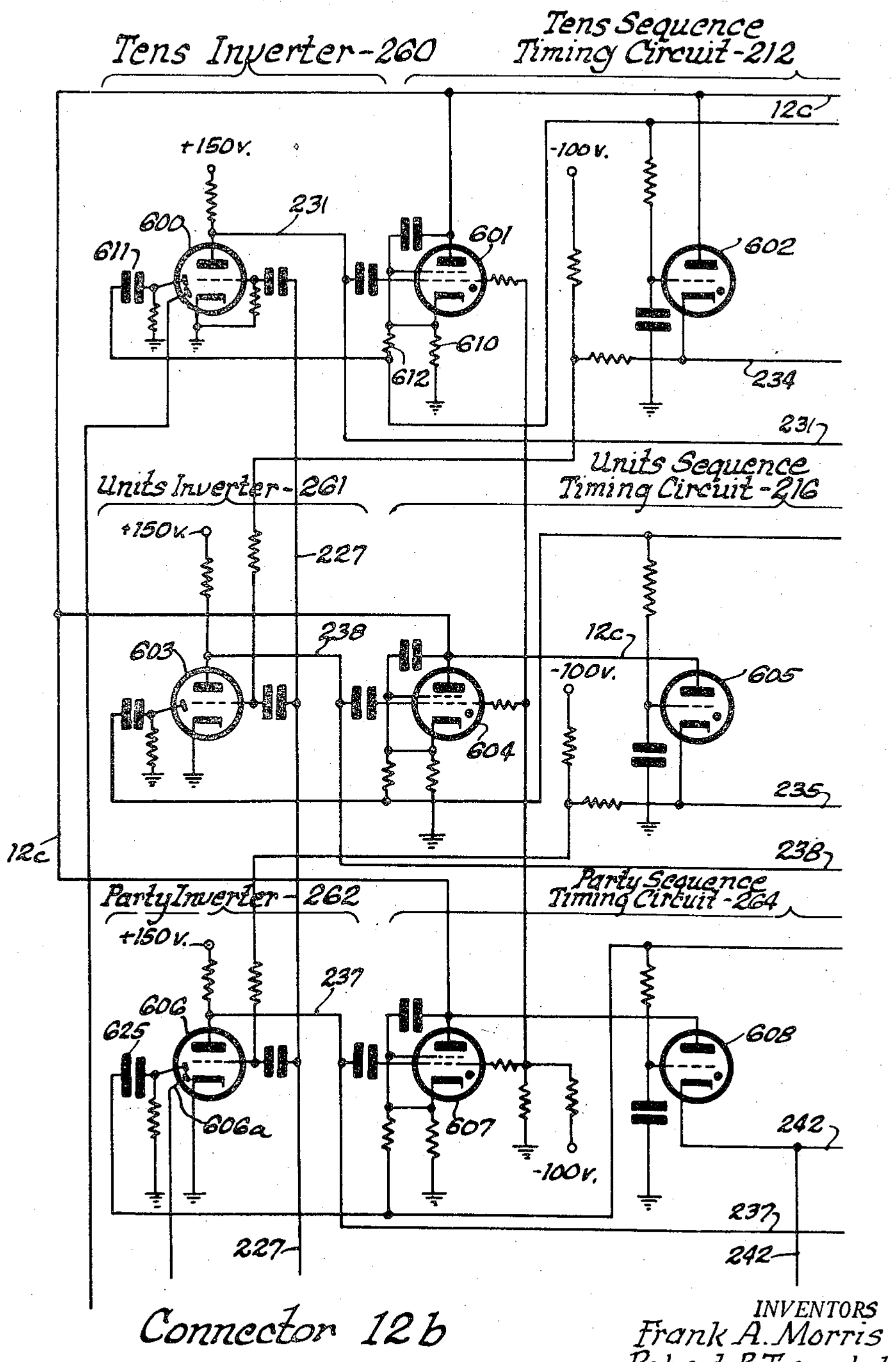
Figure 7:
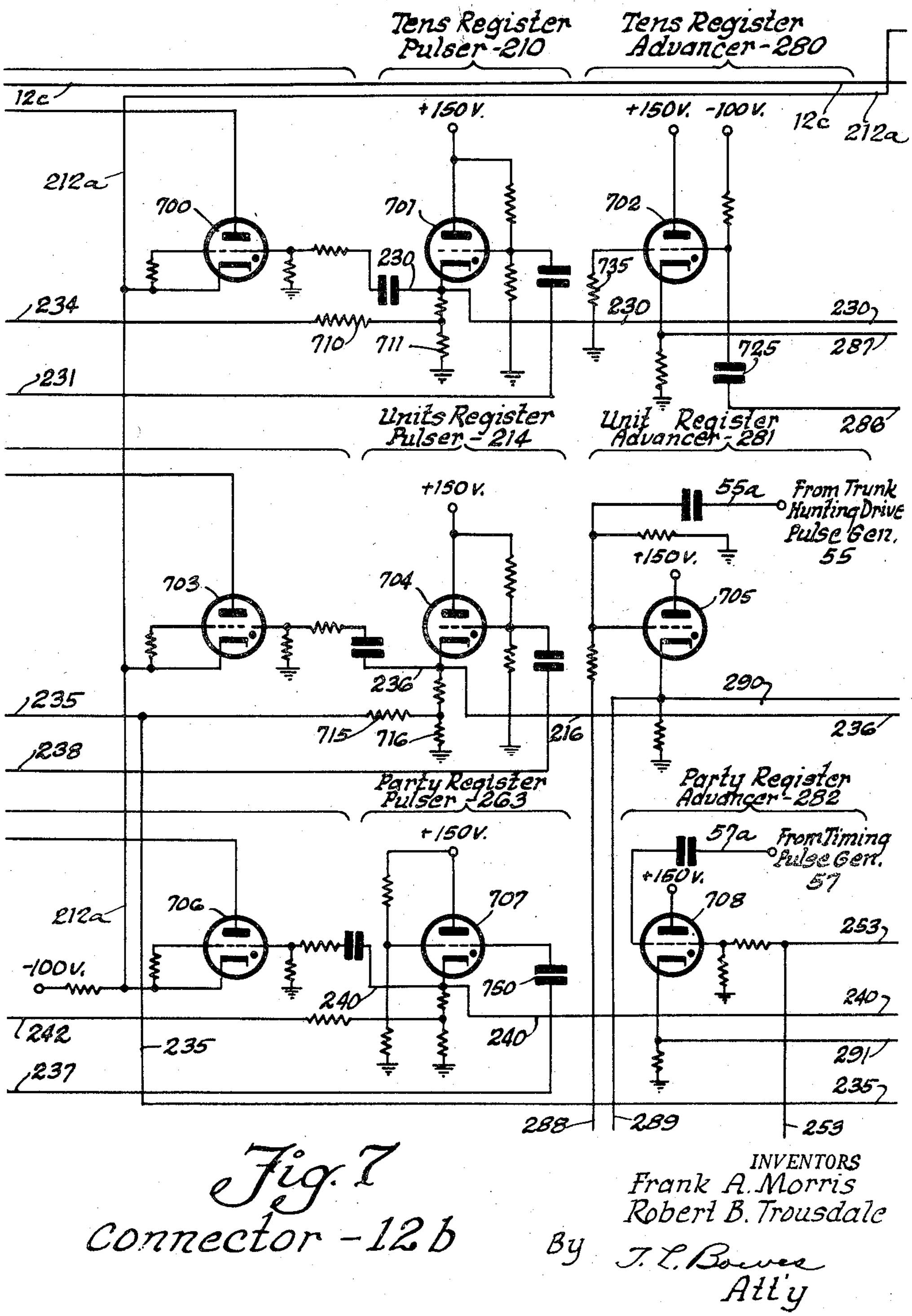
Figure 8:
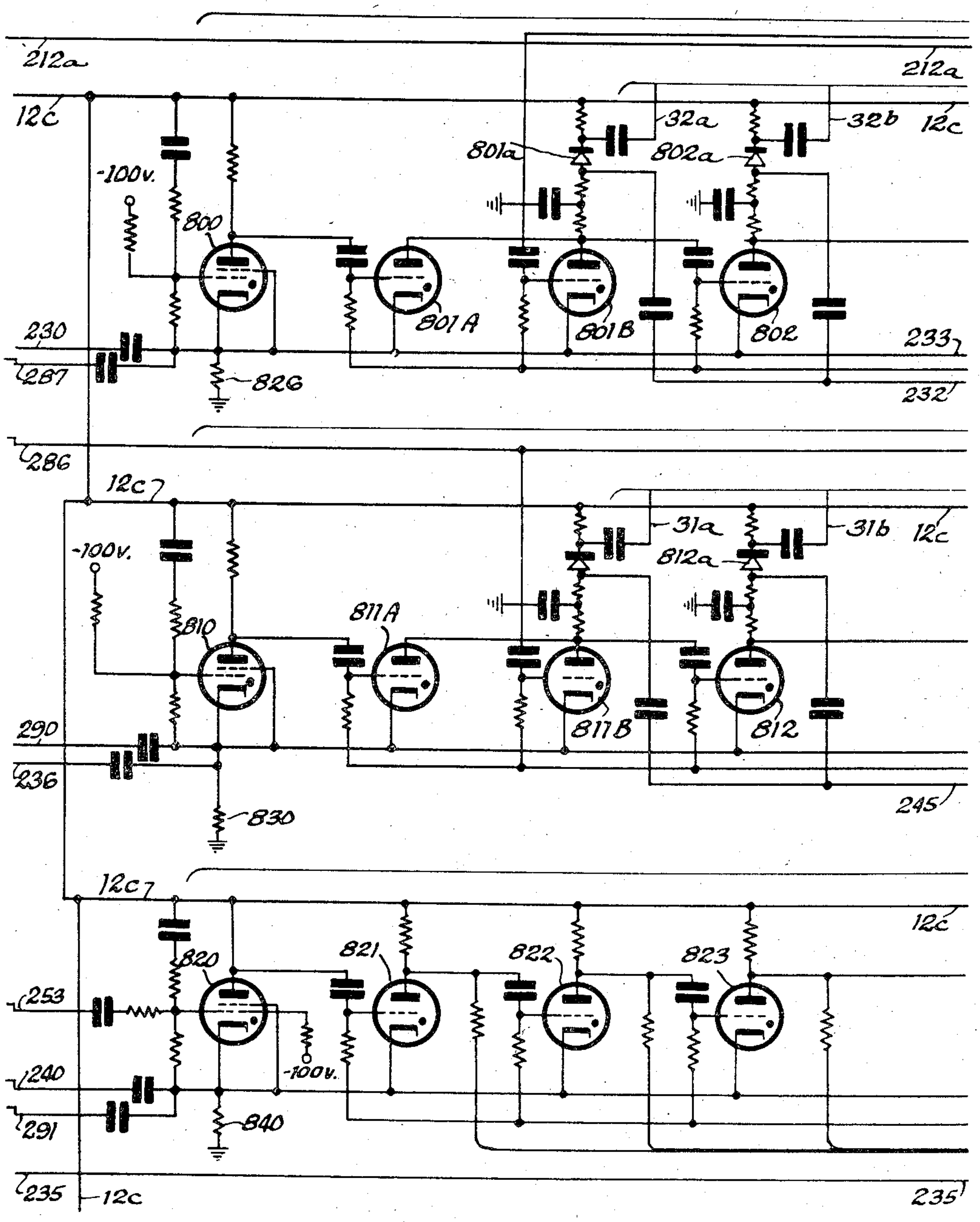
Figure 9:
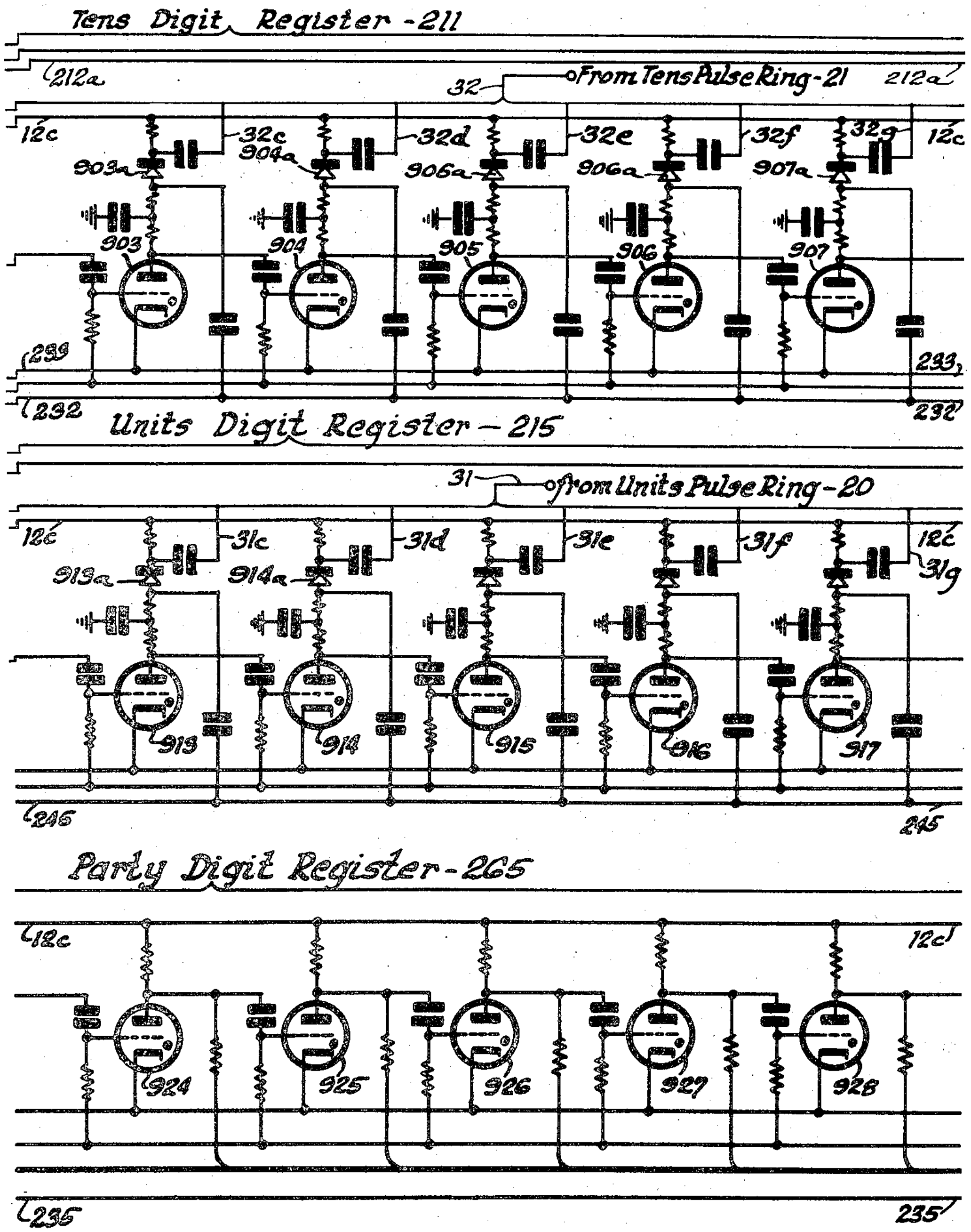
Figure 10:
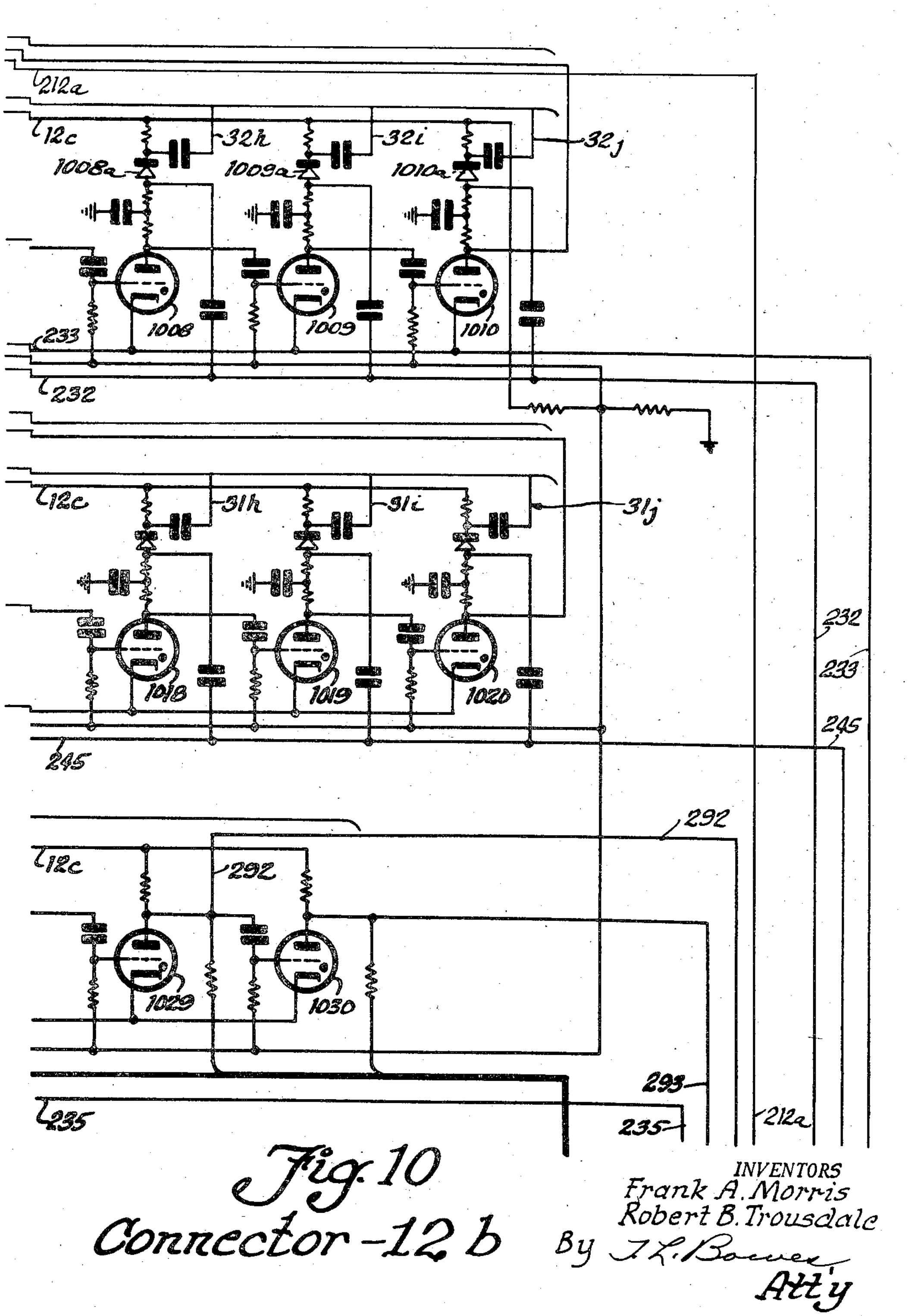
Figure 11:
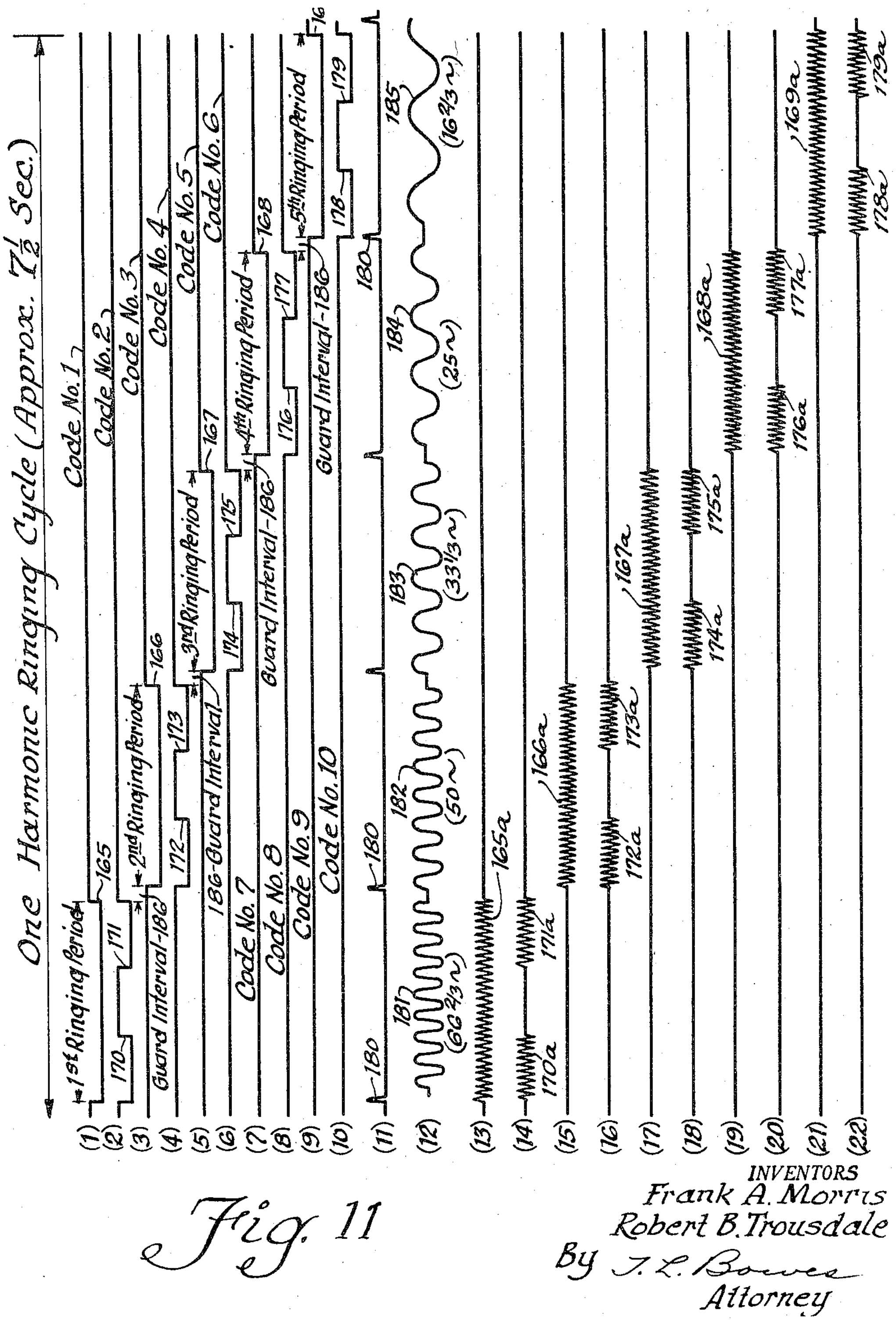
Figure 12:
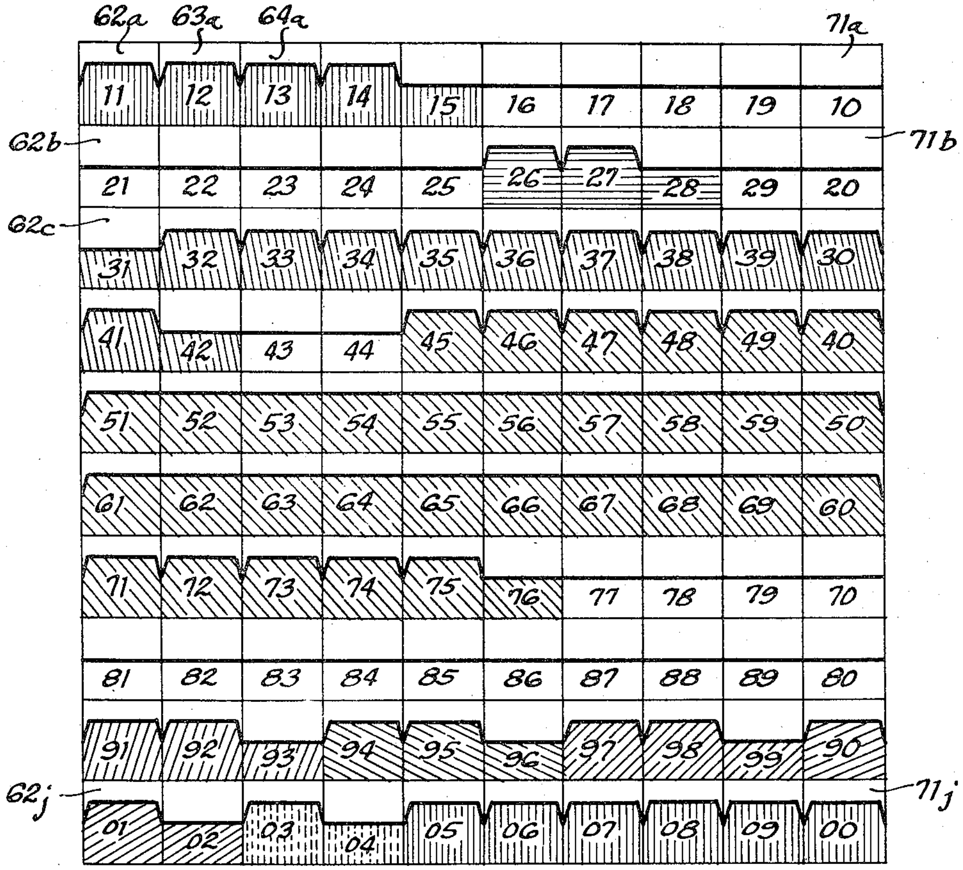
Figure 13:
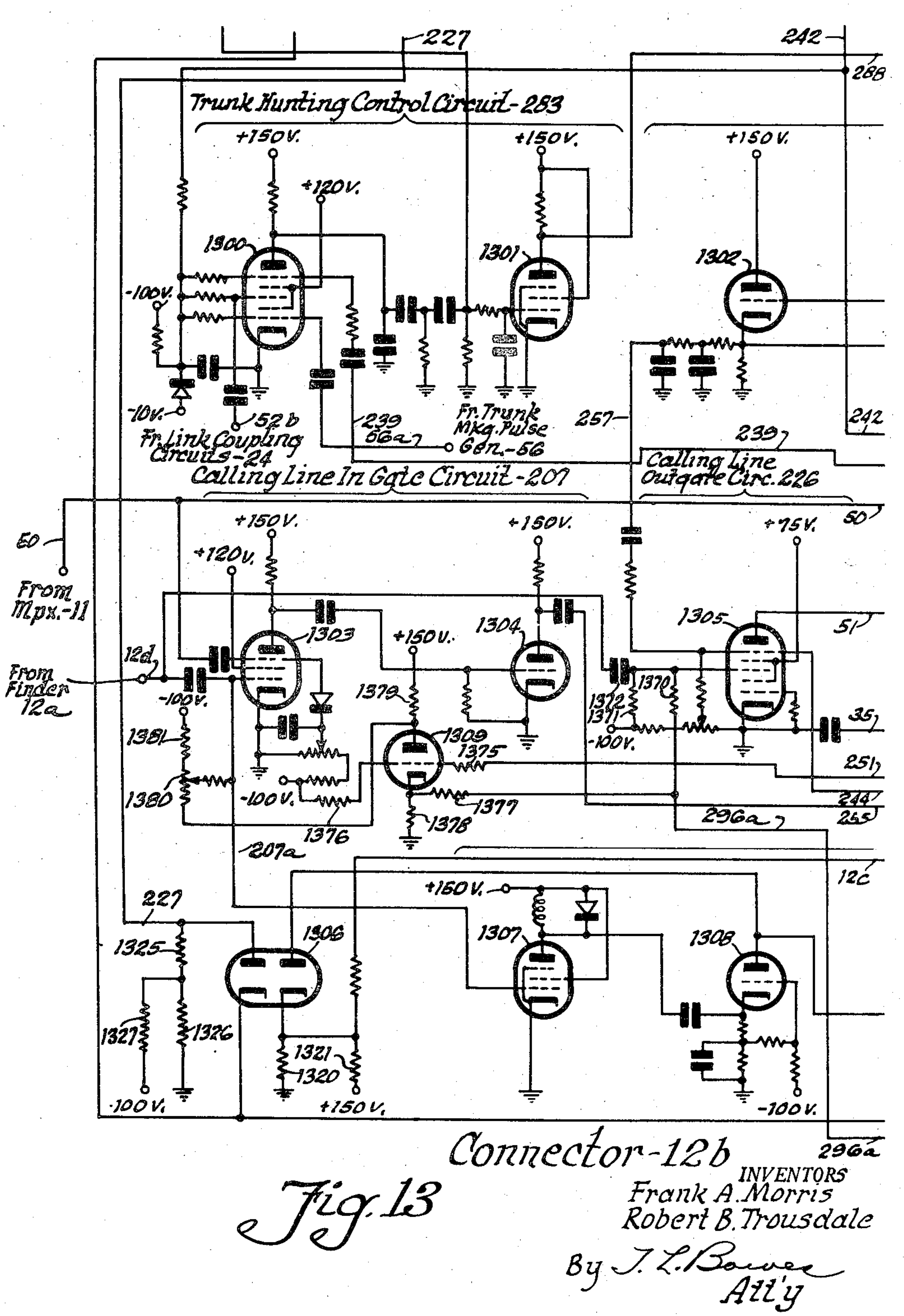
Figure 14:
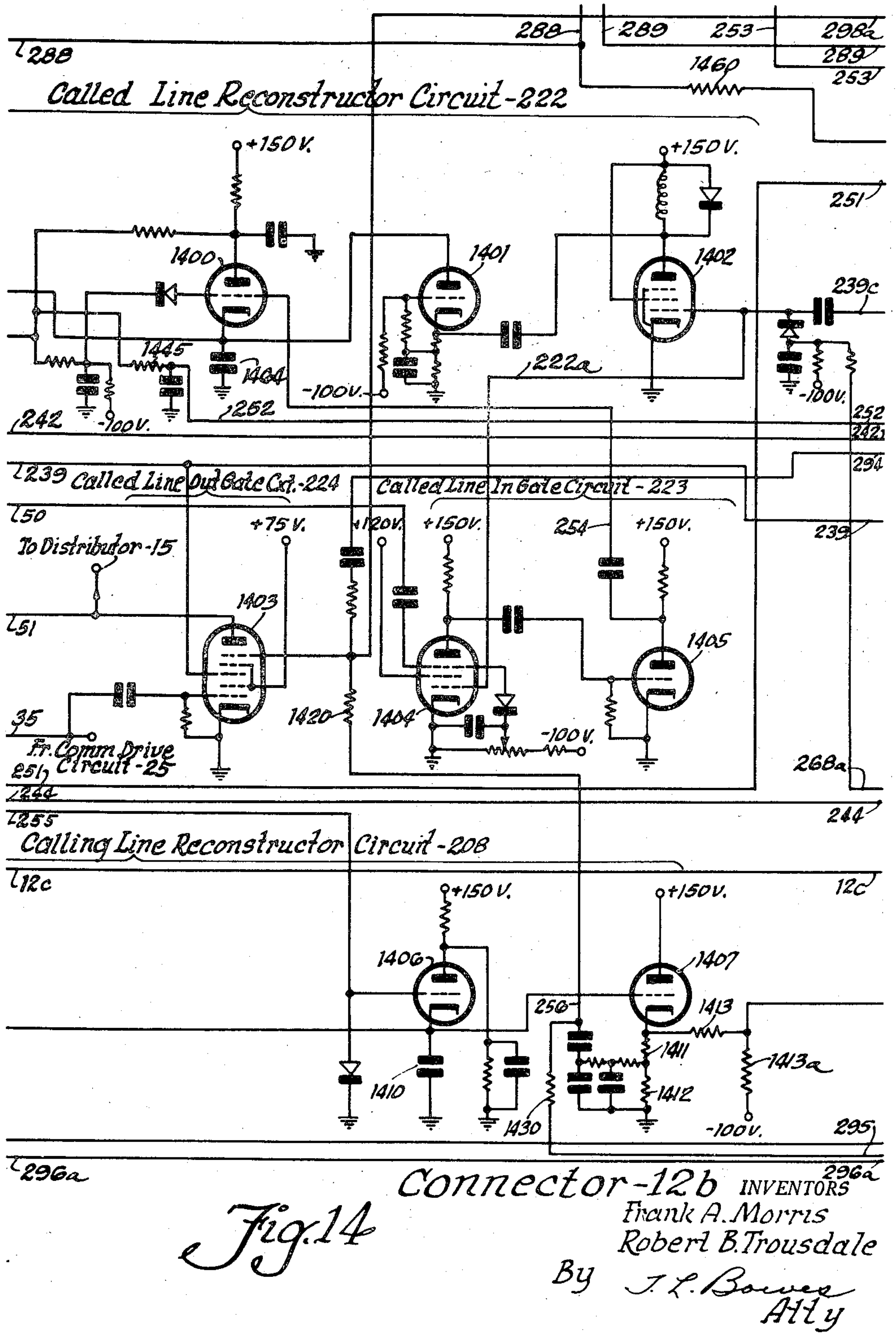
Figure 15:
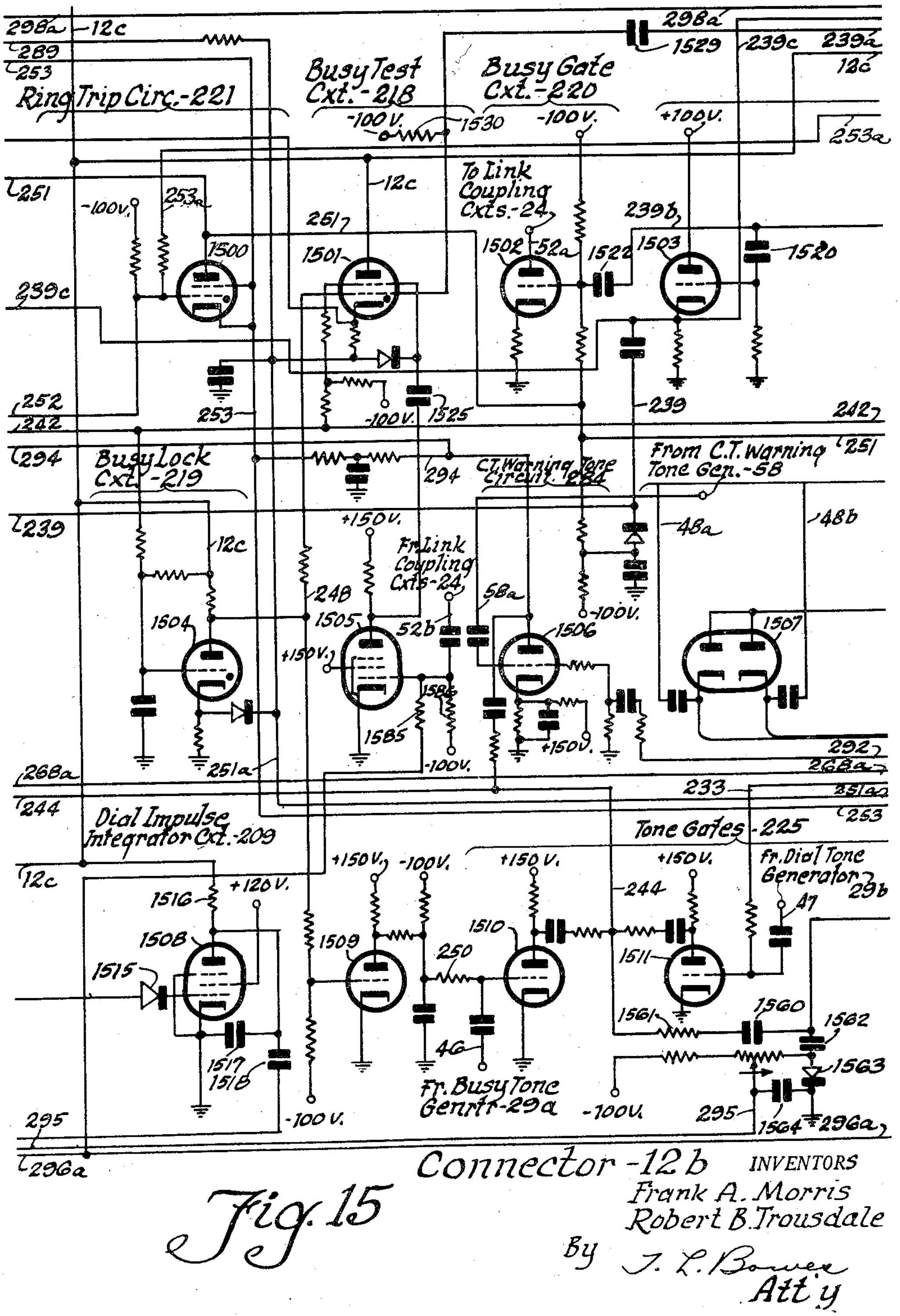
Figure 16:
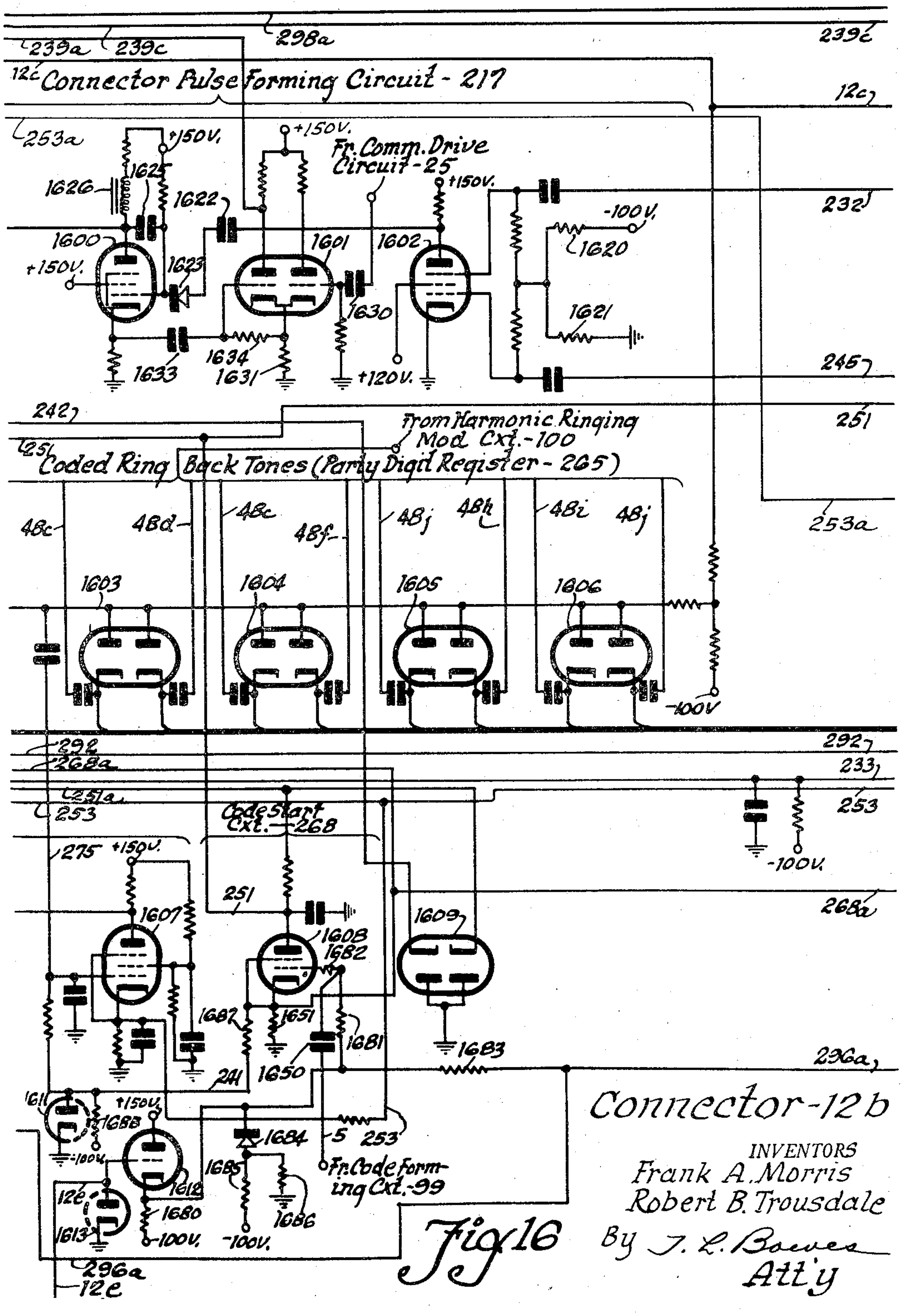
Figure 17:
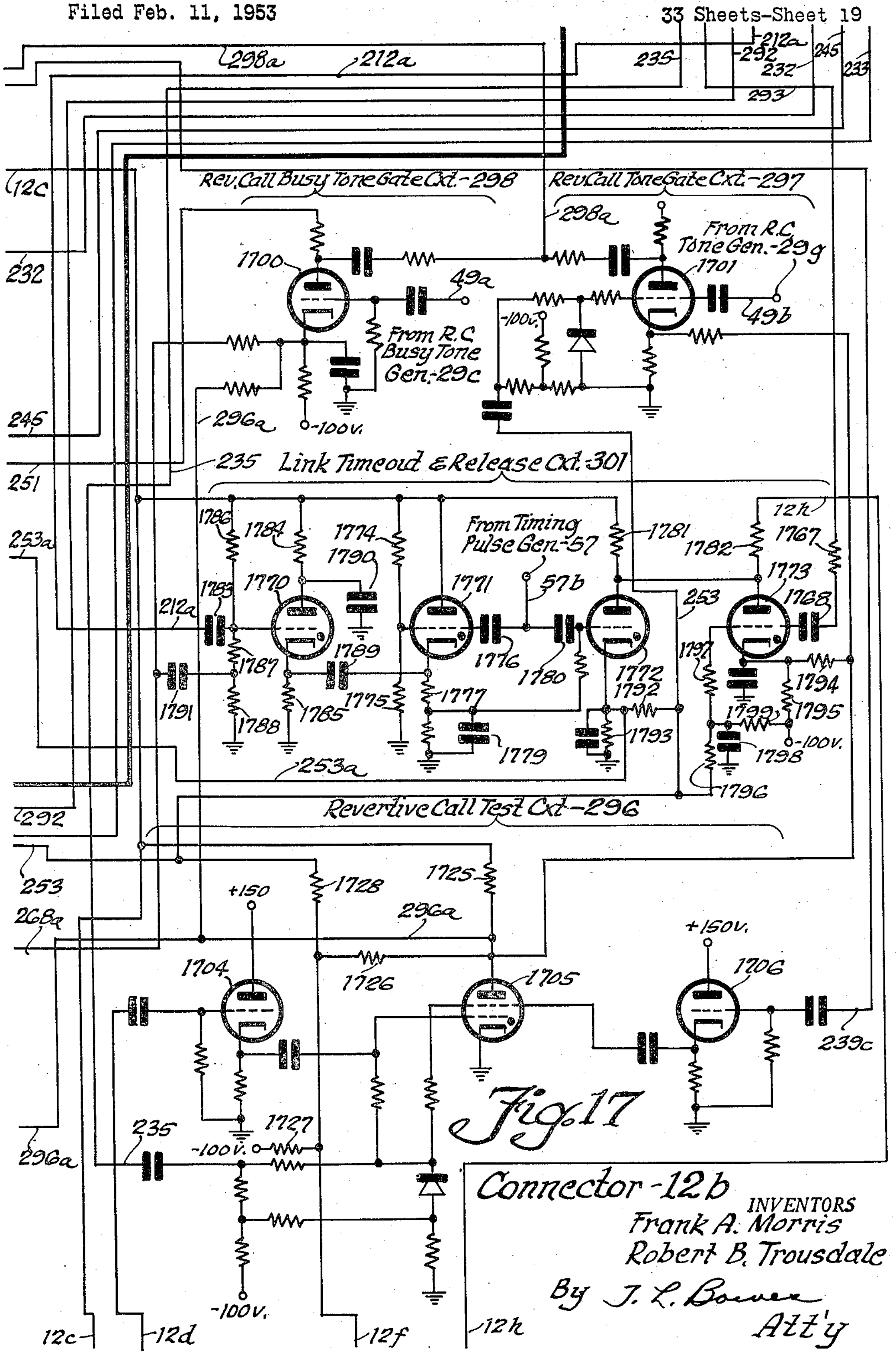

Referring now more particularly to Figs. 6–10, inclusive, and 13–17, inclusive, of the drawings, where the detailed circuitry of the connector 12*b* is illustrated, it will be readily understood that the details of this connector may best be understood in terms of the functional significance of the various components thereof. In order to correlate these ten figures with the diagrammatic showing of Figs. 2B and 2C, it may be pointed out that the tens, units and party inverters 260, 261, 262, are shown in Fig. 6 as respectively including the reverter tubes 600, 603 and 606; the tens sequence timing circuit 212 is shown in Figs. 6 and 7 as comprising a start tube 601, a timing tube 602 and a condenser discharge tube 700; the units sequence timing circuit 216 is shown in Figs. 6 and 7 as comprising a start tube 604, a timing tube 605, and a condenser discharge tube 703; and the party sequence timing circuit 264 is shown in Figs. 6 and 7 as comprising a start tube 607, a timing tube 608 and a condenser discharge tube 706. The register pulsers 210, 214 and 263 are shown in Fig. 7 of the drawings as respectively including the pulser tubes 701, 704 and 707 and the tens, units and party register advancers 280, 281 and 282 are shown in Fig. 7 of the drawings as respectively including the pulser tubes 702, 705 and 708. The tens digit register 211 is shown in Figs. 8, 9 and 10 of the drawings as including the primer tube 800, the parallel connected impulse counting tubes 801A and 801B which together comprise the first impulse counting stage and nine other impulse counting tubes 802, 903–907, inclusive, and 1008–1010, inclusive. The units digit register 215 is shown in Figs. 8, 9 and 10 of the drawings as comprising the primer tube 810, the parallel connected tubes 811A and 811B which together comprise the first impulse counting stage, and nine other impulse counting tubes 812, 913–917, inclusive, and 1018–1020, inclusive. The party digit register 265 is shown in Figs. 8, 9, 10, 15 and 16 of the drawings as comprising the primer tube 820, ten impulse counting tubes 821–823, inclusive, 924–928, inclusive, 1029 and 1030, and five double diode gate tubes 1507 and 1603–1606, inclusive. The trunk hunting control circuit 283 is shown in Fig. 13 of the drawings as comprising the trunk hunting control tube 1300 and the trunk hunting inverter tube 1301; the calling line in gate circuit 207 is shown in Fig. 13 of the drawings as comprising the gate tube 1303, the inverter tube 1304 and a revertive call control tube 1309; the called line reconstructor circuit 222 is shown in Figs. 13 and 14 of the drawings as comprising a peaker tube 1402, a condenser discharging tube 1401, a condenser charging tube 1400 and a cathode follower output tube 1302; the calling line out gate circuit 226 is shown in Fig. 13 of the drawings as comprising a single triple-grid gate tube 1305; the calling line reconstructor circuit 208 is shown in Figs. 13 and 14 of the drawings as comprising the peaker tube 1307, the condenser discharging tube 1308, the condenser charging tube 1406, a clamping diode including the righthand section of the duo-diode 1306 and a cathode follower tube 1407; the called line out gate circuit 224 is shown in Fig. 14 of the drawings as comprising the single triple-grid gate tube 1403; and the called line in gate circuit 223 is shown in Fig. 14 of the drawings as comprising the gate tube 1404 and the inverter tube 1405. The ring trip circuit 221 is shown in Fig. 15 of the drawings as comprising the ring trip tube 1500; the busy test circuit 218 is shown in Fig. 15 as comprising the busy test tube 1501 and the busy pulse inverter tube 1505; the busy lock circuit 219 is shown in Fig. 15 as comprising the busy lock tube 1504 and the inverter tube 1509; the dial impulse integrator circuit 209 is shown in Figs. 13 and 15 as comprising the dial impulse integrator tube 1508 and a diode clamping tube comprising the left-hand section of the duo-diode 1306; the busy gate circuit 220 is shown in Fig. 15 of the drawings as comprising the gate tube 1502; the connector pulse forming circuit 217 is shown in Figs. 15 and 16 as comprising a connector pulse mixer tube 1602, a connector pulse sharpening tube 1601, an inverter tube 1600 and a cathode follower output tube 1503; the conversation timing warning tone circuit 284 is shown in Fig. 15 as comprising the gate tube 1506; the dial tone gate circuit in the network 225 is shown in Fig. 15 as comprising the dial tone gate tube 1511 and the busy tone gate circuit in the network 225 is shown in Fig. 15 as comprising the busy tone gate tube 1510. The code start circuit 268 is shown in Fig. 16 as comprising a code start tube 1608, a revertive ring start control tube 1612 and a clamping diode 1613; and the ring back tone gate circuit in the network 225 is shown in Fig. 16 as comprising the ring back tone gate tube 1607 and a clamping diode 1611. The revertive call busy tone gate circuit 298 is shown in Fig. 17 as comprising the tone gate tube 1700; the revertive call tone gate circuit 297 is shown in Fig. 17 as comprising the tone gate tube 1701;

the link timeout and release circuit 301 is shown in Fig. 17 as comprising the timeout restarter tube 1770, the primer tube 1771, the control tube 1772 and the link release tube 1773; and the revertive call test circuit 296 is shown in Fig. 17 as comprising the cathode follower tubes 1704 and 1706 and the revertive call test tube 1705.

The manner in which the identified tubes of the connector 12b are interconnected is pointed out more fully below with reference to the operation of the individual circuits. Although the identified tubes may be of any desired commercial type having the required operating characteristics, it is pointed out preferably the tubes 600, 603, 606, 1400, 1401, 1308 and 1406 are duo-diode triodes of the commercial type 6AQ6; the tubes 1302, 1304, 1309, 1405, 1407, 1502, 1503, 1509, 1510, 1511, 1612, 1700, 1701, 1704 and 1706 are triodes of the commercial type 6C4; the tube 1601 is a double triode of the commercial type 6J6; the tubes 1303, 1404, and 1602 are pentodes of the commercial type 6AS6; the tubes 1301, 1307, 1402, 1600, 1607, 1505 and 1508 are pentodes of the commercial type 6AU6; the tubes 1300, 1305 and 1403 are triple-grid tubes, preferably of the RCA developmental type A-5727; and the tubes 1306, 1507, 1603–1606, inclusive, 1609, 1611 and 1613 are hot cathode duo-diodes of the commercial type 6AL5. Preferably, the gas filled thyratrons of the hot cathode type included in the connector 12b, namely, the tubes 601, 604, 607, 800, 810, 820, 1500, 1501, 1608 and 1705 are of the RCA commercial type 5696. The cold cathode gas filled triodes included in the connector 12b are preferably of the commercial type 5823. This group includes the tubes 602, 605, 608, 700–708, inclusive, 801A, 801B, 802, 811A, 811B, 812, 821–823, inclusive, 903–907, inclusive, 913–917, inclusive, 924–928, inclusive, 1008–1010, inclusive, 1018–1020, inclusive, 1029, 1030, 1504, 1770, 1771, 1772 and 1773.

Before considering the operation of the connector 12b it is pointed out that many of the circuit components of this connector may be substantially identical to the corresponding components described in detail in the copending application Serial No. 336,316, identified above. Specifically, the tens, units and party inverter circuits 260, 261 and 262; the tens, units and party register pulsers 210, 214 and 263; the tens, units and party sequence timing circuits 212, 216 and 264, the tens, units and party register advancers 280, 281 and 282; the tens, units and party digit registers 211, 215 and 265; the calling and called line in gate circuits 207 and 223; the calling and called line out gate circuits 226 and 224; the calling and called line reconstructor circuits 208 and 222; the busy test circuit 218, the busy lock circuit 219, the busy gate circuit 220, the ring trip circuit 221, the code start circuit 268, the dial impulse integrator circuit 209, the trunk hunting control circuit 223, the conversation timing warning tone circuit 284, the revertive call test circuit 296, the revertive call busy tone gate circuit 298 and the revertive call tone gate circuit 297 may all be substantially identical to the corresponding circuits identified by the same reference numbers in the copending application Serial No. 336,316, identified above. Accordingly, only a general description of these circuits will be made herein in connection with tracing of the above described line lockout operation of the connector 12b on both revertive and non-revertive calls, reference being had to the above identified copending application, Serial No. 336,316, for a detailed description of the operation of these circuits. However, it will be understood that in order to function properly with the line lockout facilities of the present invention, the above identified circuits may be employed to control or are controlled by different circuit arrangements from those disclosed in the above identified application, as will be described in more detail hereinafter.

In considering the operation of the connector 12b, reference is again made to the above described revertive call originating at the substation A′ associated with the line 32 and routed by way of the link 12 to the called substation B′ also associated with this line. From the general description of this call, it will be recalled that when the finder-connector link 12 is idle, the finder 12a withholds operating anode potential from the conductor 12c and also withholds finder gate pulses from the conductor 12d. Immediately the finder 12a is associated with the calling line 32, the +B switching circuit 201 thereof operates to impress a positive potential of 140 volts on the conductor 12c and almost immediately thereafter functions to impress finder gate pulses upon the conductor 12b in the time position 63c assigned to the calling line 32. When operating anode potential is thus applied to the conductor 12c, the primer tubes 800, 810 and 820 in the tens digit register 211, the units digit register 215 and the party digit register 265 respectively, are fired to prevent the counting tubes of these registers from firing prematurely. When the primer tube 800 in the tens digit register 211 is fired, a relatively large potential is developed across the resistor 826 which is transmitted over the conductor 233 to the control grid of the dial tone gate tube 1511, thereby rendering this tube operative to transmit therethrough a dial tone signal impressed upon the control grid thereof from the dial tone signal conductor 47. The dial tone signal gated through the tube 1511 is impressed upon the third control grid of the calling line out gate tube 1305 by way of the conductor 244. At this stage of the revertive call, the potential on the conductor 296a is highly positive and the calling line out gate tube 1305 is conditioned by means of the network 1370 and 1371 to respond to finder gate pulses impressed upon the second control grid of this tube through the condensor 1372 from the conductor 12d so that connector signal pulses appearing in the time position 63c assigned to the line 32 are modulated by the dial tone signal impressed upon the third control grid of the tube 1305 and this dial tone signal is transmitted by way of the distributor 15 and the line circuit 16 to the calling line 32 to signal the calling subscriber at the substation A′ that the dialing operation may be started.

Referring now more particularly to the calling line in gate circuit 207, the finder gate pulses developed on the conductor 12d are employed to control the circuit 207 so that it gates multiplexer pulses appearing on the conductor 50 in the time position assigned to the calling line 32, and these gated multiplexer pulses are transmitted to the calling line reconstructor circuit 208 over the conductor 255. However, a revertive call control tube 1309 is provided, the cathode of which is controlled from the conductor 296a through the network 1377, 1378 and the control grid of which is controlled from the cut through conductor 251 through the network 1375, 1376. The tube 1309 is provided to block the calling line in gate tube 1303 and the peaker tube 1307 in the reconstructor 208 after cut through occurs on a revertive call to prevent speech transmission through the linkage. Thus, when the tube 1309 is rendered conductive, the voltage drop through the anode resistor 1379 thereof is impressed upon the network 1380, 1381 to increase the negative bias on the tubes 1303 and 1307 so that these tubes are prevented from conducting. However, until cut through occurs the tube 1303 is not blocked so that the multiplexer pulses 83c are gated through this tube, are amplified and inverted in the tube 1304 and are transmitted over the conductor 255 to the control grid of the condenser charging tube 1406 in the circuit 208. As a result, the condenser 1410 is charged in accordance with the amplitude changes in the multiplexer pulses 83c and the detected or reconstructed signal information developed across the condenser 1410 is repeated across the output resistors 1411 and 1412 of the output tube 1407 in the circuit 208. The dial impulses reconstructed by the circuit 208 are coupled through the network 1413, 1413a and 1515 to the control grid of the dial impulse integrator tube 1508 wherein they are employed to develop corresponding control pulses of negative polarity in the anode circuit 1516, 1517, 1518 of the tube 1508 and are transmitted through the clipping network including the lefthand diode section of the tube 1306 and the resistors 1325, 1326 and 1327 and over the conductor 227 to the control grids of the inverter tubes 600, 603 and 606.

During the first digit these control pulses are transmitted through the inverter tube 600 and over the conductor 231 to the tens register pulser tube 701 and the start tube 601 in the tens sequence timing circuit 212. Accordingly, the tube 701 operates to drive the tens digit register 211 to a setting indicating the numerical value of the dialed tens digit. As soon as the start tube 601 is fired, the condenser 611 is charged through the resistor 612 from the potential developed across the cathode resistor 610. At the end of the first digit, the tube 602 is fired and develops a positive potential across the resistors 710 and 711 so that the pulser tube 701 is held beyond cutoff and the inverter tube 603 is enabled.

Referring now more particularly to the link timeout and release circuit 301, it will be recalled from the general description of the system that this circuit is provided for the purpose of developing a link release signal at the end of a link timeout interval in the event that the call does not progress in a normal manner. More specifically, if dialing is not initiated at the substation A′ with a first link timeout interval of from two to four minutes after the connector 12b is seized, the circuit 301 develops a link release signal which is transmitted over the conductor 12h to the finder 12a and has the effect of releasing the link 12. The link timeout and release circuit 301 comprises a timeout restarter tube 1770, a timeout primer tube 1771, a timeout control tube 1772, and a link release tube 1773.

When the finder 12a is operatively associated with the calling line 32 and operating anode potential is impressed upon the +B switch conductor 12c this potential is applied to the anode of the timeout primer tube 1771. The control grid of this tube is also biased positively by means of the voltage divider network comprising the resistors 1774 and 1775 connected between the conductor 12c and ground.

Link timeout pulses which are developed by the generator 57 on the conductor 57b at the rate of one pulse every two minutes, are coupled through the condenser 1776 to the control grid of the timeout primer tube 1771. Accordingly, as soon as potential is applied to the conductor 12c the timeout primer tube 1771 is conditioned to respond to the next timeout pulse appearing on the conductor 57b and the tube 1771 is fired in response to this timeout pulse. When the tube 1771 is fired, current flows through the series connected cathode resistors 1777 and 1778 of this tube and the potential across the resistor 1778 is used as an enabling bias for the control grid of the timeout control tube 1772. However, the condenser 1779, connected across the resistor 1778, delays the application of enabling bias potential to the control grid of the tube 1772 so that this tube is not fired by the same pulse which fires the primer tube 1771. Since operating anode potential may be applied to the conductor 12c at any time, depending upon the time at which the call is initiated, the timeout primer tube 1771 will be fired by the timeout pulses appearing on the conductor 57b within a period of from zero to two minutes after application of potential to the conductor 12c.

The timeout pulses on the conductor 57b are also coupled through the condenser 1780 to the control grid of the timeout control tube 1772. However, until the tube 1771 is fired, the control grid of the tube 1772 is operated at ground potential, which potential is not sufficiently positive to cause the tube 1772 to fire. However, when the primer tube 1771 is fired a period of from zero to two minutes after potential is applied to the conductor 12c, the tube 1772 is conditioned to respond to the next occurring timeout pulse on the conductor 57b so that the tube 1772 is fired approximately two minutes after the tube 1771 is fired. When the tube 1772 is fired, the flow of anode current through the anode resistor 1781 thereof decreases the potential at the anode of the tube 1772 and this anode potential decrease is coupled through the resistor 1782 to the conductor 12h. Normally the potential on the conductor 12h is equal to the potential on the +B switch conductor 12c when both the tube 1772 and 1773 are non-conducting. However, when the timeout control tube 1772 is fired in the manner described above the potential on the conductor 12h is decreased by a substantial amount, this potential decrease being referred to as a link release signal. This link release signal is transmitted over the conductor 12h to the finder pulse forming circuit 205 in the finder 12a and has the effect of releasing the link 12 in the manner described above.

The above description of the operation of the link timeout and release circuit 301 is based on the assumption that a prolonged or permanent calling condition exists on the calling line 32 without the call progressing in a normal manner. However, if dialing is initiated at the calling substation A′ in response to the dial tone signal transmitted over this line in the manner described above, the circuit 301 is arranged to respond thereto by reinitiating the link timeout interval. More specifically, as soon as dial impulses are transmitted over the calling line, the dial impulse integrator circuit 209 develops corresponding control pulses in the manner described above which are transmitted through the tens inverter circuit 260 to the tens register pulser 210. Each register drive pulse developed by the pulser 210 in the manner described above, is coupled over the conductor 230 to the tens sequence discharge tube 700 and has the effect of firing this tube.

Each time the discharge tube 700 is fired in response to a dial impulse transmitted over the calling line 32, a corresponding positive pulse which may be called a restart pulse, is developed on the conductor 212a and is transmitted over this conductor and through the coupling condenser 1783 to the control grid of the timeout restarter tube 1770. The anode of the restarter tube 1770 is connected through the resistor 1784 to the +B switch conductor 12c and the cathode of this tube is connected through the resistor 1785 to ground. The control grid of the tube 1770 is also biased positively by means of the voltage divider network including the series connected resistors 1786, 1787 and 1788 which are connected between the conductor 12c and ground. Accordingly, when operating anode potential is applied to the conductor 12c the tube 1770 is conditioned to respond to a positive pulse impressed upon the control grid thereof, although this tube is not fired in the absence of such pulse. Therefore, as soon as dial impulses are transmitted over the calling line 32, corresponding positive restart pulses are produced on the conductor 212a which are coupled to the control grid of the restarter tube 1770 and have the effect of firing this tube.

When the tube 1770 fires, a large positive pulse is produced across the cathode resistor 1785 of this tube and this positive pulse is coupled through the condenser 1789 to the cathode of the primer tube 1771. When the primer tube 1771 is fired in the manner described above, a large positive potential is developed at the cathode of this tube and the condenser 1789 connected from this cathode to ground through the resistor 1785 becomes charged to the cathode potential of the tube 1771. When the restarter tube 1770 fires, the potential developed across the resistor 1785 due to current flow through this tube is additively combined with the potential across the condenser 1789 so that the total voltage between the cathode of the tube 1771 and ground becomes greater than the anode potential on this tube and the tube 1771 is extinguished. After the restarter tube 1770 has been fired by a restart pulse produced on the conductor 212*a*, this tube is extinguished a short interval thereafter by charging of the condenser 1790 through the anode resistor 1784 of the tube 1770. Charging of the condenser 1790 results in a lowering of the anode potential on the tube 1770 until conduction through this tube can no longer be supported and the tube is extinguished. Once the tube 1770 is extinguished it is again conditioned to respond to another restart pulse developed on the conductor 212*a*. Preferably, the tube 1770 is fired in response to each impulse of the dialed digit so that the primer tube 1771 may be extinguished by dialing even though the tube 1771 is fired by a timeout pulse after the first few impulses of the first digit and the link timeout interval is reinitiated by any one impulse of the first digit.

When the timeout primer tube 1771 is fired in the manner described above by the restart tube 1770 the link timeout interval is reinitiated and the primer tube 1771 will not again be fired until the next timing pulse appears on the conductor 57*b*. Accordingly, a period of from zero to two minutes elapses between the time that the first dial impulse is transmitted over the calling line and the time at which the tube 1771 is again fired by a timeout pulse on the conductor 57*b*. The timeout control tube 1772, is, of course, biased well beyond cut off when the tube 1771 is extinguished by the restarter tube 1770 so that the tube 1772 is prevented from responding to timeout pulses appearing on the conductor 57*b*. As a result, the link timeout interval is reinitiated in response to a restart pulse appearing on the conductor 212*a*, this restart pulse being developed by the discharge tube 700 in the tens sequence timing circuit 212 in the manner described above when a dial impulse is transmitted over the calling line 32.

The units register pulser 214 responds to control pulses developed by the circuit 209 during the second digit by developing corresponding register drive pulses across resistor 830 and the register 215 is driven to a setting corresponding to the numerical value of the second dialed digit. At the end of the second digit, the timing tube 605 in the circuit 216 is fired and develops a positive potential across the resistors 715 and 716 which blocks the pulser tube 704 and enables the inverter tube 606.

If, for some reason, the second digit of dial impulses is not transmitted over the calling line 32, the timeout primer tube 1771 is again fired a period of from zero to two minutes after the restart tube 1770 has extinguished the tube 1771, and after another two minute interval the timeout control tube 1772 is fired so as to develop the above described link release signal on the conductor 12*h* at the end of the link timeout interval. This link release signal again has the effect of releasing the link 12 in the event that the second digit is not forthcoming within the second link timeout interval.

Assuming that a second digit of dial impulses is transmitted over the calling line, the units register pulser 214 responds thereto by developing register drive pulses which are transmitted over the conductor 236 to the discharge tube 703 in the units sequence timing circuit 216. Since the cathode of the discharge tube 700 in the tens sequence timing circuit 212 is connected to the cathode of the discharge tube 703 in the units sequence timing circuit 216, each time the discharge tube 703 is fired in response to a register drive pulse developed by the pulser 214, corresponding positive restart pulses are developed on the conductor 212*a* which are transmitted to the link timeout and release circuit 301. These positive restart pulses on the conductor 212*a* are again coupled through the condenser 1783 to the control grid of the restart tube 1770 and have the effect of firing this tube in a manner identical to that described above in connection with the restart pulses developed by the discharge tube 700. As a result, the tube 1770 is again extinguished and the link timeout interval is again reinitiated as soon as dial impulses are transmitted over the calling 32 during the second digit. If dialing of the third digit does not commence before the end of the third link timeout interval, the timeout control tube 1772 is fired so that a link release signal is impressed upon the conductor 12*h* and the link 12 is released in the manner described above.

In the connector pulse forming circuit 217, the first and third control grids of the tube 1602 are biased negatively by the network 1620, 1621, so that only units pulses appearing in the time position 63*c* appear at the anode of this tube and are coupled through the condenser 1622 and the rectifier 1623 to the tube 1600. The inductance 1626 and condenser 1625 are provided to improve the waveform of the connector pulses developed at the anode of the tube 1600, which are coupled through the condenser 1520 to the output tube 1503 and through the condenser 1522 to the busy gate tube 1502. The pulses developed by the tube 1600 are also coupled through the network 1633, 1634 and 1631 to the tube 1601 thereby to gate one of the commutator drive pulses 96*a* over the conductor 239*a* and through the condenser 1529 and resistor 1530 to the busy test tube 1501. The connector pulses are also transmitted over the conductor 239*c* to the circuits 222, 223 and 296.

Referring now more particularly to the revertive call test circuit 296, if the call is revertive the finder gate pulses and connector pulses coincide so that the revertive call test tube 1705 is fired. The resultant voltage drop across the anode resistor 1725 of the tube 1705 is impressed upon the network 1726, 1727 and 1728 so that the potential on the conductor 12*f* is made highly negative. Accordingly, the circuit 201 in the finder 12*a* is prevented from releasing the link 12 when the calling party hangs up to permit completion of the revertive call.

When a third digit of dial impulses is transmitted over the calling line the party register pulser 263 responds thereto by developing corresponding register drive pulses across the resistor 840 which are also transmitted over the conductor 240 to the discharge tube 706 in the party sequence timing circuit 264. The cathode of the tube 706 is also connected to the conductor 212*a* so that each time the tube 706 is fired by the register drive pulses appearing on the conductor 240, corresponding positive restart pulses are transmitted over the conductor 212*a* to the restart tube 1770 so that this tube is fired. As a result, the tube 1770 is extinguished and the link timeout interval is reinitiated as soon as dial impulses constituting the third digit are transmitted over the calling line 32.

When the condenser 625 is charged at the end of the third digit, the timing tube 607 in the circuit 264 is fired and a large positive potential is developed on the conductor 242 which blocks the tube 707 and conditions the circuits 218, 219 and 283 to perform their respective functions. On a revertive call, the tube 1505 is blocked by the network 1585, 1586 so that no busy pulses are transmitted through the condenser 1525 to the shield grid of the tube 1501. As a result, the tube 1501 is fired irrespective of the busy condition of the revertive calling line and a cut through potential is developed on the conductors 251 and 251*a*.

After the third digit is completed and revertive cut through is effected, the revertive call busy tone gate circuit 298 responds thereto by transmitting a revertive call busy tone signal over the conductor 298*a* and by way of the called line out gate circuit 224 to the calling line 32 to inform the calling subscriber that he should hang up to permit the revertive call to be completed. After the calling subscriber has hung up and a revertive ring start signal is transmitted over the conductor 12*e* to the code start control tube 1612, this signal is transmitted through the network 1680, 1681, 1682, 1683, 1684, 1685 and 1686 to the control grid of the code start tube 1608 so that this tube is permitted to respond to the next code start pulse impressed thereon from the conductor 5 through the condenser 1650. When the tube 1608 is fired, a large positive potential is produced across the resistor 1651 which is transmitted through the network 1687, 1688 to the control grid of the tube 1607. As a result, the tube 1607 gates therethrough the ringback tone signal appearing on the conductor 275 and this signal is transmitted to the tube 1305 by way of the network 1560 and 1561 and is also transmitted by way of the rectifier network 1562, 1563, 1564, 1430 and 1420 to the tube 1403 to increase the amplitude of the connector signal pulses released by this tube during the "on" intervals of the ringing signal. Accordingly, ringing of the line 32 is initiated.

Since a substantial period of time may elapse between the end of the third digit and actual ringing of the revertive calling line, due to a delay on the part of the subscriber in hanging up in response to the revertive call busy tone signal, the link timeout interval is reinitiated when ringing starts. More specifically, when a code start potential is developed on the conductor 268*a* by the circuit 268, this potential is coupled through the condenser 1791 and through the resistor 1787 to the control grid of the restarter tube 1770 and has the effect of firing this tube. Accordingly, the link timeout interval is reinitiated in the manner described above as soon as revertive ringing is initiated so that a link release signal will not be developed on the conductor 12*h* until a period of from two to four minutes after revertive ringing starts.

In order to discontinue the two to four minute link timeout interval timing operation after a talking connection is established, there is provided means responsive to answering of the call for disabling the timeout control tube 1772 so that this tube no longer responds to timing pulses appearing on the conductor 57*b*. More specifically, when the call is answered, the condenser 1464 in the reconstructor circuit 222 is charged and the positive call answering signal developed thereacross is repeated through the tube 1302, through the resistor 1445 and over the conductor 242 to the control grid of the tube 1500 so as to fire this tube. When the tube 1500 is fired, a ring trip potential is developed on the conductor 253 which is coupled through the resistor 1792 to the cathode of the timeout control tube 1772, this cathode being connected to ground through the resistor 1793. The values of the resistors 1792 and 1793 are such that the cathode of the tube 1772 is biased highly positively when a ring trip potential is developed on the conductor 253 so that the tube 1772 is positively prevented from responding to timeout pulses impressed upon the control grid of this tube from the conductor 57*b*. Accordingly, when either a revertive or a non-revertive call is answered, the timeout control tube 1772 is thereafter rendered ineffective to develop a link release signal, and control of the link release function is thereafter given to the link release tube 1773.

If the revertive call is unanswered so that revertive ringing persists for a period of from two to four minutes after it is started, the timeout control tube 1772 is fired so that a link release signal is developed on the conductor 12*h* and is transmitted over this conductor to the finder pulse forming circuit 205 in the finder 12*a*. As described above in connection with the finder 12*a*, this link release signal has the effect of discontinuing multiplexer pulse transmission through the pulse input circuit 200 in the finder 12*a*. However, on a revertive call the potential on the conductor 12*f* is made highly negative due to the above described revertive call hold potential developed by the revertive call test circuit 296, in order to permit the finder 12*a* to remain operatively associated with the revertive calling line during periods when a calling condition does not exist on this line. Unless the revertive call hold potential is removed from the conductor 12*f*, the link release signal developed by the timeout control tube 1772 at the end of the link timeout interval will be ineffective to release the link, when this link release signal occurs during a period when the revertive call hold signal is present on the conductor 12*f*. Accordingly, the timeout control tube 1772 is arranged to fire the ring trip tube 1500 in the ring trip circuit 221 at the end of the link timeout interval even though the call has not been answered so that the potential on the conductor 12*f* will be returned to its nonrevertive call value thereby permiting the +B switching circuit 201 in the finder 12*a* to respond to termination of multiplexer pulse transmission through the circuit 200. More specifically, when the timeout control tube 1772 is fired at the end of the link timeout interval which is initiated when revertive ringing starts, a large positive potential is produced across the cathode resistor 1793 of this tube. This positive potential is transmitted over the conductor 253*a* to the control grid of the ring trip tube 1500 and has the effect of firing this tube in the same manner as a call answering signal developed on the conductor 252. When the tube 1500 is fired, a ring trip potential is developed on the conductor 253 which is impressed upon the network 1726, 1727 and 1728 so that the potential on the conductor 12*f* is returned substantially to ground potential and the +B switching circuit 201 is permitted to respond to termination of multiplexer pulse transmission through the pulse input circuit 200 in the finder 12*a*. Accordingly, the circuit 301 is permitted to release the link 12 by developing a link release signal on the conductor 12*h* when prolonged ringing on a revertive call takes place.

When a revertive call is in progress, it is desirable to release the finder-connector link 12 as soon as the revertive call is established since the talking circuit on a revertive call does not require linkage. Accordingly, the link release tube 1773 is arranged to be controlled by the potentials on the conductors 296*a* and 253 so that a link release signal is developed shortly after the revertive call is answered. More specifically, when a revertive call is in progress, the potential on the conductor 296*a* is at a relatively small positive value and this potential is connected to one end of a voltage divider network including the resistors 1794 and 1795 connected between the conductor 296*a* and the −100 volt supply. The control grid of the tube 1773 is connected through the resistors 1797 and 1799 to the −100 volt supply, a condenser 1798 being connected from the junction of the resistors 1797 and 1799 to ground and a resistor 1796 being connected from this junction to the conductor 253. Normally, the control grid of the tube 1773 is biased highly negative by means of the network 1796 and 1799.

When a call answering signal is received by the ring trip circuit and this circuit responds by developing a positive ring trip potential on the conductor 253, this positive potential is coupled through the resistors 1796 and 1797 to the control grid of the link release tube 1773 and has the effect of firing this tube. When the link release tube 1773 is fired, anode current flows through the common anode resistor 1781 so that the anode potential of the tube 1773 is decreased to a relatively small positive value. This anode potential decrease is coupled through the resistor 1782 to the conductor 12*h* and again constitutes a link release signal which will be effective in the finder 12*a* to release the link 12 in the manner described in detail heretofore.

In order to hold the link 12 operatively associated with the calling line for a sufficient time to permit a revertive call tone signal to be transmitted over this line when the revertive call is answered, the application of the ring trip potential to the control grid of the tube 1773 may be delayed slightly so that this delay and the delay in the +B switching circuit 201 in receiving operating anode potential from the conductor 12*c* is sufficient to permit the revertive call tone signal to be transmitted over the line for a second or two after the revertive call is answered to inform the answering party that the call is revertive. More specifically, the time constant of the grid network including the resistor 1796 and condenser 1798 may be sufficiently long that coupling from the ring trip conductor 253 to the control grid of the tube 1773 is delayed and the link 12 is not released for an interval of a second or two during which time the revertive call tone signal is transmitted to the answering party. However, when the potential on the control grid of the tube 1773 rises to a sufficiently positive value to fire this tube, the above described link release signal is produced on the conductor 12*h* and the link 12 is released by removing potential from the conductor 12*c* after a delay of approximately one-half second in the +B switching circuit 201. In this connection it will be understood that the circuit 201 may be used to provide the entire delay of one or two seconds in which case the time constant of the control grid circuit of the tube 1773 may be relatively short, although a small amount of delay in impressing the ring trip potential on the control grid of the tube 1773 is desirable on a non-revertive call, as will be described in more detail hereinafter. It will also be understood that the revertive call tone gate circuit 297 is provided with a differentiation network in the control grid circuit of the tube 1701 so that the revertive call tone signal is only gated by the tube 1701 for a second or two after the ring trip potential is developed on the conductor 253 when a non-revertive call is answered, as described in detail in the copending application, Serial No. 336,316, identified above. However, in the line lockout system of the present invention, this revertive call tone signal may be terminated by release of the link when the revertive call is answered as described immediately above.

In the event that a non-revertive call is initiated at the calling substation, the link timeout and release circuit 301 operates in a manner identical to that described above to effect release of the link 12 whenever a prolonged calling condition exists on the calling line without normal progress of the call. In addition, the circuit 301 is arranged to release the link 12 at the end of a conversation timing interval on a non-revertive call. More specifically, the plate of the tenth counting tube 1030 in the party digit register 265 is connected over the conductor 293 and through the resistor 1767 and the condenser 1768 to the control grid of the link release tube 1773. Before the non-revertive call is answered, the control grid of the link release tube 1773 is operated well beyond cut off, by means of the voltage divider network including the resistors 1796 and 1799, so that signals developed at the plate of the counting tube 1030 during the dialing operation do not cause the tube 1773 to be fired. In this connection it will be understood that the counting tube 1030 may be fired during the dialing operation when a party digit of "0" is dialed at the calling substation.

When the nonrevertive call is answered and a ring trip potential is developed on the conductor 253, the bias potential on the control grid of the tube 1773 is increased positively in a manner identical to that described above in connection with the operation of the tube 1773 when a revertive call is answered. However, on a nonrevertive call the potential on the conductor 296*a* is highly positive so that the cathode potential on the tube 1773 is highly positive and the tube 1773 is prevented from firing in response to the ring trip potential developed on the conductor 253 so that the link 12 remains operatively associated with the calling and called lines.

Since the counting tube 1030 may be extinguished when the party digit register 265 is reset by the ring trip potential on the conductor 289 to prepare the register 265 for conversation timing, a positive pulse may be developed at this time at the anode of the tube 1030 which is impressed upon the control grid of the tube 1773 substantially coincidentally with the ring trip potential on the conductor 253. However, the above described time delay network between the conductor 253 and the control grid of the tube 1773 prevents the ring trip potential from being impressed upon the control grid of the tube 1773 until after the above described positive pulse impressed upon this control grid from the anode of the tube 1030 is terminated so that the tube 1773 is not fired when ring trip occurs on a non-revertive call. The tube 1773 is, nevertheless, conditioned by means of the ring trip potential on the conductor 253 to respond to a positive pulse impressed upon the control grid of the tube 1773 from the conductor 293 at the end of the conversation timing interval. Accordingly, when the conversation timing period expires and the tenth counting tube 1030 in the party digit register 265 is extinguished in response to the eleventh conversation timing pulse developed by the party register advancer 282, a positive pulse is developed at the anode of the tube 1030 which is transmitted over the conductor 293 and through the resistor 1767 and the condenser 1768 to the control grid of the link release tube 1773 and has the effect of firing this tube. When the tube 1773 is fired the resultant link release signal is transmitted over the conductor 12*h* to the finder 12*a* and has the effect of releasing the link 12 so that the talking connection is broken at the end of the conversation timing period.

In order to render the mode of operation of the line lockout system more readily understandable, there is shown in Figs. 25, 26, 31 and 32, the time relationships of the potentials and signals produced on certain conductors of the system while a revertive call is being set up. In this connection it will be understood that the line lockout system is equally effective for non-revertive calls, as will be described in more detail hereinafter. However, in order to illustrate the functioning of the line lockout system on a revertive call, wherein the finder-connector link is released after the revertive call is answered, the potentials and signals have been illustrated in connection with a completed revertive call. In this connection it will be understood that the waveforms shown in Figs. 25, 26, 31 and 32 illustrate the sequence of events in setting up a revertive call although the time relationship between certain waveforms is distorted to permit illustration thereof on the same timing diagram.

Figure 25:
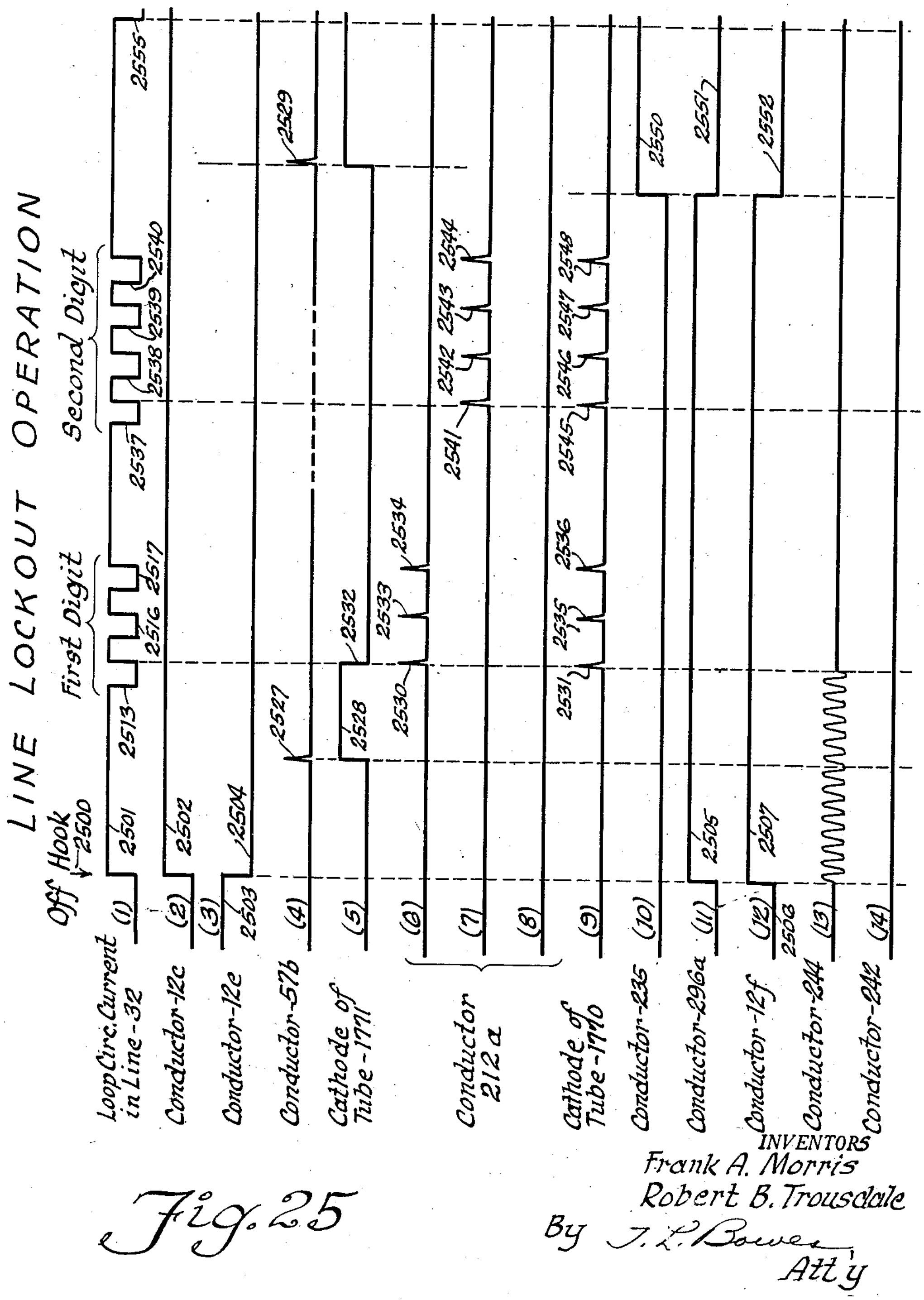

Referring to these figures, when the calling party at the substation A' comes off hook, as indicated by the arrow 2500, the loop circuit including the conductors of the line 32 is completed so that current in the line 32 changes from zero to a relatively positive value, as indicated at 2501 in Fig. 25 (1). When this occurs, the finder 12*a* is seized and the potential on the +B switch conductor 12*c* is changed from zero to a relatively positive value, as indicated at 2502 in Fig. 25 (2). When the finder is seized, the potential on the revertive ring start conductor 12*e* is changed from a value 2503, which is substantially equal to ground potential, to a value 2504 which is highly negative with respect to ground potential, as shown in Fig. 25 (3).

When the connector 12*b* is supplied with operating anode potential over conductor 12*c* the potential on the revertive call test conductor 296*a* changes from ground potential to a positive value 2505 which is substantially equal to the potential on the conductor 12*c*, as shown in Fig. 25 (11). Also when the finder 12*a* is operatively associated with the line 32, the potential on the conductor 12*f* changes from its normally highly negative value 2506 to the value 2507, which is substantially equal to ground potential, as shown in Fig. 25 (12), this potential increase being due to the application of operating anode potential to the revertive call test circuit 296 in the connector 12*b*. At the same time, a dial tone signal 2508 is gated by the dial tone gate tube in the network 225, as shown in Fig. 25 (13).

Figures 31, 33:
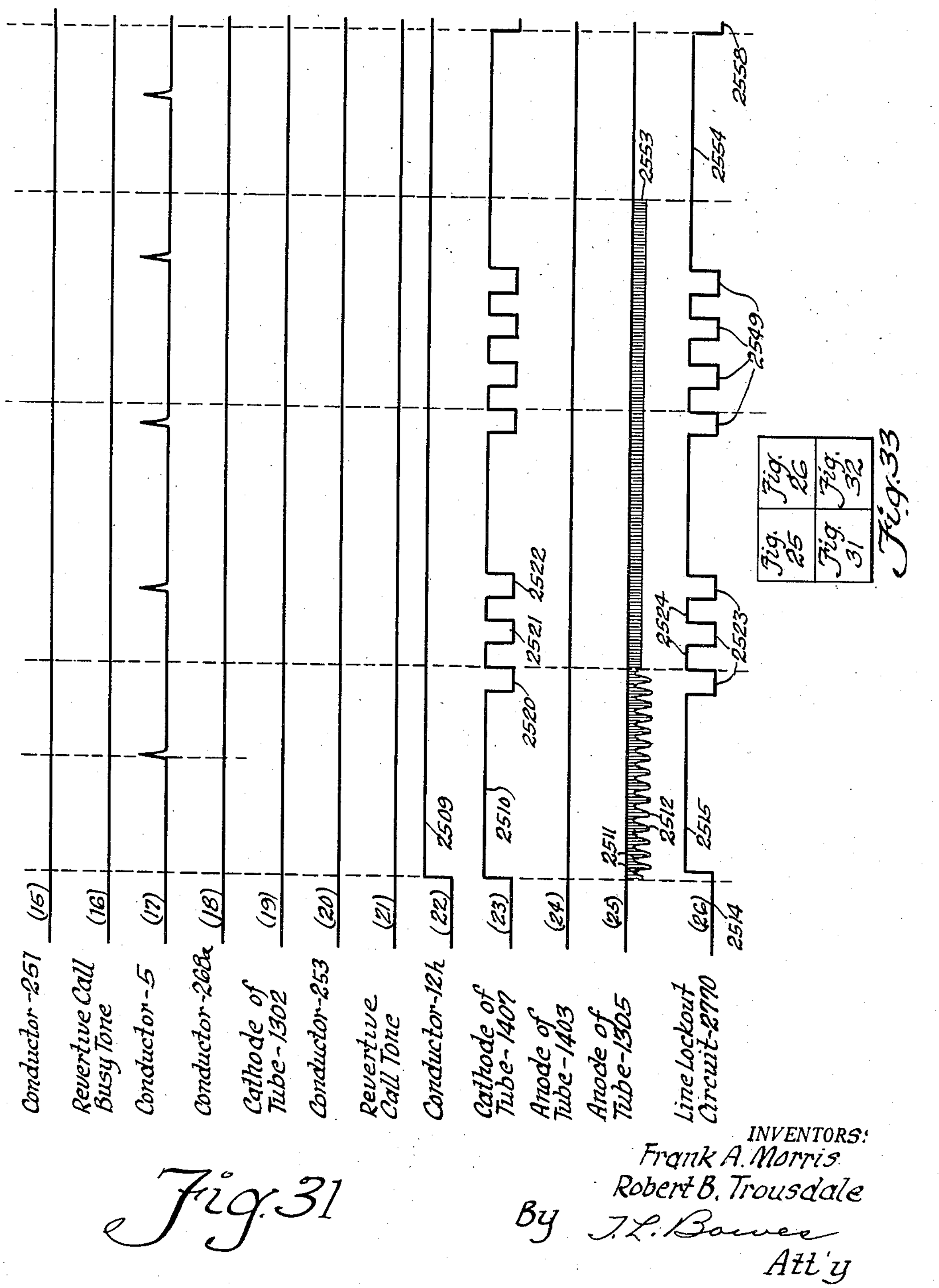

When the connector 12*b* receives operating potential over the conductor 12*c*, it also functions to change the potential on the conductor 12*h* from a value substantially equal to ground potential, or zero, to a positive value 2509 which is substantially equal to the potential impressed upon the +B switch conductor 12*c*, as shown in Fig. 31 (22). At the same time, the seizure signal transmitted over the line 32 when the calling subscriber comes off hook is transmitted through the calling line in gate circuit 207 and is reconstructed in the calling line reconstructor circuit 208 so as to appear as a positive going seizure signal 2510 at the cathode of the output tube 1407 in the circuit 208, as shown in Fig. 31 (23).

As soon as the finder 12*a* becomes operatively associated with the line 32 and impresses finder gate pulses on the conductor 12*d* in the time position 63*c* assigned to this line, the calling line out gate tube 1305 functions to develop negative going connector signal pulses 2511, occurring in the time position 63*c* assigned to the line 32 at the anode of this tube, as shown in Fig. 31 (25). In this connection it will be understood that the pulses 2511 occur at the rate of one pulse for each pulse frame and are derived from the commutator drive pulses appearing on the conductor 35 so that the pulses 2511 are very narrow and occur within the time position 63*c*, these pulses being illustrated in Fig. 31 (25) as occurring at a somewhat lower repetition rate for purposes of illustration. The dial tone signal 2508 which is developed on the conductor 244 is modulated on the connector signal pulses 2511, as shown by the envelope 2512 in Fig. 31 (25), and this dial tone signal persists until the first impulse 2513 of the first, or tens digit, is transmitted over the line 32 as shown in Fig. 25 (1) and Fig. 31 (25). It will also be understood that the control impulse developed by the dial impulse integrator circuit 209 in response to the first dial impulse 2513 occurs at the end of the impulse 2513 so that the dial tone signal is terminated at the end of the first impulse 2513.

When the calling party comes off hook as indicated by the arrow 2500 the bias potential on the conductor 45*b* in the line circuit 16 is increased positively. However, the line lockout circuit 2770 does not assume a line lockout condition until the connector signal pulses 2511 are transmitted by way of the distributor 15 to the line circuit 16 so as to cause the control tube 2771 to fire in response to the 10 kilocycle component of the connector signal pulses 2511. As a result, the line lockout circuit 2770 assumes a line lockout condition, wherein the circuit 2770 releases busy pulses occurring in the time position 63*c* assigned to the line 32, a short time after the calling subscriber comes off hook. The line lockout condition assumed by the line lockout circuit 2770 is illustrated in Fig. 31 (26) as a change from a closed condition 2514, in which the circuit 2770 does not release busy pulses, to an open condition 2515, in which the circuit 2770 does release busy pulses to the busy pulse out conductor 52*a* in the time position 63*c* assigned to the line 32, this illustration of the two conditions of the circuit 2770 being shown instead of the actual busy pulses developed by the circuit 2770 in order to simplify the drawings.

As the tens digit comprising the three impulses 2513, 2516, and 2517 is dialed at the calling substation A', these dial impulses are repeated as corresponding impulses 2520, 2521 and 2522 at the cathode of the output tube 1407 in the calling line reconstructor circuit 208. Each time the loop circuit current in the line 32 is interrupted during the break period of the dial impulses constituting the first digit, the line lockout circuit is returned to its closed, or non-lockout condition wherein no busy pulses are impressed upon the busy pulse out conductor 52*a*, these closed periods being illustrated in Fig. 31 (26) as the periods 2523. It will be noted that even though the dial tone signal 2512 is terminated at the end of the first dial impulse 2513 the calling line out gate tube 1305 continues to supply connector signal pulses 2511 to the line circuit 16 so as to condition the circuit 2770 to assume an open, or lockout condition during the make periods of each dial impulse, these lockout periods being illustrated at 2524 in Fig. 31 (26).

As soon as operating anode potential is impressed upon the conductor 12*c*, this potential is impressed upon the anode of the timeout primer tube 1771 in the link timeout and release circuit 301. Accordingly, this tube is conditioned to fire in response to the next occurring timeout pulse 2527 developed on the conductor 57*b* by the timing generator 57, so that the potential at the cathode of the tube 1771 changes from zero to a relatively large positive value 2528 in response to the pulse 2527 as shown in Figs. 25 (4) and (5). The control tube 1772 in the link timeout release circuit 301 is conditioned by means of the potential 2528 developed at the cathode of the primer tube 1771 to respond to the next occurring timeout pulse 2529 which occurs two minutes after the pulse 2527. Accordingly, if a prolonged calling condition exists on the line 32 without normal progress of the call by initiating dialing of the first digit, the pulse 2529 fires the control tube 1772 so as to reduce the potential on the conductor 12*h* by a substantial amount, this potential decrease being referred to as a link release signal. Since the line lockout circuit 2770 remains in the open, or lockout condition 2515 until dialing is initiated, the line 32 remains locked out of service after the finder-connector link 12 is released in response to a decrease in potential on the conductor 12*h*. In this connection it is pointed out that in the actual call illustrated in Figs. 25, 26, 31 and 32 dialing is initiated before the next occurring timeout pulse 2529 so that the link 12 is not released. However, the manner in which the link 12 is released will be described in more detail hereinafter in connection with the release of the link in a normal manner when the revertive call is answered.

If the call is progressing in a normal manner dialing will be initiated before the end of the first link timeout interval of from two to four minutes after the calling subscriber comes off hook. Accordingly, the first dial impulse 2513 of the first digit is repeated through the reconstructor 208 so as to appear as the dial impulse 2520 and the trailing edge of this impulse is employed to fire the discharge tube 700 in the tens sequence timing circuit 212 so as to produce a first restart pulse 2530 on the conductor 212*a*, as shown in Fig. 25 (6). The restart pulse 2530 is transmitted over this conductor to the control grid of the timeout restarter tube 1770 so that this tube is fired and a positive pulse 2531 is produced across the cathode resistor 1785 of this tube as shown in Fig. 25 (9). The pulse 2531 is coupled to the cathode of the primer tube 1771 and has the effect of extinguishing the tube 1771 so that the potential at the cathode of the tube 1771 is reduced to ground potential as illustrated 2532 in Fig. 25 (5). When the primer tube 1771 is extinguished in this manner the link timeout interval is reinitiated so that a link release signal will not be produced on the conductor 12*h* for another period of from two to four minutes after the tube 1771 is extinguished. However, if for any reason dialing is interrupted after the first impulse 2513 of the first digit, the primer tube 1771 is conditioned to fire in response to the next occurring timeout pulse on the conductor 57*b* and two minutes thereafter the control tube 1772 will be fired, thereby producing a potential decrease on the conductor 12*h* so that the link 12 is released from the line 32. In the illustrated embodiment the dialing operation is completed in a normal manner so that the successive restart pulses 2533 and 2534 are produced on the conductor 212*a* in response to the second and third dial impulses 2516 and 2517 constituting the remainder of the first digit. Accordingly, each of the pulses 2533 and 2534 has the effect of firing the tube 1770 so as to produce the corresponding pulses 2535 and 2536 at the cathode of the tube 1770, each of the pulses 2535 and 2536 having the effect of extinguishing the primer tube 1771 in the event that this tube has been fired by a timeout pulse appearing on the conductor 57*b* in the interval between dial impulses. In this connection it will be understood that the timeout pulses occur at the rate of one pulse every two minutes so that in the illustrated embodiment the timeout pulse following the pulse 2527 would not occur during normal dialing of the first digit.

When the second digit comprising the dial impulses 2537, 2538, 2539 and 2540 is transmitted over the line 32 the discharge tube 703 in the unit sequence timing circuit 216 functions to develop the corresponding restart pulses 2541 to 2544, inclusive, and these restart pulses are impressed upon the control grid of the restarter tube 1770 so as to produce the corresponding positive pulses 2545 to 2548 inclusive, at the cathode of the tube 1770, as shown in Figs. 25 (7) and (9), the restart pulses 2545 to 2548, inclusive, having the effect of extinguishing the primer tube 1771 if this tube has been fired by one of the timeout pulses during the interval following the first extinguishment 2532 of the tube 1771. In this connection it will be understood that in the revertive call described in detail heretofore, the line 32 is revertively called so that the second digit of that call would comprise only two impulses instead of the four impulses illustrated in Fig. 25 (1).

During the break periods of the dial impulses 2537 to 2540, inclusive, the line lockout circuit 2770 is opened as indicated at 2549 in Fig. 31 (26), the line lockout condition being resumed between the periods 2549 due to the fact that the 10 kilocycle component of the connector signal pulses 2511 continues to be transmitted to the line lockout circuit 2770 so as to cause this circuit to assume a line lockout condition whenever the loop circuit including the conductors of the line 32 is closed.

After dialing of the units digit has been completed, the units sequence timing circuit 216 functions to change the potential on the conductor 235 from zero to a relatively positive value 2550, as shown in Fig. 25 (10). The revertive call test circuit responds to the potential 2550 on the conductor 235 by changing to a revertive call condition wherein the potential on the conductor 296*a* is reduced from the relatively high positive value 2505 to a relatively small positive value 2551, as shown in Fig. 25 (11). At the same time, the circuit 296 functions to change the potential on the conductor 12*f* from the value 2507, which is substantially equal to ground potential, to the highly negative value 2552, as shown in Fig. 25 (12). When the potential on the conductor 296*a* is reduced to the value 2551, the second control grid of the calling line out gate tube 1305 is driven well beyond cutoff so as to prevent the tube 1305 from developing connector signal pulses so that transmission of the connector signal pulses 2511 in the time position 63*c* assigned to the line 32 is terminated, as indicated at 2553 in Fig. 31 (25). It will be noted that the line lockout circuit 2770 continues to assume a line lockout condition, as indicated at 2554 in Fig. 31 (26), even though transmission of the connector signal pulses 2511 ceases. This is due to the fact that the control grid of the line lockout control tube 2771 in the circuit 2770 loses control once the tube 2771 is fired, so that the circuit 2770 remains in a lockout condition after the tube 2771 is fired until the bias potential on the conductor 45*b* is increased sufficiently negatively to bias the gate tube 2772 beyond cutoff and, hence, cause the tube 2771 to be extinguished, as described in detail heretofore in connection with the circuit 2770. Accordingly, the circuit 2770 remains in a line lockout condition even though transmission of the connector signal pulses 2511 is terminated so that the link 12 may be released and the line 32 held out of service if the call is interrupted for any reason after the second digit.

When a third, or party line digit, comprising the dial impulses 2555, 2556, and 2557 is transmitted over the line 32, the line lockout circuit 2770 responds to the leading edge of the first dial impulses 2555 by returning to a closed or non-lockout condition, as illustrated at 2558 in Fig. 31 (26). However, since the connector signal pulses 2511 are terminated after the end of the second digit the circuit 2770 remains in the non-lockout condition 2558 during dialing of the third digit. This is because no 10 kilocycle signal is available from connector signal pulses, developed by either the calling line out gate tube 1305 or the called line out gate tube 1403, to fire the control tube 2771 in the circuit 2770 and restore the lockout condition.

Figure 26:
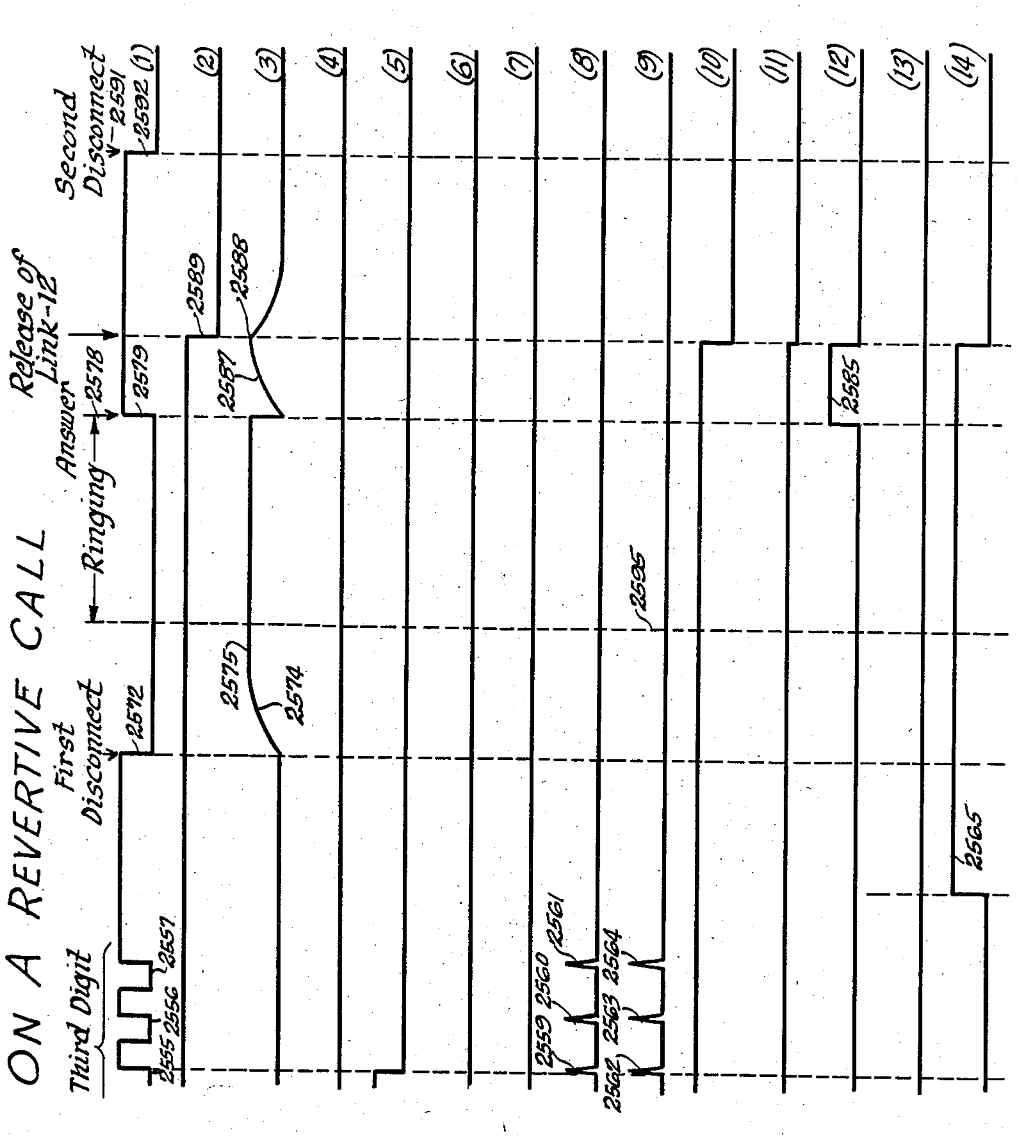

During dialing of the third digit, the discharge tube 1706 in the party sequence timing circuit 264 functions to develop the restart pulses 2559 to 2561, inclusive, coincident with the trailing edge of each of the dialing impulses 2555 to 2557, inclusive, as shown in Fig. 26 (8). In this connection it will be understood that in the actual revertive call described in detail heretofore the substation B′ is called, in which case a party line digit consisting of only two impulses would be dialed at the calling substation A′. The restart pulses 2559 to 2561, inclusive, function to fire the tube 1770 so as to produce the corresponding positive pulses 2562 to 2564, inclusive, at the cathode of the tube 2770, as shown in Fig. 26 (9), the pulses 2562 to 2564, inclusive, operating to extinguish the primer tube 1771 in the event that this tube has been fired by one of the timeout pulses appearing on the conductor 57*b* in the interval following the pulses 2545 to 2548, inclusive. Accordingly, the link timeout interval is re-initiated in response to dialing of the third digit at the calling substation A′ so that a link release signal will not be produced on the conductor 12*h* for another period of from two to four minutes.

Figure 32:
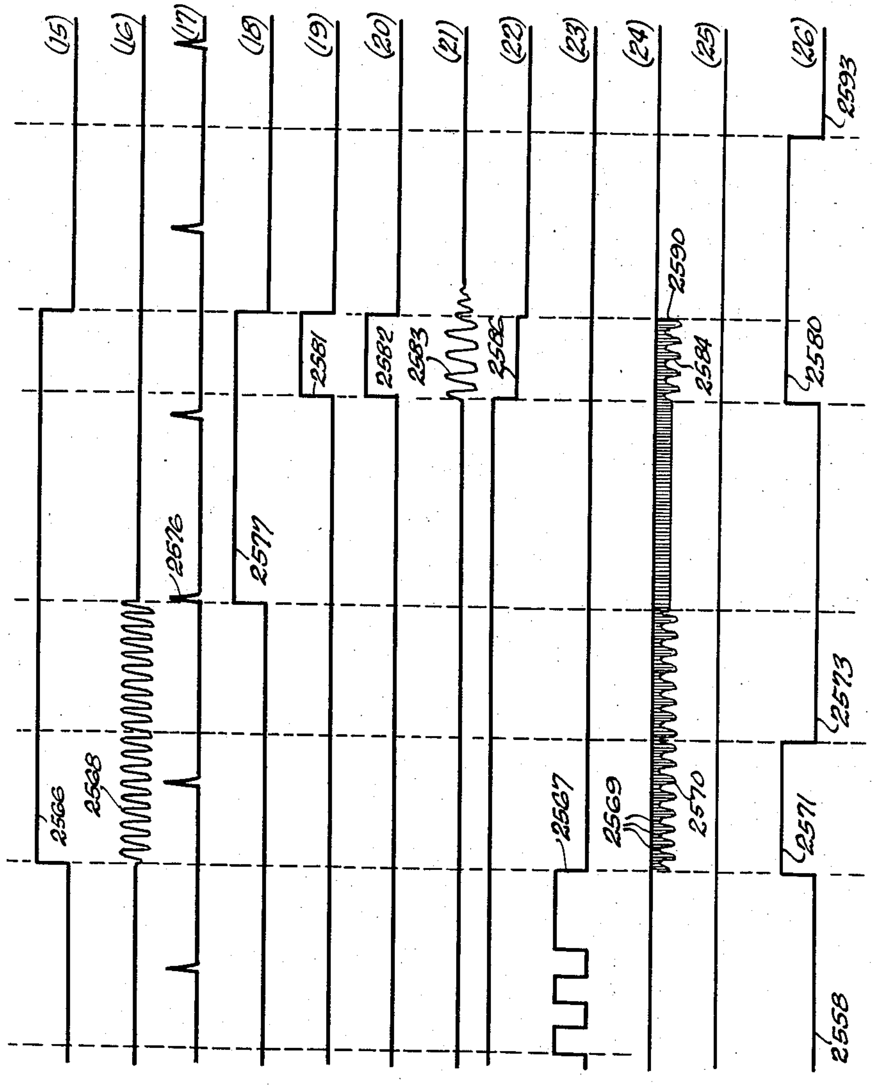

After the third digit is transmitted over the line 32, the party sequence timing circuit 264 operates to change the potential on the conductor 242 from zero to a relatively positive value 2565, as shown in Fig. 26 (14), so that the busy test circuit 218 is conditioned for operation. In the illustrated revertive call, busy pulses are withheld from the circuit 218 by virtue of the potential 2551 on the conductor 296*a* so that the circuit 218 functions substantially immediately to develop a positive cut-through potential 2566 on the conductor 251, as shown in Fig. 32 (15). When the cut-through potential 2566 is impressed upon the control tube 1309 in the calling line in gate circuit 207 coincidentally with the potential 2551 on the conductor 296*a* the tube 1309 responds by blocking both the calling line in gate tube 1303 and the peaker tube 1307 in the calling line reconstructor circuit 208. As a result, the potential at the cathode of the output tube 1407 in the circuit 208 is reduced to its off hook value, as indicated at 2567 in Fig. 32 (23).

When the cut-through potential 2566 is developed on the conductor 251, the revertive call busy tone gate circuit 298 is conditioned to develop the revertive busy tone signal 2568, as shown in Fig. 32 (16). At the same time, the called line out gate tube 1403 is enabled, by means of the cut-through potential 2566, so that this tube develops negative going connector signal pulses 2569 in the time position 63*c* assigned to the line 32 at the anode thereof, as shown in Fig. 32 (24). The signals 2568 is transmitted by way of the conductor 298*a* to the third control grid of the called line out gate tube 1403 so that this revertive call busy tone signal is modulated on the connector signal pulses 2569 as indicated by the modulation envelope 2570 in Fig. 32 (24).

As soon as the connector signal pulses 2569 are developed by the tube 1403 the 10 kilocycle component of these pulses is transmitted by way of the distributor 15 to the line circuit 16 and has the effect of firing the line lockout control tube 2771 so that the circuit 2770 assumes an open, or line lockout condition, as illustrated at 2571 in Fig. 32 (26), wherein busy pulses are again impressed upon the conductor 52*a* in the time position 63*c* assigned to the line 32. The line lockout condition 2571 persists until the calling party hangs up in response to the revertive call busy tone signal 2568. However, when the calling party hangs up, a first disconnect signal 2572 is transmitted over line 32 and the bias potential on the conductor 45*b* is increased negatively in response thereto so that the gate tube 2772 in the circuit 2770 is driven beyond cutoff and the circuit 2770 is returned to a closed or non-lockout condition, as indicated at 2573 in Fig. 32 (26).

When the first disconnect signal 2572 is transmitted over the line 32, multiplexer pulse transmission in the time position 63*c* is terminated and the +B switching circuit 201 in the finder 12*a* responds thereto by gradually increasing the potential on the conductor 12*e*, as indicated at 2574 in Fig. 26 (3). When the potential on the conductor 12*e* reaches ground potential, as shown at 2575 in Fig. 26 (3), the code start circuit 268 is conditioned to respond to the next one of the code start pulses 2576 appearing on the conductor 5 (Fig. 32 (17)), and the circuit 268 responds to the code start pulse 2576 by increasing the potential on the code start conductor 268*a* from zero to the relatively high positive value 2577, as shown in Fig. 32 (18).

When the code start potential 2577 is produced on the conductor 268*a*, the revertive call busy tone signal 2568 is terminated, as shown in Fig. 32 (16), so that the connector signal pulses 2569 are thereafter unmodulated, as shown in Fig. 32 (24). At the same time, the ring-back tone gate tube 1607 is opened so as to permit transmission therethrough of the interrupted ring-back tone signal selected in the party digit register 265 in accordance with the identity of the called substation. Accordingly, a ringing current is transmitted over the line 32 until the revertive call is answered, the time at which the call is answered being indicated by the arrow 2578.

Since a considerable period of time may be taken by the calling party in dialing and in responding to the revertive call busy tone 2568 by hanging up, it is desirable to reinitiate the link timeout interval when revertive ringing is started so that a full timeout interval of from two to four minutes is provided for ringing timeout on an unanswered call. Accordingly, the code start potential 2577 developed on the conductor 268*a* is impressed upon the control grid of the restarter tube 1770 and has the effect of firing this tube so that a corresponding positive pulse 2595 is produced at cathode of the tube 1770, as shown in Fig. 26 (9). The pulse 2595 has the effect of extinguishing the primer tube 1771 in the event that this tube has been fired by a timeout pulse in the interval following the pulses 2562 to 2564 inclusive, so that the link timeout interval is reinitiated.

When the revertive call is answered, the loop circuit including the conductors of the line 32 is again closed so that a seizure signal 2579 is transmitted over the line 32 and the bias potential on the conductor 45*b* is correspondingly increased positively so as to permit the line lockout circuit 2770 to again assume an open, or line lockout condition, as indicated at 2580 in Fig. 32 (26). When the seizure signal 2579 is transmitted over the line 32 multiplexer pulse transmission in the time position 63*c* assigned to the line 32 is resumed so that a corresponding call answering signal 2581 is developed at the cathode of the output tube 1302 in the called line reconstructor circuit 221, as shown in Fig. 32 (19). In this connection it will be recalled that the circuit 222 is unblocked when the code start potential 2577 is developed on the conductor 268*a*. However, at that time no multiplexer pulses are present in the time position 63*c* since the calling party has already hung up.

The call answering signal 2581 developed at the cathode of the tube 1302 is impressed upon the control grid of the ring trip tube 1500 so that this tube is fired and a large positive ring trip potential 2582 is developed on the conductor 253, as shown in Fig. 32 (20). The revertive call tone gate circuit 297 responds to the ring trip potential 2582 by developing the revertive call tone signal 2583, as shown in Fig. 32 (21), and the signal 2583 is modulated on the connector signal pulses 2569, this modulation envelope being indicated at 2584 in Fig. 32 (24). As a result, the revertive call tone signal is returned to the answering party, by way of the distributor 15 and the line circuit 16, to inform him of the nature of the call.

When the ring trip potential 2582 is developed on the conductor 253, the revertive call test circuit 296 responds thereto by changing the potential on the conductor 12*f* from the highly negative value 2552 to substantially ground potential as indicated at 2585 in Fig. 26 (12). Accordingly, the +B switching circuit 201 in the finder 12*a* is returned to a setting in which it can respond to termination of multiplexer pulse transmission by releasing the link 12. At the same time the ring trip potential 2582 developed on the conductor 253 is impressed upon the control grid of the link release tube 1773 in the link timeout and release circuit 301 so that this tube is fired and the potential on the conductor 12*h* is changed to the relatively small positive value 2586, as shown in Fig. 32 (22). In this connection it will be recalled that preferably a time delay is introduced in the grid circuit of the tube 1773 so that the change to the potential 2586 is actually delayed relative to the development of the ring trip potential 2582, this delay preventing the tube 1773 from responding falsely to a signal from the tube 1030 in the party digit register 256. Also this delay, together with the delay in the +B switching circuit 201 determines when the link 12 is released and hence the duration of the revertive call tone signal 2583.

In the finder 12*a* the potential 2586 on the conductor 12*h* is sufficient to prevent the finder pulse forming circuit 205 from developing finder pulses in the time position 63*c* assigned to the line 32. As a result, the finder control gate tube 1802 in the pulse input circuit 200 is not opened in the time position 63*c* assigned to the line 32 and multiplexer pulse transmission through the circuit 200 to the +B switching circuit 201 is terminated. When this occurs, the +B switching circuit 201 functions gradually to increase the potential on the conductor 12*e*, as indicated at 2587 in Fig. 26 (3). Since the potential on the conductor 12*f* is returned to the value 2585, i.e. the revertive call hold signal is removed from this conductor, when the revertive call is answered, the +B extinguishing tube 1806 in the circuit 201 is permitted to fire when the control grid potential of this tube is increased to the potential value 2588 shown in Fig. 26 (3). When the extinguishing tube 1806 is fired the +B switch tube 1904 in the circuit 201 is extinguished so that operating anode potential is removed from the conductor 12*c*, as indicated at 2589 in Fig. 26 (2) and the finder-connector link 12 is released from operative association with the revertive calling line 32. When the +B switch potential is removed from the conductor 12*c* the potentials on the conductors 235, 296*a*, 12*f*, 12*h*, 242, 251, 268*a* and 253 are returned to their normal or quiescent values. Also, the connector pulse forming circuit 217 ceases to develop connector pulses in the time position 63*c* assigned to the line 32 when the potential is removed from the conductor 12*c* so that the called line out gate tube 1403 ceases to impress connector signal pulses 2569 on the common output conductor 51, as indicated at 2590 in Fig. 32 (24). Accordingly, transmission of the revertive call tone signal 2584 on the connector signal pulses 2569 ceases a short interval after the revertive call is answered so that conversation between the calling and called substations is permitted.

While the link 12 is released in the manner described above a short time interval after the revertive call is answered the line lockout circuit 2770 remains in the lockout condition 2580 in which busy pulses are impressed upon the common busy pulse out conductor 52*a* in the time position 63*c* assigned to the line 32. As a result, the line 32 is busied to all of the finder-connector links of the system and this line is prevented from seizing another link until the revertive call is completed. However, when both the calling and called parties have hung up, as indicated by the arrow 2591, a second disconnect signal 2592 is transmitted over the line 32, as shown in Fig. 26 (1), so that the bias potential on the conductor 45*b* is made highly negative and the line lockout circuit 2770 is changed to a closed or non-lockout condition 2593 in which no busy pulses are impressed upon the conductor 52*a* in the time position 63*c* assigned to the line 32. Accordingly, after the revertive call is completed and both parties have hung up, the line lockout condition is removed from the line 32 so that this line is permitted to initiate another call.

In the event the revertive call is not answered at the called substation and is abandoned at the calling substation, the primer tube 1771 in the circuit 301 is fired in response to the next occurring timeout pulse appearing on the conductor 57*b* and the timeout control tube 1772 is fired two minutes thereafter in response to the succeeding timeout pulse. When this occurs, the potential on the conductor 12*f* is increased to the value 2585 and the potential on the conductor 12*h* is reduced to the value 2586 so that the link 12 is released. Since no calling condition exists on the line 32 during this period the entire system is returned to its previous condition wherein the line 32 is capable of initiating a call.

In considering the line lockout operation on a non-revertive call, it will be understood that the operation of the line lockout facilities in response to a delay in the dialing operation or a prolonging ringing operation is substantially identical to that described above in connection with a revertive call. However, on a non-revertive call the connector signal pulses 2511 are not terminated as indicated at 2553 in Fig. 31 (25), but are instead continuously produced as long as a calling condition exists on the calling line. As a result, the line lockout circuit 2770 does not remain in the closed, or non-lockout condition 2558 at the end of the third digit, but instead returns to a line lockout condition so that the link 12 may be released at any time after the third digit has been completed if the call does not progress in a normal manner.

After the non-revertive call is completed, the conversation timing facilities are conditioned for operation, and, at the end of the conversation timing interval, a positive pulse is developed at the anode of the tube 1030 in the party digit register 265 which is transmitted to the link release tube 1773 so as to fire this tube. When the tube 1773 is fired the potential on the conductor 12*h* is reduced to the value 2586, as described above in connection with Fig. 32 (22) on a revertive call. Since the potential on the conductor 12*f* remains at the value 2507 throughout a non-revertive call the +B switching circuit 201 is conditioned to respond to termination of multiplexer pulse transmission through the pulse input circuit 200 by releasing the link 12 in the manner described above so that the circuits in the finder 12*a* and connector 12*b* are returned to their original or quiescent values, as described above in connection with the release of the link 12 after answering of a revertive call. Since both the calling and called lines are in a line lockout condition when the conversation timing interval expires, these lines are prevented from seizing additional linkage until the calling and called subscribers hang up and that these lines are prevented from calling in any additional linkage after the conversation timing interval is over.

*Distributor 15*

As pointed out in the general description of the system, this circuit is provided for the general purpose of distributing signals derived from the signal sample modulated connector pulses developed in the connectors of the system in the time position of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors 12*b*, 13*b*, 14*b*, etc., embodied in the system.

The distributor 15 may be of the type described in detail in any one of the above identified copending applications Serial No. 134,974, Serial No. 205,641, or Serial No. 326,453 identified above. However, it will be understood that a particular type of distributor is designed to operate with the type of line circuit disclosed in conjunction therewith. In the present application the line circuits are connected to the distributor 15 by only a single conductor so that distributors of the type shown in either of the above identified copending applications Serial No. 205,641 or Serial No. 326,453 identified above, may be employed with the type of line circuit disclosed diagrammatically in Figs. 1 and 3 of the present application.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic telephone system, a plurality of lines having individually assigned thereto different time positions in repetitive time position frames, time position responsive means directly controllable over any calling one of said lines for setting up a two-way communication connection between the calling line and any called one of said lines, and line lockout means for individually locking said lines out of service by busying the time position assigned thereto to said time position responsive communication connection means when a prolonged calling condition exists on the line without the call being set up in a normal manner.

2. In an automatic telephone system, a plurality of lines having individually assigned thereto different time positions in repetitive time position frames, time position responsive means directively controllable over any calling one of said lines for setting up a two-way communication connection between the calling line and any called one of said lines, and time position responsive line lockout means individually associated with said lines for locking said lines out of service by busying the time position assigned thereto to said communication connection means when a calling condition exists on the line without initiation of a call thereon for a timeout interval of predetermined duration.

3. In an automatic telephone system, a plurality of lines having individually assigned thereto different time positions in repetitive time position frames, time position responsive means directively controllable over any calling one of said lines for setting up a two-way communication connection between the calling line and any called one of said lines, means for setting up a line lockout condition on any one of said lines in response to the initiation of a calling condition on the line, and means controlled in part by said last named means for preventing a call from being set up between said calling line and any called one of said lines if dialing is not initiated within a predetermined timeout interval after initiation of said calling condition.

4. In an automatic telephone system, a plurality of lines having individually assigned thereto different time positions in repetitive time position frames, time position responsive means responsive to switch directing impulses transmitted over any calling one of said lines for setting up a two-way communication connection between the calling line and any called one of said lines, and means for preventing said impulse responsive means from responding to switch directing impulses transmitted over the calling line in the time position assigned thereto after a timeout interval of predetermined duration has expired.

5. In an automatic telephone system, a plurality of lines, means responsive to switch directing impulses transmitted over any calling one of said lines for setting up a two-way communication connection between the calling line and any calling one of said lines, means for initiating a timeout interval in response to initiation of a calling condition on the calling line, means for locking the calling line out of service at the end of said timeout interval, and means for reinitiating said timeout interval each time a digit of said dial impulses is transmitted over the calling line in setting up of said connection.

6. In an automatic telephone system, a plurality of two-conductor lines, means responsive to switch directing impulses transmitted over any calling one of said lines and directively controllable thereby for setting up a two-way communication connection between the calling line and any called one of said lines, means for initiating a timeout interval in response to closure of a loop circuit which includes the conductors of one of said lines, means for locking said one line out of service at the end of said timeout interval, and means responsive to transmission of switch directing over said one line during said timeout interval for reinitiating said timeout interval.

7. In an automatic telephone system, a plurality of lines, switching apparatus for setting up a telephonic connection between any two of said lines, said apparatus being directively controllable over a calling one of said lines to select a called one of said lines, means included in said apparatus for initiating a time out interval in response to initiation of a calling condition on one of said lines, means included in said apparatus for locking said one line out of service at the end of said timeout interval, means included in said apparatus for transmitting a ringing signal over the called line, and means included in said apparatus for reinitiating said timeout interval in response to transmission of said ringing signal over the called line.

8. In an automatic telephone system, a plurality of lines, switching apparatus for setting up a telephonic connection between any two of said lines, said apparatus being directively controllable over a calling one of said lines to select a called one of said lines, means included in said apparatus for transmitting a ringing signal over the called line, means included in said apparatus for initiating a timeout interval in response to transmission of said ringing signal over the called line, means included in said apparatus for locking the calling line out of service at the end of said timeout interval, and means included in said apparatus for disabling said last named means if the call is answered before the end of said timeout interval.

9. In an automatic telephone system, a plurality of lines, switching apparatus for setting up a telephonic connection between any two of said lines, said apparatus being directively controllable over a calling one of said lines to select a called one of said lines, means included in said apparatus for transmitting a ringing signal over the called line, means included in said apparatus for initiating a timeout interval in response to transmission of said ringing signal over the called line, means included in said apparatus for locking the calling line out of service at the end of said timeout interval, means included in said apparatus for preventing lockout of the calling line if the call is answered before the end of said time out interval, means included in said apparatus for initiating a conversation timing interval in response to answering of the call, and means included in said apparatus for locking the calling line out of service at the end of said conversation timing interval.

10. In an automatic telephone system, a plurality of lines having individually assigned thereto different time positions in repetitive time position frames, time position responsive switching apparatus for setting up a telephonic connection between any two of said lines, said apparatus being directively controllable over a calling one of said lines to select a called one of said lines, means included in said apparatus and responsive to the establishment of a connection between said calling and called lines for initiating a conversation timing interval, and means included in said apparatus for locking said calling line out of service by busying the time position assigned thereto at the end of said conversation timing interval.

11. In an automatic telephone system, a plurality of lines having individually assigned thereto different time positions in repetitive time position frames, time position responsive switching apparatus for setting up a telephonic connection between any two of said lines, said apparatus being directively controllable over a calling one of said lines to select a called one of said lines, means included in said apparatus and responsive to the establishment of a connection between said calling and called lines for initiating a conversation timing interval, and means included in said apparatus for locking said called line out of service by busying the time position assigned thereto at the end of said conversation timing interval.

12. In an automatic telephone system, a plurality of lines having individually assigned thereto different time positions in repetitive time position frames, an impulse responsive link time position responsive means including said link for setting up a telephonic connection between a calling one of said lines and any called one of said lines, and electronic means in said link and responsive to a delay of the dialing operation at the calling line for preventing said link from setting up the connection.

13. In an automatic telephone system, a plurality of lines having individually assigned thereto different time positions in repetitive time position frames, an impulse responsive link, time position responsive means including said link for setting up a telephonic connection between a calling one of said lines and any called one of said lines, electronic means in said link responsive to a delay of the dialing operation at the calling line for releasing said link from the calling line, and electronic means for thereafter busying the calling line to said link.

14. In an automatic telephone system, a plurality of lines having individually assigned thereto different time positions in repetitive time position frames, a plurality of impulse responsive links, time position responsive means including said links for setting up telephonic connections between calling and called ones of said lines, electronic means included in said links and responsive to a delay of the dialing operation at the calling line operatively associated therewith for releasing from the calling line, and electronic means for preventing the released calling line from becoming operatively associated with one of said links while a calling condition persists on this line.

15. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, a line busying channel common to said lines and interconnecting said links, means included in said one link and responsive to operative association thereof with said calling line for transmitting busy pulses over said channel in the time position assigned to said calling line, means included in each link and controlled in part by the busy pulses impressed on said channel for preventing operative association of the link with a busy line, link release means included in said one link for terminating transmission of busy pulses over said channel in the time position assigned to said calling line if the call does not progress in a normal manner, and means for preventing said calling line from becoming operatively associated with one of said links while a calling condition persists on said line.

16. In an automatic telephone system, a plurality of line having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, means responsive to operative association of said one link with said calling line for busying the time position assigned thereto to the other links, and means for releasing said one link from said calling line while continuing to busy the time position assigned thereto if a prolonged calling condition exists on said calling line without the call being initiated in a normal manner.

17. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, and link release means responsive to a prolonged calling condition on said one line without initiation of a dialing operation on said one line for releasing said one link from said calling line independently of the pulses developed by said last named means in the time position assigned to said calling line.

18. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, and link release means responsive to the delay in transmission of any one digit dialed by the calling subscriber for releasing said one link from said calling line independently of the pulses developed by said last named means in the time position assigned to said calling line.

19. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, line busying means responsive to operative association of said one link with said calling line for busying the time position assigned thereto to the other links, and means for releasing said one link from said calling line independently of said line busying means in the event that a dialing operation is not initiated on said calling line within a predetermined time interval after operative association of said calling line with said one link.

20. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, line busying means individual to each of said lines for busying the time position assigned to said calling line to the other links in response to operative association of said one link with said calling line, and means for releasing said one link from said calling line a predetermined time interval after operative association therewith, said line busying means thereafter continuing to busy the time position assigned to said calling line to all of said links until a calling condition no longer exists on said calling line.

21. In an automatic telephone system, a plurality of lines having individually assigned thereto different time positions in repetitive time position frames, a plurality of impulse responsive links, means for developing pulses in the time positions individually assigned to said lines as said lines are taken into use, means responsive to the pulses developed by said last named means in the time position assigned to a calling one of said lines for operatively associating one of said links with said calling line, means for initiating a link timeout interval in response to operative association of said one link and said calling line, and means controlled in part by said last named means for releasing said one link from said calling line at the end of said timeout interval in the event that a dialing operation has not been initiated on said calling line during said timeout interval.

22. In an automatic telephone system, a plurality of lines having individually assigned thereto different time positions in repetitive time position frames, an impulse responsive link, a pulse path common to said lines and extending to said link, means responsive to an off-hook condition on one of said lines for transmitting pulses over said pulse path in the time position assigned to said one line, means responsive to said pulses for conditioning said link to respond to dial impulses transmitted over said one line, and means for disabling said last named means if dial impulses are not transmitted over said one line within a predetermined time interval after said off-hook condition arises.

23. In an automatic telephone system, a plurality of lines having individually assigned thereto different time positions in repetitive time position frames, a finder-selector link including a finder and a selector, a pulse path common to said lines and extending to said finder, means responsive to an off-hook condition on one of said lines for transmitting pulses over said path in the time position assigned to said one line, means for admitting to said finder pulses appearing on said path in the time position assigned to said one line and for rejecting pulses appearing on said path in the time positions assigned to other busy lines, means responsive to the pulses admitted to said finder for conditioning said selector for operation and for holding both said finder and selector operatively associated with said one line during transmission of switch directing impulses over said one line, line selecting means responsive to switch directing impulse modulation of the pulses admitted to said finder for selecting the time position assigned to a called one of said lines, and means for preventing pulses appearing on said path in the time position assigned to said one line from being admitted to said finder if switch directing impulses are not transmitted over said one line within a predetermined time interval after said off-hook condition arises.

24. In an automatic telephone system, a plurality of lines having individually assigned thereto different time positions in repetitive time position frames, a finder-selector link including a finder and a selector, a pulse path common to said lines and extending to said finder, means responsive to an off-hook condition on one of said lines for transmitting pulses over said path in the time position assigned to said one line, a pulse input circuit for admitting to said finder only those pulses appearing on said path which occur in the time position assigned to said one line, means responsive to the pulses admitted to said finder for conditioning said selector for operation, timing means responsive to conditioning of said selector by said last named means for initiating a link timeout interval, and means controlled by said timing means for blocking said pulse input circuit at the end of said timeout interval in the event that a dialing operation is not initiated on said one line during said timeout interval.

25. In an automatic telephone system, a plurality of lines having individually assigned thereto different time positions in repetitive time position frames, a finder-selector link including a finder and a selector, a pulse path common to said lines and extending to said finder, means responsive to an off-hook condition on one of said lines for transmitting pulses over said path in the time position assigned to said one line, a pulse input circuit for admitting to said finder only those pulses appearing on said path which occur in the time position assigned to said one line, means responsive to the pulses admitted to said finder for supplying an operating potential to said selector to condition said selector for operation, timing means responsive to supply of said operating potential to said selector for initiating a link timeout interval, and means controlled by said timing means for removing said operating potential from said selector in the event that a dialing operation is not initiated on said one line during said timeout interval.

26. In an automatic telephone system, a plurality of lines having individually assigned thereto different time positions in repetitive time position frames, a finder-selector link including a finder and a selector, a pulse path common to said lines and extending to both said finder and said selector, means responsive to an off-hook condition on one of said lines for transmitting pulses over said path in the time position assigned to said one line, said last named means also being operative to modulate the flow of pulses over said path in the time position assigned to said one line in accordance with switch directing impulses transmitted thereto over said one line and to transmit pulses over said path in the time positions respectively assigned to other busy lines of the system, a pulse input circuit for admitting to said finder pulses appearing on said path in the time position assigned to said one line and for rejecting pulses appearing on said path in the time positions respectively assigned to said other busy lines, a potential supply circuit responsive to the pulses admitted by said pulse input circuit for supplying an operating potential to said selector, a finder gate pulse channel extending from said finder to said selector, means in said finder responsive to the pulses admitted to said finder in the time position assigned to said one line for impressing finder gate pulses on said finder gate pulse channel in the same time position, normally closed pulse gating means responsive to said finder gate pulses for admitting pulses from said path to said selector in the time position assigned to said one line, line selecting means energized at least in part by said operating potential and responsive to switch directing impulse modulation of the pulses admitted to said selector by said pulse gating means for selecting one of said time positions, timing means responsive to supply of said operating potential to said selector for initiating a link timeout interval, means responsive to switch directing impulse modulation of the pulses admitted to said selector by said pulse gating means for reinitiating said link timeout interval, and means for disabling said potential supply circuit at the end of said link timeout interval, thereby to terminate supply of said operating potential to said selector.

27. In an automatic telephone system, a plurality of lines having individually assigned thereto different time positions in repetitive time position frames, a finder-selector link including a finder and a selector, a pulse path common to said lines and extending to both said finder and said selector, means responsive to an off-hook condition on one of said lines for transmitting pulses over said path in the time position assigned to said one line, said last named means also being operative to modulate the flow of pulses over said path in the time position assigned to said one line in accordance with switch directing impulses transmitted thereto over said one line and to transmit pulses over said path in the time positions respectively assigned to other busy lines of the system, a pulse input circuit for admitting to said finder pulses appearing on said path in the time position assigned to said one line and for rejecting pulses appearing on said path in the time positions respectively assigned to said other busy lines, a potential supply circuit responsive to the pulses admitted by said pulse input circuit for supplying an operating potential to said selector, a finder gate pulse channel extending from said finder to said selector, means in said finder responsive to the pulses admitted to said finder in the time position assigned to said one line for impressing finder gate pulses on said finder gate pulse channel in the same time position, normally closed pulse gating means responsive to said finder gate pulses for admitting pulses from said path to said selector in the time position assigned to said one line, line selecting means energized at least in part by said operating potential and responsive to switch directing impulse modulation of the pulses admitted to said selector by said pulse gating means for selecting one of said time positions, timing means responsive to supply of said operating potential to said selector for initiating a link timeout interval, means responsive to switch directing impulse modulation of the pulses admitted to said selector by said pulse gating means for reinitiating said link timeout interval, and means for disabling said potential supply circuit and concurrently blocking said pulse input circuit at the end of said link timeout interval, thereby to terminate transmission of finder gate pulses over said finder gate pulse channel and supply of said operating potential to said selector.

28. In an automatic telephone system, a plurality of lines having individually assigned thereto different time positions in repetitive time position frames, at least some of said lines having a plurality of substations associated therewith, an impulse responsive link, means including said link and controlled in accordance with the time position assigned to a calling one of said lines for setting up a revertive call connection between different substations associated with said calling line, and means for releasing said link in response to completion of said revertive call connection.

29. In an automatic telephone system, a plurality of lines having individually assigned thereto different time positions in repetitive time position frames, at least some of said lines having a plurality of substations associated therewith, an impulse responsive link, means for developing pulses in the time positions individually assigned to said lines as said lines are taken into use, means responsive to the pulses developed by said last named means in the time position assigned to a calling one of said lines for operatively associating said link with said calling line, means including said link for setting up a revertive call connection between different substations associated with said calling line, and means responsive to completion of said revertive call connection for releasing said link from said calling line while maintaining said revertive call connection.

30. In an automatic telephone system, a plurality of lines having individually assigned thereto different time positions in repetitive time position frames, at least some of said lines having a plurality of substations associated therewith, an impulse responsive link, means including said link and controlled in accordance with the time position assigned to a calling one of said lines for setting up a revertive call connection between different substations associated with said calling line, means for releasing said link in response to completion of said revertive call connection, and means for busying said calling line to the other lines after said link has been released and for the duration of the revertive call.

31. In an automatic telephone system, a plurality of lines having individually assigned thereto different time positions in repetitive time position frames, at least some of said lines having a plurality of substations associated therewith each identifiable by a different party line ringing signal, an impulse responsive link, means for developing pulses in the time positions individually assigned to said lines as said lines are taken into use, means responsive to the pulses developed by said last named means in the time position assigned to a calling one of said lines for operatively associating said link with said calling line, means including said link for selectively signalling one of the substations associated with said calling line in accordance with the party line ringing signal assigned thereto, and means responsive to a call answering operation at said one substation for releasing said link from said calling line.

32. In an automatic telephone system, a plurality of lines having individually assigned thereto different time positions in repetitive time position frames, at least some of said lines having a plurality of substations associated therewith each identifiable by a different party line ringing signal, an impulse responsive link, means for developing pulses in the time positions individually assigned to said lines as said lines are taken into use, means responsive to the pulses developed by said last named means in the time position assigned to a calling one of said lines for operatively associating said link with said calling line, means including said link for selectively signalling one of the substations associated with said calling line in accordance with the party line ringing signal assigned thereto, means responsive to a call answering operation at said one substation for releasing said link from said calling line, and means for busying the time position assigned said calling line to the other lines after the call has been answered and said link released from said calling line.

33. In an automatic telephone system, a plurality of lines having individually assigned thereto different time positions in repetitive time position frames, a plurality of line circuits individually terminating said lines at a central office, signal sampling multiplexer means for developing signal modulated pulses in the time positions assigned to calling and called ones of said lines and means included in each of said line circuits and independent of said multiplexer means for developing unmodulated busy pulses in the time position assigned to the line terminated thereby during periods when an off-hook condition exists on the line.

34. In an automatic telephone system, a plurality of lines having individually assigned thereto different time positions in repetitive time position frames, a signal sampling multiplexer for developing signal modulated pulses in the time positions assigned to calling and called ones of said lines, pulse generating means for developing pulses in said time positions, a line busying channel common to said lines, and pulse gating means individually associated with said lines and independent of said signal sampling multiplexer for gating pulses developed by said pulse generating means to said line busying channel in the time position assigned to the associated line when an off-hook condition exists on the line.

35. A line circuit for terminating a line of a telephone system, said line having assigned thereto a particular time position which recurs in repetitive time position frames, comprising means responsive to completion of a circuit including at least a portion of the conductors of said line to said line circuit and indicating a calling condition on said line for developing a first control signal in said line circuit, means responsive to a return supervision signal transmitted to said line circuit for developing a second control signal, and means in said line circuit and jointly controlled by said first and second control signals for developing pulses in the time position assigned to said line.

36. In a telephone system, a line, a line circuit terminating said line, said line having assigned thereto a particular time position which recurs in repetitive time position frames, means for developing a first control signal during periods when an off-hook condition exists on said line, means for transmitting pulses to said line circuit in the time position assigned to said line, means responsive to the transmission of a return supervision signal to said line circuit for developing a second control signal, and pulse gating means in said line circuit and jointly controlled by said first and second control signals for gating the pulses transmitted to said line circuit in the time position assigned to said line.

37. In a telephone system, a line, a line circuit terminating said line, said line having assigned thereto a particular time position which recurs in repetitive time position frames, means for developng a first control signal during periods when an off-hook condition exists on said line, means for transmitting pulses to said line circuit in the time position assigned to said line, means responsive to the transmission of a return supervision signal to said line circuit for developing a second control signal, a normally closed pulse gating circuit included in said line circuit, means for opening said pulse gating circuit in response to initiation of both said first and second control signals, thereby to gate the pulses transmitted to said line circuit in the time position asigned to said line, and means for closing said gating circuit only in response to termination of said first control signal.

38. In a telephone system, a line, a line circuit terminating said line, said line having assigned thereto a particular time position which recurs in repetitive time position frames, means for developing a control signal having a first value when an off-hook condition exists on said line and a second value when no off-hook condition exists, a gate tube having a pair of control electrodes and an output electrode, means for impressing pulses on one of said control electrodes in the time position assigned to said line, means for biasing said one electrode negatively during periods when said control signal has said second value to prevent transmission of said pulses through said gate tube, means responsive to the transmission of a return supervision signal to said line circuit for developing a control potential, means for utilizing said control potential as an energizing potential for the other of said control electrodes, and means for deriving said pulses from the anode of said gate tube during periods when said control signal has said first value and said other control electrode is energized.

39. In a telephone system, a line, a line circuit terminating said line, said line having assigned thereto a particular time position which recurs in repetitive time position frames, means for developing a control signal having a first value when an off-hook condition exists on said line and a second value when no off-hook condition exists, a gate tube having a pair of control electrodes and an output electrode, means for impressing pulses on one of said control electrodes in the time position assigned to said line, means for biasing said one electrode negatively during periods when said control signal has said second value to prevent transmission of said pulses through said gate tube, a control tube of the gaseous discharge type, means responsive to the transmission of a return supervision signal to said line circuit for causing said control tube to conduct, means for impressing an energizing potential on the other of said control electrodes in response to conduction of said control tube, and means for deriving said pulses from the anode of said gate tube during periods when said control signal has said first value and said other control electrode is energized.

40. In an automatic telephone system, a plurality of lines having individually assigned thereto different time positions in repetitive time position frames, an impulse responsive link, means for operatively associating said link with a calling one of said lines in the time position assigned thereto, means for transmitting switch directing impulses developed on said calling line to said link in the time position assigned to said calling line, means for developing an operating potential in response to operative association of said link with said calling line, a source of timing pulses, a primer tube, means for rendering said primer tube conductive in response to the first timing pulse which occurs after development of said operating potential, means responsive to conduction of said primer tube for developing an enabling bias potential, a control tube, means for impressing said enabling bias potential on said control tube to condition the same to respond to timing pulses from said source, means for developing restart pulses in response to switch directing impulses transmitted to said link in the time position assigned to said calling line, a restart tube, means for impressing said restart pulses on said restart tube to cause conduction thereof, means responsive to conduction of said restart tube for rendering said primer tube non-conductive, thereby to remove said enabling bias potential from said control tube, means for rendering said control tube conductive in response to the second timing pulse which occurs after development of said operating potential if no restart pulses are developed, means responsive to conduction of said control tube for developing a link release signal, and means controlled by said link release signal for releasing said link from said calling line.

41. In an automatic telephone system, a plurality of lines having individually assigned thereto different time positions in repetitive time position frames, an impulse responsive link, means for operatively associating said link with a calling one of said lines in the time position assigned thereto, means for transmitting switch directing impulses developed on said calling line to said link in the time position assigned to said calling line, means for developing an operating potential in response to operative association of said link with said calling line, a source of timing pulses, a primer tube, means for rendering said primer tube conductive in response to the first timing pulse which occurs after development of said operating potential, means responsive to conduction of said primer tube for developing an enabling bias potential, a control tube, means for impressing said enabling bias potential on said control tube to condition the same to respond to timing pulses from said source, means for developing restart pulses in response to switch directing impulses transmitted to said link in the time position assigned to said calling line, a restart tube, means for impressing said restart pulses on said restart tube to cause conduction thereof, means responsive to conduction of said restart tube for rendering said primer tube non-conductive, thereby to remove said enabling bias potential from said control tube, means responsive to switch directing impulses transmitted to said link in the time position assigned to said calling line for transmitting a ringing signal over the called line, means responsive to transmission of said ringing signal over the called line for causing said restart tube to conduct, thereby to remove said enabling bias potential from said control tube, means for rendering said control tube conductive in response to the second timing pulse which occurs after development of said operating potential if no restart pulses are developed, means responsive to conduction of said control tube for developing a link release signal, and means controlled by said link release signal for releasing said link from said calling line.

42. In an automatic telephone system, a plurality of lines having individually assigned thereto different time positions in repetitive time position frames, an impulse responsive link, means for operatively associating said link with a calling one of said lines in the time position assigned thereto, means for transmitting switch directing impulses developed on said calling line to said link in the time position assigned to said calling line, means for developing an operating potential in response to operative association of said link with said calling line, a source of timing pulses, a primer tube, means for rendering said primer tube conductive in response to the first timing pulse which occurs after development of said operating potential, means responsive to conduction of said primer tube for developing an enabling bias potential, a control tube, means for impressing said enabling bias potential on said control tube to condition the same to respond to timing pulses from said source, means for developing restart pulses in response to switch directing impulses transmitted to said link in the time position assigned to said calling line, a restart tube, means for impressing said restart pulses on said restart tube to cause conduction thereof, means responsive to conduction of said restart tube for rendering said primer tube non-conductive, thereby to remove said enabling bias potential from said control tube, means responsive to switch directing impulses transmitted to said link in the time position assigned to said calling line for transmitting a ringing signal over the called line, means responsive to transmission of said ringing signal over the called line for causing said restart tube to conduct, thereby to remove said enabling bias potential from said control tube, means for rendering said control tube conductive in response to the second timing pulse which occurs after development of said operating potential if no restart pulses are developed, means responsive to conduction of said control tube for developing a link release signal, means controlled by said link release signal for releasing said link from said calling line, and means responsive to a call answering operation at the called line for thereafter rendering said control tube non-responsive to said timing pulses.

43. In an automatic telephone system, a plurality of lines having individually assigned thereto different time positions in repetitive time position frames, an impulse responsive link, means for operatively associating said link with a calling one of said lines in the time position assigned thereto, means for transmitting switch directing impulses developed on said calling line to said link in the time position assigned to said calling line, means for developing an operating potential in response to operative association of said link with said calling line, a source of timing pulses, a primer tube, means for rendering said primer tube conductive in response to the first timing pulse which occurs after development of said operating potential, means responsive to conduction of said primer tube for developing an enabling bias potential, a control tube, means for impressing said enabling bias potential on said control tube to condition the same to respond to timing pulses from said source, means for developing restart pulses in response to switch directing impulses transmitted to said link in the time position assigned to said calling line, a restart tube, means for impressing said restart pulses on said restart tube to cause conduction thereof, means responsive to conduction of said restart tube for rendering said primer tube non-conductive, thereby to remove said enabling bias potential from said control tube, means responsive to switch directing impulses transmitted to said link in the time position assigned to said calling line for transmitting a ringing signal over the called line, means responsive to transmission of said ringing signal over the called line for causing said restart tube to conduct, thereby to remove said enabling bias potential from said control tube, means for rendering said control tube conductive in response to the second timing pulse which occurs after development of said operating potential if no restart pulses are developed, means responsive to conduction of said control tube for developing a link release signal, means controlled by said link release signal for releasing said link from said calling line, means responsive to a call answering operation at the called line for thereafter rendering said control tube non-responsive to said timing pulses, conversation timing means for initiating a conversation timing interval in response to said call answering operation, means independent of said control tube for developing a link release signal at the end of said conversation timing interval, and means controlled by said last mentioned link release signal for releasing said link from said calling line.

44. In an automatic telephone system, a plurality of lines having individually assigned thereto different time positions in repetitive time position frames, at least some of said lines having a plurality of substations associated therewith identifiable by different party line ringing signals which are repeated during successive ringing cycles, means for developing code start pulses during successive ringing cycles, an impulse responsive link, means for operatively associating said link with a calling one of said lines in the time position assigned to said calling line, means for developing an operating potential in response to operative association of said link with said calling line, means for transmitting switch directing impulses developed on said calling line to said link in the time position assigned to said calling line, line selecting means controlled by the switch directing impulses transmitted to said link in the time position assigned to said calling line for selecting the time position assigned to a called one of said lines, revertive call test means for developing a control potential when the selected time position coincides wtih the time position assigned to said calling line, means for developing a ring start signal in response to a first disconnect signal transmitted over said calling line when the calling subscriber hangs up to permit completion of the revertive call, code start means jointly responsive to said ring start signal and said code start pulses for delevoping a code start potential, means controlled in part by said code start potential for transmitting a party line ringing signal over said calling line in accordance with the identity of the called substation, ring trip means responsive to a call answering operation on said calling line for terminating transmission of said ringing signal over said calling line, link release means jointly controlled by said operating potential, said control potential and said ring trip means for developing a link release signal when the revertive call is answered, and means controlled by said link release signal for releasing said link from said calling line.

45. In an automatic telephone system, a plurality of lines having individually assigned thereto different time positions in repetitive time position frames, at least some of said lines having a plurality of substations associated therewith identifiable by different party line ringing signals which are repeated during successive ringing cycles, means for developing code start pulses during successive ringing cycles, an impulse responsive link, means for operatively associating said link with a calling one of said lines in the time position assigned to said calling line, means for developing an operating potential in response to operative association of said link with said calling line, means for transmitting switch directing impulses developed on said calling line to said link in the time position assigned to said calling line, line selecting means controlled by the switch directing impulses transmitted to said link in the time position assigned to said calling line for selecting the time position assigned to a called one of said lines, revertive call test means for developing a control potential when the selected time position coincides with the time position assigned to said calling line, means for developing a ring start signal in response to a first disconnect signal transmitted over said calling line when the calling subscriber hangs up to permit completion of the revertive call, code start means jointly responsive to said ring start signal and said code start pulses for developing a code start potential, means controlled in part by said code start potential for transmitting a party line ringing signal over said calling line in accordance with the identity of the called substation, ring trip means responsive to a call answering operation on said calling line for terminating transmission of said ringing signal over said calling line, link release means jointly controlled by said operating potential, said control potential and said ring trip means for releasing said link from said calling line a predetermined time interval after the revertive call is answered, and means for transmitting a revertive tone signal over said calling line after the revertive call is answered and until said link is released.

References Cited in the file of this patent

UNITED STATES PATENTS

| | | |
|---|---|---|
| 2,406,165 | Schroeder | Aug. 20, 1946 |
| 2,490,833 | Ransom | Dec. 14, 1949 |
| 2,553,605 | Ransom | May 22, 1951 |
| 2,619,548 | Lesti | Nov. 25, 1952 |
| 2,650,950 | Kessler | Sept. 1, 1953 |
| 2,652,455 | Lomax | Sept. 15, 1953 |
| 2,659,769 | Elliott | Nov. 17, 1953 |
| 2,731,514 | Oberman | Jan. 17, 1956 |
| 2,809,235 | Trousdale | Oct. 8, 1957 |